US009727312B1

(12) United States Patent
Svendsen

(10) Patent No.: US 9,727,312 B1
(45) Date of Patent: Aug. 8, 2017

(54) PROVIDING SUBJECT INFORMATION REGARDING UPCOMING IMAGES ON A DISPLAY

(75) Inventor: Hugh Blake Svendsen, Chapel Hill, NC (US)

(73) Assignee: Ikorongo Technology, LLC, Chapel Hill, NC (US)

(*) Notice: Subject to any disclaimer, the term of this patent is extended or adjusted under 35 U.S.C. 154(b) by 580 days.

(21) Appl. No.: 12/762,698

(22) Filed: Apr. 19, 2010

Related U.S. Application Data

(63) Continuation-in-part of application No. 12/703,846, filed on Feb. 11, 2010, now Pat. No. 9,210,313.

(60) Provisional application No. 61/207,787, filed on Feb. 17, 2009.

(51) Int. Cl.
G06F 3/01 (2006.01)
G06F 9/44 (2006.01)
G06F 3/0481 (2013.01)
G06F 3/00 (2006.01)

(52) U.S. Cl.
CPC ............. G06F 8/34 (2013.01); G06F 3/0481 (2013.01)

(58) Field of Classification Search
USPC .............. 715/781, 825, 811, 760, 730, 716; 382/165, 190, 203, 118
See application file for complete search history.

(56) References Cited

U.S. PATENT DOCUMENTS

| 6,526,158 | B1 | 2/2003 | Goldberg |
| 6,591,068 | B1 | 7/2003 | Dietz |
| 6,606,398 | B2 | 8/2003 | Cooper |
| 6,745,186 | B1 | 6/2004 | Testa et al. |
| 6,819,783 | B2 | 11/2004 | Goldberg et al. |
| 7,068,309 | B2 | 6/2006 | Toyama et al. |
| 7,107,605 | B2 | 9/2006 | Janik |
| 7,154,642 | B2 | 12/2006 | Lichtfuss |
| 7,203,367 | B2 | 4/2007 | Shniberg et al. |
| 7,236,960 | B2 | 6/2007 | Manico et al. |
| 7,260,587 | B2 | 8/2007 | Testa et al. |
| 7,266,563 | B2 | 9/2007 | Morris et al. |
| 7,376,276 | B2 | 5/2008 | Shniberg et al. |
| 7,376,696 | B2 | 5/2008 | Bell et al. |
| 7,391,886 | B1 | 6/2008 | Clark et al. |

(Continued)

OTHER PUBLICATIONS

Potts, Ryan P. Office Action for U.S. Appl. No. 12/703,871, dated Oct. 26, 2012, 27 pages.

(Continued)

Primary Examiner — Toan Vu

(57) ABSTRACT

Methods are described for presenting in a user interface information regarding the subject faces that will appear in upcoming images. In general, many of the images available to display will be comprised of images containing subject faces. Based on a subject affinity score between the viewer and the subjects, and image affinity is computed. Based on the image affinity scores, images are selected for presentation on the display. As images are displayed, the system analyzes some portion of the upcoming images to determine the subject information to display. As each image is displayed, subject information comprised of the subjects face and subject prominence information may be shown in an area of the display adjacent to the current image. The subject prominence information may be determined as a function of a face size ratio value and a zone value.

19 Claims, 49 Drawing Sheets

(56) References Cited

U.S. PATENT DOCUMENTS

| | | | |
|---|---|---|---|
| 7,403,642 B2* | 7/2008 | Zhang et al. | 382/118 |
| 7,426,532 B2 | 9/2008 | Bell et al. | |
| 7,472,134 B2 | 12/2008 | Kaku | |
| 7,526,106 B1 | 4/2009 | Clark et al. | |
| 7,561,723 B2 | 7/2009 | Goldberg et al. | |
| 7,619,660 B2 | 11/2009 | Grosvenor | |
| 7,684,651 B2 | 3/2010 | Tang et al. | |
| 7,730,130 B2 | 6/2010 | Issa | |
| 7,739,304 B2 | 6/2010 | Naaman et al. | |
| 7,783,085 B2 | 8/2010 | Perlmutter et al. | |
| 7,860,347 B2 | 12/2010 | Tang et al. | |
| 7,916,894 B1 | 3/2011 | Dhillon et al. | |
| 7,933,972 B1 | 4/2011 | Issa et al. | |
| 7,953,690 B2 | 5/2011 | Luo et al. | |
| 7,961,986 B1 | 6/2011 | Jing et al. | |
| 7,965,908 B2 | 6/2011 | Hayashi | |
| 8,014,572 B2 | 9/2011 | Xiao et al. | |
| 8,144,944 B2 | 3/2012 | Ishii | |
| 8,189,880 B2 | 5/2012 | Wen et al. | |
| 8,233,679 B2 | 7/2012 | Perlmutter et al. | |
| 8,284,990 B2 | 10/2012 | Ma et al. | |
| 8,306,284 B2 | 11/2012 | Goldberg et al. | |
| 8,315,463 B2 | 11/2012 | Gallagher et al. | |
| 8,325,999 B2 | 12/2012 | Kapoor et al. | |
| 8,341,145 B2 | 12/2012 | Dodson et al. | |
| 8,358,811 B2 | 1/2013 | Adam et al. | |
| 8,396,265 B1 | 3/2013 | Ross et al. | |
| 8,402,094 B2 | 3/2013 | Bosworth et al. | |
| 2002/0080255 A1 | 6/2002 | Lichtfuss | |
| 2002/0126150 A1 | 9/2002 | Parry | |
| 2003/0063770 A1 | 4/2003 | Svendsen et al. | |
| 2003/0063771 A1 | 4/2003 | Morris et al. | |
| 2003/0095152 A1 | 5/2003 | Fong | |
| 2003/0113017 A1* | 6/2003 | Thomas et al. | 382/181 |
| 2003/0161499 A1 | 8/2003 | Svendsen et al. | |
| 2003/0210808 A1* | 11/2003 | Chen et al. | 382/118 |
| 2004/0044723 A1 | 3/2004 | Bell et al. | |
| 2004/0044724 A1 | 3/2004 | Bell et al. | |
| 2004/0044725 A1 | 3/2004 | Bell et al. | |
| 2004/0174440 A1 | 9/2004 | Kojima et al. | |
| 2005/0105806 A1* | 5/2005 | Nagaoka et al. | 382/224 |
| 2005/0162711 A1 | 7/2005 | Wu | |
| 2005/0280502 A1 | 12/2005 | Bell | |
| 2006/0048059 A1 | 3/2006 | Etkin | |
| 2006/0078201 A1* | 4/2006 | Kim et al. | 382/181 |
| 2006/0140455 A1* | 6/2006 | Costache et al. | 382/118 |
| 2006/0161867 A1* | 7/2006 | Drucker et al. | 715/810 |
| 2006/0170669 A1 | 8/2006 | Walker et al. | |
| 2006/0251338 A1 | 11/2006 | Gokturk et al. | |
| 2007/0040033 A1 | 2/2007 | Rosenberg | |
| 2007/0106561 A1* | 5/2007 | Lubow | 705/26 |
| 2007/0118508 A1 | 5/2007 | Svendsen | |
| 2007/0118509 A1 | 5/2007 | Svendsen | |
| 2007/0118525 A1 | 5/2007 | Svendsen | |
| 2007/0150916 A1 | 6/2007 | Begole et al. | |
| 2007/0159533 A1* | 7/2007 | Ayaki | 348/207.99 |
| 2007/0230799 A1* | 10/2007 | Shniberg et al. | 382/224 |
| 2007/0291153 A1 | 12/2007 | Araki et al. | |
| 2008/0052312 A1* | 2/2008 | Tang et al. | 707/104.1 |
| 2008/0059903 A1* | 3/2008 | Kaminaga et al. | 715/797 |
| 2008/0062283 A1* | 3/2008 | Matsushita et al. | 348/231.99 |
| 2008/0066360 A1 | 3/2008 | Simon | |
| 2008/0075338 A1* | 3/2008 | Muramatsu et al. | 382/118 |
| 2008/0086511 A1* | 4/2008 | Takao et al. | 707/104.1 |
| 2008/0089561 A1* | 4/2008 | Zhang | 382/118 |
| 2008/0189766 A1 | 8/2008 | Bell et al. | |
| 2008/0195962 A1 | 8/2008 | Lin et al. | |
| 2008/0226140 A1* | 9/2008 | Okamura | 382/118 |
| 2008/0260255 A1* | 10/2008 | Fukushima et al. | 382/190 |
| 2008/0273110 A1* | 11/2008 | Joza et al. | 348/333.05 |
| 2008/0298766 A1* | 12/2008 | Wen et al. | 386/46 |
| 2008/0310688 A1 | 12/2008 | Goldberg | |
| 2008/0317386 A1* | 12/2008 | Wood et al. | 382/307 |
| 2009/0063995 A1 | 3/2009 | Baron et al. | |
| 2009/0064029 A1* | 3/2009 | Corkran et al. | 715/781 |
| 2009/0080714 A1* | 3/2009 | Koda | 382/118 |
| 2009/0112462 A1* | 4/2009 | Lo | 701/209 |
| 2009/0116752 A1* | 5/2009 | Isomura et al. | 382/217 |
| 2009/0172545 A1* | 7/2009 | Yokoi | 715/721 |
| 2009/0185745 A1* | 7/2009 | Momosaki | 382/190 |
| 2009/0190804 A1* | 7/2009 | Yokoi | 382/118 |
| 2009/0199226 A1 | 8/2009 | Suehiro et al. | |
| 2009/0216806 A1 | 8/2009 | Feuerstein et al. | |
| 2009/0232417 A1* | 9/2009 | McMahan | 382/309 |
| 2009/0234815 A1 | 9/2009 | Boerries et al. | |
| 2009/0245657 A1* | 10/2009 | Osugi | 382/209 |
| 2009/0252383 A1* | 10/2009 | Adam et al. | 382/118 |
| 2009/0292549 A1 | 11/2009 | Ma et al. | |
| 2009/0304238 A1* | 12/2009 | Ebata et al. | 382/118 |
| 2009/0309897 A1* | 12/2009 | Morita et al. | 345/629 |
| 2010/0036875 A1 | 2/2010 | Miezianko et al. | |
| 2010/0067027 A1* | 3/2010 | Kunieda | 358/1.9 |
| 2010/0080464 A1* | 4/2010 | Sawai et al. | 382/190 |
| 2010/0094441 A1* | 4/2010 | Mochizuki et al. | 700/94 |
| 2010/0104146 A1* | 4/2010 | Momosaki | 382/118 |
| 2010/0110228 A1* | 5/2010 | Ozawa et al. | 348/231.2 |
| 2010/0125786 A1* | 5/2010 | Ozawa et al. | 715/702 |
| 2010/0131856 A1* | 5/2010 | Kalbfleisch et al. | 715/741 |
| 2010/0135582 A1* | 6/2010 | Gokturk et al. | 382/195 |
| 2010/0135584 A1* | 6/2010 | Tang et al. | 382/218 |
| 2010/0142833 A1* | 6/2010 | Ishizawa | 382/224 |
| 2010/0150407 A1 | 6/2010 | Cheswick | |
| 2010/0156834 A1* | 6/2010 | Sangster | 345/173 |
| 2010/0172550 A1 | 7/2010 | Gilley et al. | |
| 2010/0191728 A1 | 7/2010 | Reilly et al. | |
| 2010/0262911 A1* | 10/2010 | Kaplan et al. | 715/719 |
| 2010/0287592 A1 | 11/2010 | Patten et al. | |
| 2010/0310135 A1* | 12/2010 | Nagaoka et al. | 382/118 |
| 2011/0022529 A1 | 1/2011 | Barsoba et al. | |
| 2011/0038512 A1* | 2/2011 | Petrou et al. | 382/118 |
| 2011/0055766 A1* | 3/2011 | Ogawa et al. | 715/838 |
| 2011/0098917 A1* | 4/2011 | LeBeau et al. | 701/201 |
| 2011/0107369 A1 | 5/2011 | O'Brien et al. | |
| 2011/0150340 A1 | 6/2011 | Gotoh et al. | |
| 2011/0182482 A1 | 7/2011 | Winters et al. | |
| 2011/0182485 A1 | 7/2011 | Shochat et al. | |
| 2011/0188742 A1 | 8/2011 | Yu et al. | |
| 2011/0206246 A1* | 8/2011 | Wolf et al. | 382/118 |
| 2011/0211736 A1 | 9/2011 | Krupka et al. | |
| 2011/0211737 A1 | 9/2011 | Krupka et al. | |
| 2011/0234613 A1* | 9/2011 | Hanson et al. | 345/589 |
| 2011/0243397 A1* | 10/2011 | Watkins et al. | 382/118 |
| 2011/0268323 A1* | 11/2011 | Gallagher | 382/118 |
| 2012/0076367 A1 | 3/2012 | Tseng | |
| 2012/0141023 A1* | 6/2012 | Wang et al. | 382/162 |
| 2012/0190404 A1* | 7/2012 | Rhoads | 455/556.1 |
| 2012/0250950 A1 | 10/2012 | Papakipos et al. | |
| 2012/0250951 A1 | 10/2012 | Chen | |
| 2012/0265758 A1 | 10/2012 | Han et al. | |
| 2012/0275666 A1 | 11/2012 | Gao | |
| 2012/0278387 A1 | 11/2012 | Garcia et al. | |
| 2012/0278395 A1 | 11/2012 | Garcia | |
| 2012/0310968 A1 | 12/2012 | Tseng | |
| 2013/0120632 A1* | 5/2013 | Mukai et al. | 348/333.01 |
| 2014/0321761 A1* | 10/2014 | Wang et al. | 382/218 |

OTHER PUBLICATIONS

Potts, Ryan P. Office Action for U.S. Appl. No. 12/703,871, dated Jun. 10, 2013, 22 pages.

Quiett, Carramah J. Office Action for U.S. Appl. No. 12/703,846, dated Jun. 26, 2012, 14 pages.

Quiett, Carramah J. Office Action for U.S. Appl. No. 12/703,846, dated Aug. 26, 2013, 18 pages.

Quiett, Carramah J. Notice of Allowance for U.S. Appl. No. 12/703,846, dated Aug. 14, 2015, 8 pages.

* cited by examiner

VIEWER TO IMAGE AFFINITY MATRIX
( IMAGE AFFINITY )

FROM

|  | VIEWER 1 | VIEWER 2 | VIEWER 3 | VIEWER 4 | VIEWER 5 | VIEWER 6 | VIEWER 7 | VIEWER 8 |
|---|---|---|---|---|---|---|---|---|
| IMAGE 1 |  |  |  |  |  |  |  |  |
| IMAGE 2 |  |  |  |  |  |  |  |  |
| IMAGE 3 |  |  |  |  |  |  |  |  |
| IMAGE 4 |  |  |  |  |  |  |  |  |
| IMAGE 5 |  |  |  |  |  |  |  |  |
| IMAGE 6 |  | ● |  |  |  |  |  |  |
| IMAGE 7 |  |  |  |  |  |  |  |  |
| IMAGE 8 |  |  |  |  |  |  |  |  |

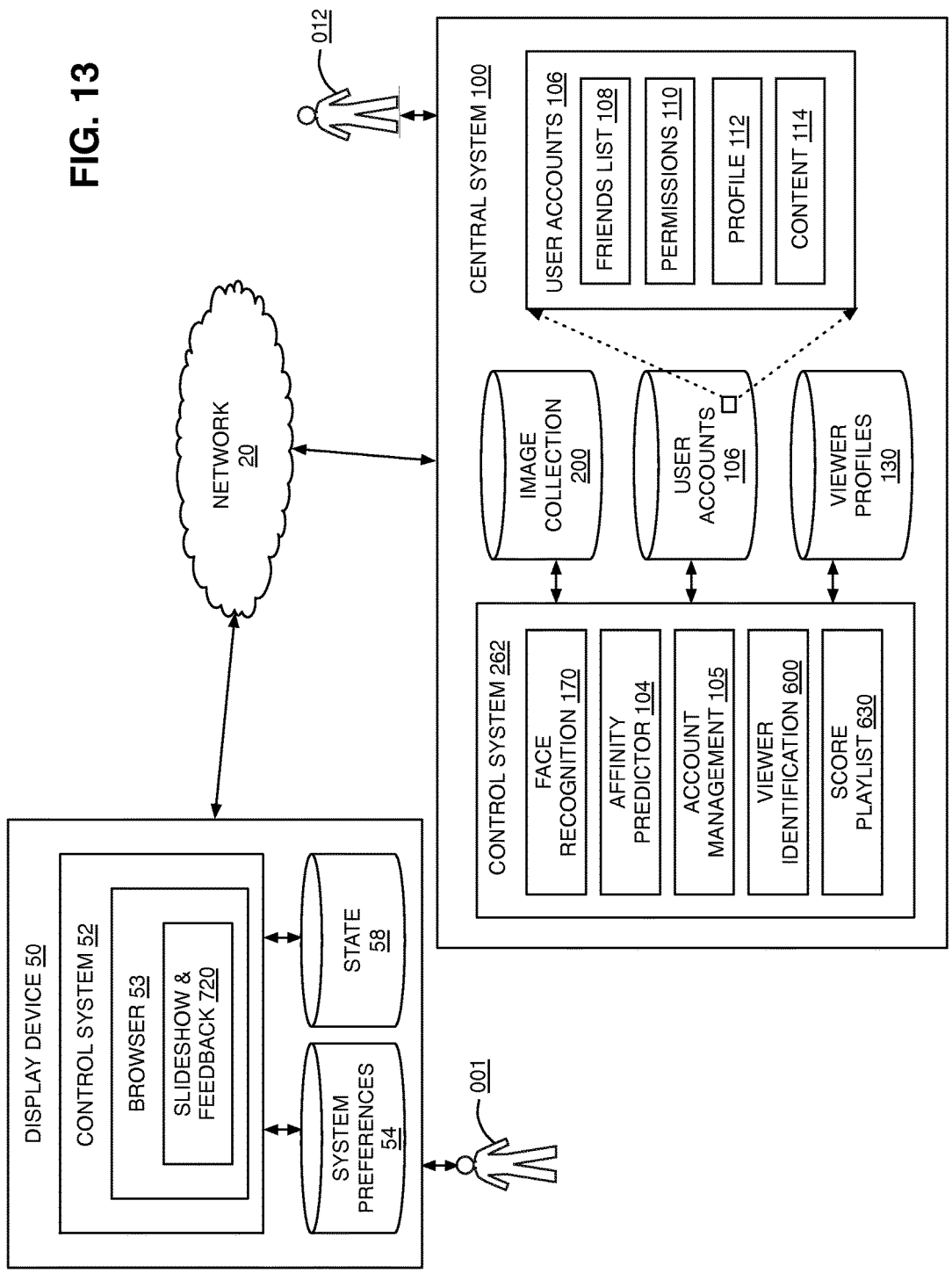

S = FACE OCCURRENCE MATRIX

|  | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| IMAGE 1 | 1 | 1 | 1 | 0 | 0 | 0 | 0 | 0 |
| IMAGE 2 | 0 | 1 | 1 | 0 | 0 | 1 | 0 | 0 |
| IMAGE 3 | 0 | 0 | 0 | 1 | 1 | 0 | 0 | 0 |
| IMAGE 4 | 0 | 0 | 0 | 0 | 0 | 0 | 0 | 0 |
| IMAGE 5 | 0 | 1 | 0 | 1 | 0 | 1 | 1 | 0 |
| IMAGE 6 | 0 | 0 | 0 | 0 | 1 | 1 | 0 | 1 |
| IMAGE 7 | 1 | 0 | 1 | 0 | 1 | 0 | 0 | 0 |
| IMAGE 8 | 0 | 0 | 0 | 0 | 1 | 1 | 0 | 0 |

FIG 14B

| | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| SUBJECT 1 | 0 | 1 | 0 | 1 | 1 | 0 | 0 | 1 |
| SUBJECT 2 | 1 | 0 | 1 | 0 | 1 | 0 | 0 | 0 |
| SUBJECT 3 | 0 | 1 | 0 | 0 | 0 | 0 | 1 | 0 |
| SUBJECT 4 | 1 | 0 | 0 | 0 | 0 | 1 | 0 | 0 |
| SUBJECT 5 | 1 | 1 | 0 | 0 | 0 | 1 | 0 | 0 |
| SUBJECT 6 | 0 | 0 | 0 | 1 | 1 | 0 | 0 | 1 |
| SUBJECT 7 | 0 | 0 | 1 | 0 | 0 | 0 | 0 | 0 |
| SUBJECT 8 | 1 | 0 | 0 | 0 | 0 | 1 | 0 | 0 |

FIG 15B: SOCIAL CONNECTIONS

FIG 15C: SOCIAL DISTANCE MATRIX

|  | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| SUBJECT 1 | 0 | 1 | 2 | 1 | 1 | 2 | 3 | 1 |
| SUBJECT 2 | 1 | 0 | 1 | 2 | 1 | 2 | 2 | 4 |
| SUBJECT 3 | 2 | 1 | 0 | 3 | 2 | 4 | 1 | 3 |
| SUBJECT 4 | 1 | 2 | 3 | 0 | 2 | 3 | 4 | 2 |
| SUBJECT 5 | 1 | 1 | 2 | 2 | 0 | 1 | 3 | 2 |
| SUBJECT 6 | 2 | 2 | 4 | 3 | 1 | 0 | 4 | 1 |
| SUBJECT 7 | 3 | 2 | 1 | 4 | 3 | 4 | 0 | 4 |
| SUBJECT 8 | 1 | 4 | 3 | 2 | 2 | 1 | 4 | 0 |

FIG 15D: W = SOCIAL DISTANCE WEIGHTING SUBJECT TO SUBJECT AFFINITY MATRIX

|  | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| SUBJECT 1 | 1.00 | 0.25 | 0.11 | 0.25 | 0.25 | 0.11 | 0.06 | 0.25 |
| SUBJECT 2 | 0.25 | 1.00 | 0.25 | 0.11 | 0.25 | 0.11 | 0.11 | 0.04 |
| SUBJECT 3 | 0.11 | 0.25 | 1.00 | 0.06 | 0.11 | 0.04 | 0.25 | 0.06 |
| SUBJECT 4 | 0.25 | 0.11 | 0.06 | 1.00 | 0.11 | 0.06 | 0.04 | 0.11 |
| SUBJECT 5 | 0.25 | 0.25 | 0.11 | 0.11 | 1.00 | 0.25 | 0.06 | 0.11 |
| SUBJECT 6 | 0.11 | 0.11 | 0.04 | 0.06 | 0.25 | 1.00 | 0.04 | 0.25 |
| SUBJECT 7 | 0.06 | 0.11 | 0.25 | 0.04 | 0.06 | 0.04 | 1.00 | 0.04 |
| SUBJECT 8 | 0.25 | 0.04 | 0.06 | 0.11 | 0.11 | 0.25 | 0.04 | 1.00 |

FIG 15E: P = VIEWER TO IMAGE AFFINITY MATRIX

|  | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| IMAGE 1 | 1.36 | 1.50 | 1.36 | 0.42 | 0.61 | 0.26 | 0.42 | 0.35 |
| IMAGE 2 | 0.47 | 1.36 | 1.29 | 0.24 | 0.61 | 1.15 | 0.40 | 0.35 |
| IMAGE 3 | 0.50 | 0.36 | 0.17 | 1.11 | 1.11 | 0.31 | 0.10 | 0.22 |
| IMAGE 4 | 0.00 | 0.00 | 0.00 | 0.00 | 0.00 | 0.00 | 0.00 | 0.00 |
| IMAGE 5 | 0.67 | 1.33 | 0.60 | 1.21 | 0.67 | 1.21 | 1.19 | 0.44 |
| IMAGE 6 | 0.61 | 0.47 | 0.21 | 0.28 | 1.36 | 1.50 | 0.14 | 1.36 |
| IMAGE 7 | 1.36 | 0.75 | 1.22 | 0.42 | 1.36 | 0.40 | 0.38 | 0.42 |
| IMAGE 8 | 0.36 | 0.36 | 0.15 | 0.17 | 1.25 | 1.25 | 0.10 | 0.36 |

FIG 15F: P NORMALIZED VIEWER TO IMAGE AFFINITY MATRIX

|  | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| IMAGE 1 | 0.91 | 1.00 | 0.91 | 0.28 | 0.41 | 0.17 | 0.28 | 0.24 |
| IMAGE 2 | 0.31 | 0.91 | 0.86 | 0.16 | 0.41 | 0.77 | 0.27 | 0.24 |
| IMAGE 3 | 0.33 | 0.24 | 0.12 | 0.74 | 0.74 | 0.21 | 0.07 | 0.15 |
| IMAGE 4 | 0.00 | 0.00 | 0.00 | 0.00 | 0.00 | 0.00 | 0.00 | 0.00 |
| IMAGE 5 | 0.45 | 0.89 | 0.40 | 0.81 | 0.45 | 0.81 | 0.79 | 0.29 |
| IMAGE 6 | 0.41 | 0.31 | 0.14 | 0.19 | 0.91 | 1.00 | 0.10 | 0.91 |
| IMAGE 7 | 0.91 | 0.50 | 0.81 | 0.28 | 0.91 | 0.27 | 0.25 | 0.28 |
| IMAGE 8 | 0.24 | 0.24 | 0.10 | 0.12 | 0.83 | 0.83 | 0.07 | 0.24 |

FIG 16A: FACE CO-OCCURRENCE MATRIX

|  | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| SUBJECT 1 | 4 | 2 | 2 | 0 | 1 | 1 | 0 | 1 |
| SUBJECT 2 | 2 | 4 | 2 | 0 | 1 | 1 | 1 | 0 |
| SUBJECT 3 | 2 | 2 | 4 | 0 | 0 | 1 | 0 | 1 |
| SUBJECT 4 | 0 | 0 | 0 | 4 | 0 | 1 | 1 | 0 |
| SUBJECT 5 | 1 | 1 | 0 | 0 | 4 | 1 | 0 | 1 |
| SUBJECT 6 | 1 | 1 | 1 | 1 | 1 | 4 | 1 | 1 |
| SUBJECT 7 | 0 | 1 | 0 | 1 | 0 | 1 | 4 | 1 |
| SUBJECT 8 | 1 | 0 | 1 | 0 | 1 | 1 | 1 | 4 |

FIG 16B: W = FACE CO-OCCURRENCE SUBJECT TO SUBJECT AFFINITY MATRIX

|  | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| SUBJECT 1 | 1.00 | 0.50 | 0.50 | 0.00 | 0.25 | 0.25 | 0.00 | 0.25 |
| SUBJECT 2 | 0.50 | 1.00 | 0.50 | 0.00 | 0.25 | 0.25 | 0.25 | 0.00 |
| SUBJECT 3 | 0.50 | 0.50 | 1.00 | 0.00 | 0.00 | 0.25 | 0.00 | 0.25 |
| SUBJECT 4 | 0.00 | 0.00 | 0.00 | 1.00 | 0.00 | 0.25 | 0.25 | 0.00 |
| SUBJECT 5 | 0.25 | 0.25 | 0.00 | 0.00 | 1.00 | 0.25 | 0.00 | 0.25 |
| SUBJECT 6 | 0.25 | 0.25 | 0.25 | 0.25 | 0.25 | 1.00 | 0.25 | 0.25 |
| SUBJECT 7 | 0.00 | 0.25 | 0.00 | 0.25 | 0.00 | 0.25 | 1.00 | 0.25 |
| SUBJECT 8 | 0.25 | 0.00 | 0.25 | 0.00 | 0.25 | 0.25 | 0.25 | 1.00 |

FIG 16C: P = SW VIEWER TO IMAGE AFFINITY MATRIX

|  | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| IMAGE 1 | 2.00 | 2.00 | 2.00 | 0.00 | 0.50 | 0.75 | 0.25 | 0.50 |
| IMAGE 2 | 1.25 | 1.75 | 1.75 | 0.25 | 0.50 | 1.50 | 0.50 | 0.50 |
| IMAGE 3 | 0.25 | 0.25 | 0.00 | 1.00 | 1.00 | 0.50 | 0.25 | 0.25 |
| IMAGE 4 | 0.00 | 0.00 | 0.00 | 0.00 | 0.00 | 0.00 | 0.00 | 0.00 |
| IMAGE 5 | 0.75 | 1.50 | 0.75 | 1.50 | 0.50 | 1.75 | 1.75 | 0.50 |
| IMAGE 6 | 0.75 | 0.50 | 0.50 | 0.25 | 1.50 | 1.50 | 0.50 | 1.50 |
| IMAGE 7 | 1.75 | 1.25 | 1.50 | 0.00 | 1.25 | 0.75 | 0.00 | 0.75 |
| IMAGE 8 | 0.50 | 0.50 | 0.25 | 0.25 | 1.25 | 1.25 | 0.25 | 0.50 |

FIG 16D: P NORMALIZED VIEWER TO IMAGE AFFINITY MATRIX

|  | SUBJECT 1 | SUBJECT 2 | SUBJECT 3 | SUBJECT 4 | SUBJECT 5 | SUBJECT 6 | SUBJECT 7 | SUBJECT 8 |
|---|---|---|---|---|---|---|---|---|
| IMAGE 1 | 1.00 | 1.00 | 1.00 | 0.00 | 0.25 | 0.38 | 0.13 | 0.25 |
| IMAGE 2 | 0.63 | 0.88 | 0.88 | 0.13 | 0.25 | 0.75 | 0.25 | 0.25 |
| IMAGE 3 | 0.13 | 0.13 | 0.00 | 0.50 | 0.50 | 0.25 | 0.13 | 0.13 |
| IMAGE 4 | 0.00 | 0.00 | 0.00 | 0.00 | 0.00 | 0.00 | 0.00 | 0.00 |
| IMAGE 5 | 0.38 | 0.75 | 0.38 | 0.75 | 0.25 | 0.88 | 0.88 | 0.25 |
| IMAGE 6 | 0.38 | 0.25 | 0.25 | 0.13 | 0.75 | 0.75 | 0.25 | 0.75 |
| IMAGE 7 | 0.88 | 0.63 | 0.75 | 0.00 | 0.63 | 0.38 | 0.00 | 0.38 |
| IMAGE 8 | 0.25 | 0.25 | 0.13 | 0.13 | 0.63 | 0.63 | 0.13 | 0.25 |

| MAX FACES | FACE AREA TO TOTAL IMAGE AREA RATIO | MULTIPLIER |
|---|---|---|
| 2 | 0.5 | 1 |
| 4 | 0.25 | 0.5 |
| 8 | 0.125 | 0.25 |
| 16 | 0.0625 | 0.125 |
| 32 | 0.03125 | 0.0625 |

USING DISTANCE BETWEEN FACES IN IMAGES TO REFINE SUBJECT AFFINITY

| RATIO OF DISTANCE BETWEEN FACE / DIAGONAL DISTANCE OF IMAGE | WEIGHT |
|---|---|
| > 0.3 | 0.5 |
| < 0.3 | 1 |

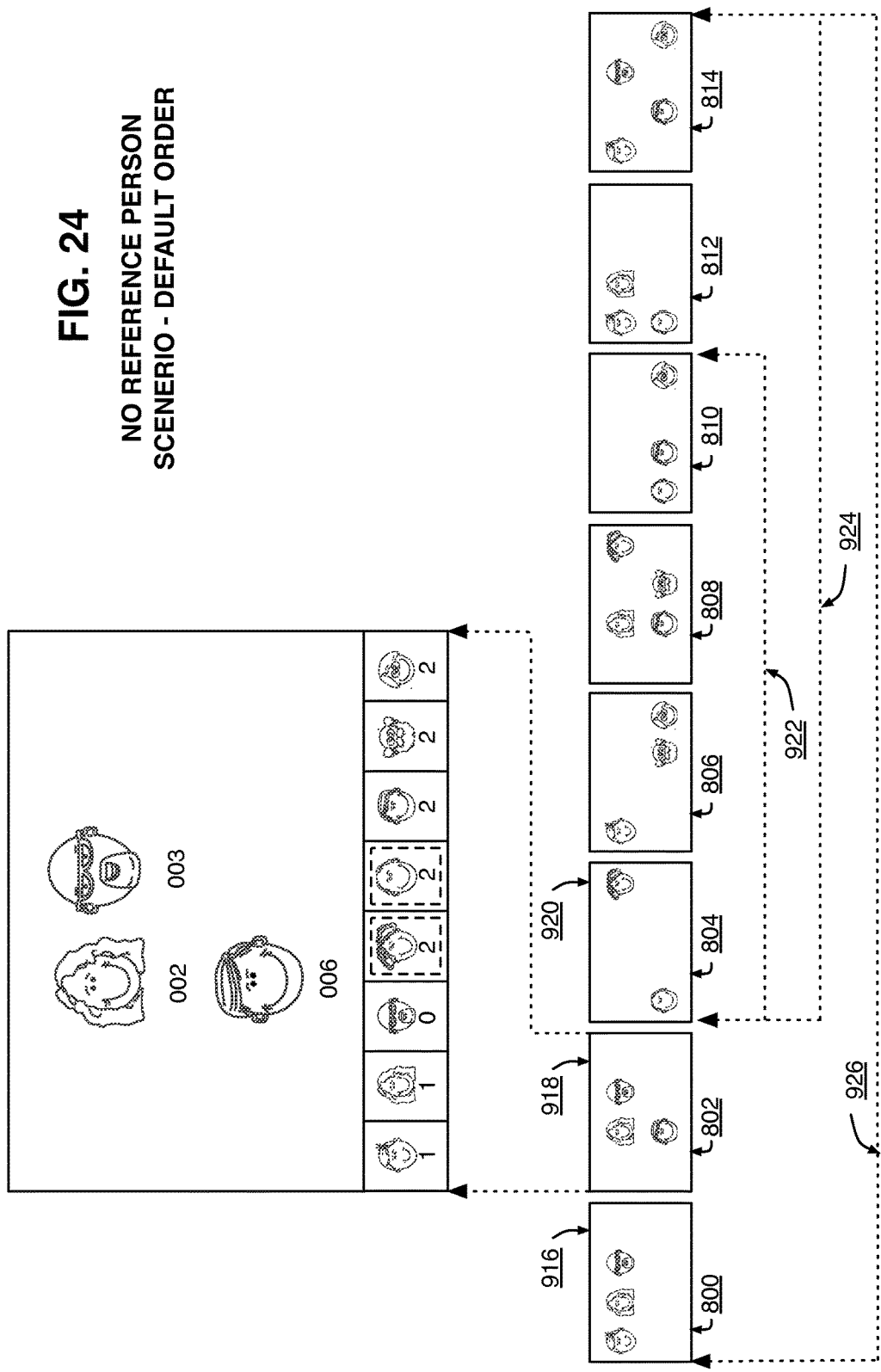

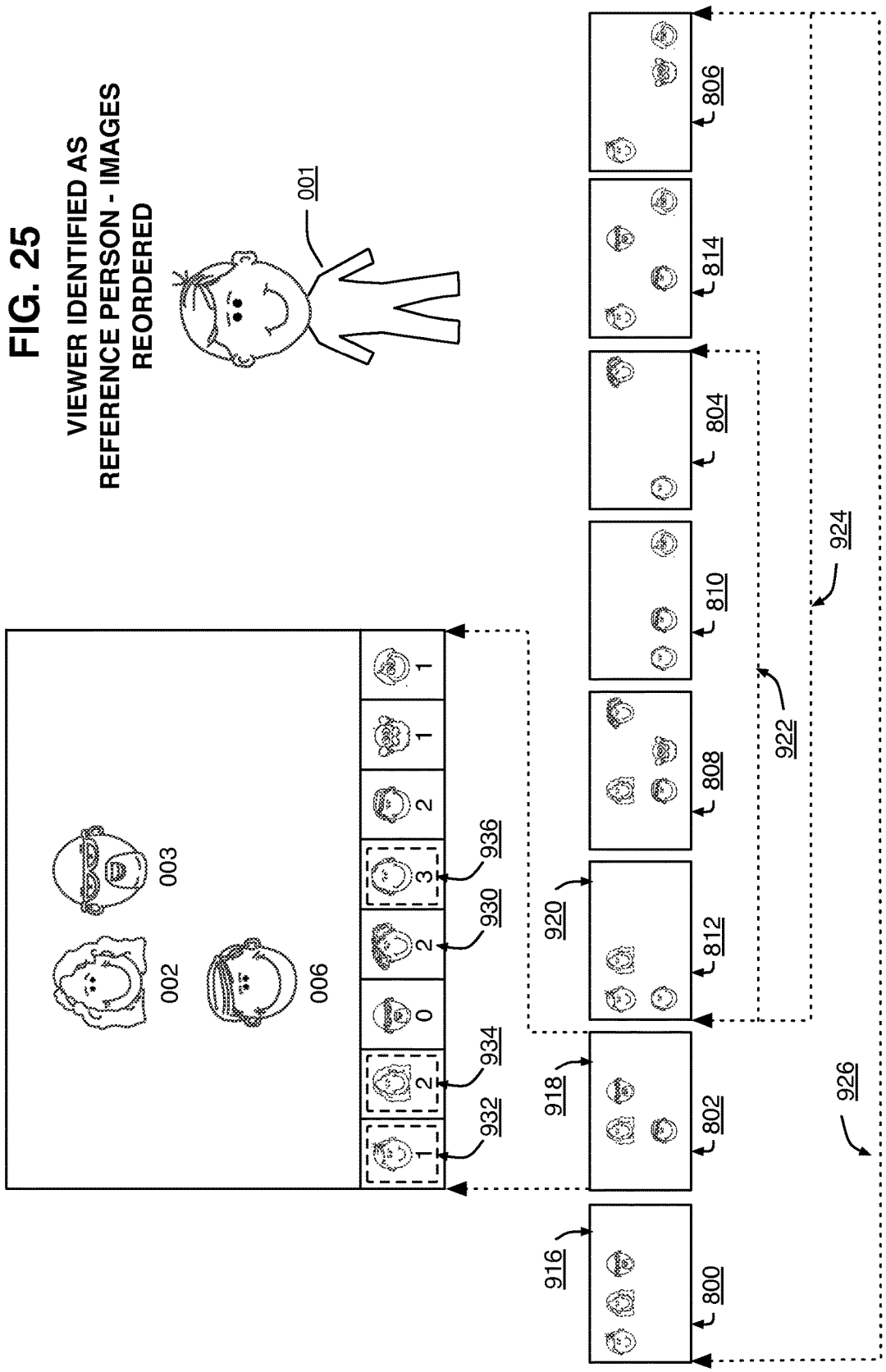

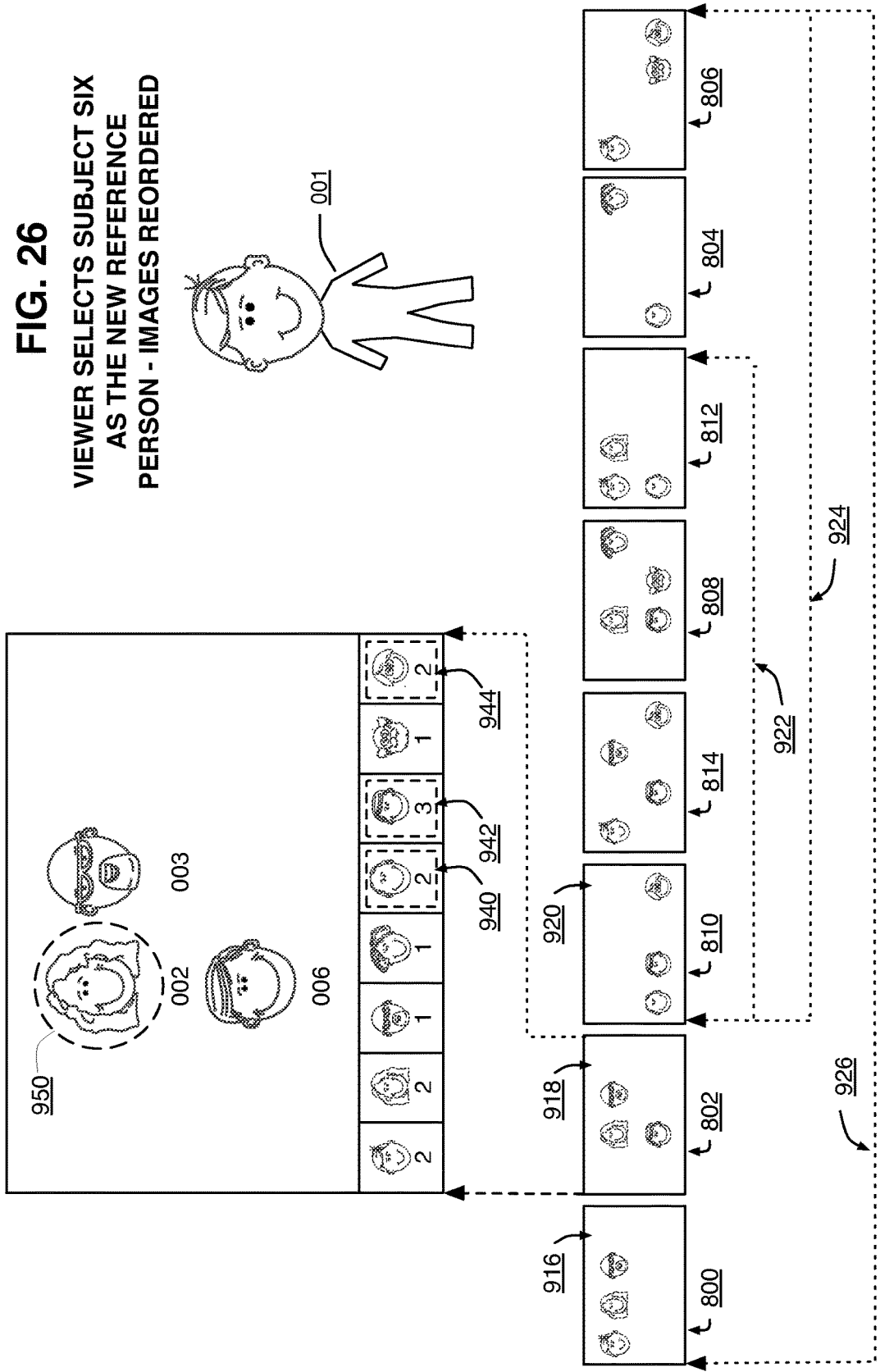

STATUS INDICATOR MODES

SUBJECT STATUS BAR SORT MODES

SORT BY SUBJECT AFFINITY

SORT BY SUBJECT OCCURRENCE COUNT

SORT BY IMAGE COUNTDOWN COUNT

SUBJECT STATUS BAR SORT MODES

SORT BY TIME COUNTDOWN COUNT

SORT BY SUBJECT PROMINENCE

SUBJECT PROMINENCE

IMAGES OCCURRING IN PROMINENCE WINDOW

FACE OCCURRENCE SIZE AND POSITION WHEN OCCURRING IN AN IMAGE

SUBJECT PROMINENCE CALCULATION RESULTS

| SUBJECT | SUBJECT PROMINECE | NORMALIZD SUBJECT PROMINENCE | STARS |
|---|---|---|---|
| 2 | 0.13 | 1.00 | 4 |
| 6 | 0.13 | 1.00 | 4 |
| 5 | 0.09 | 0.75 | 3 |
| 4 | 0.06 | 0.50 | 2 |
| 7 | 0.06 | 0.50 | 2 |
| 1 | 0.03 | 0.25 | 1 |
| 8 | 0.03 | 0.25 | 1 |
| 3 | 0.00 | 0.00 | 0 |

FIG. 29C

| SUBJECT | IMAGE | ZONE | ZONE VALUE | FACE SIZE RATIO | FACE SIZE RATIO VALUE | SUBJECT PROMINENCE | SUBJECT PROMINENCE TOTAL |
|---|---|---|---|---|---|---|---|
| 1 | 818 | B | 0.50 | 0.05 | 0.06 | 0.03 | 0.03 |
|   | 808 | - | - | - | - | 0.00 |   |
|   | 810 | - | - | - | - | 0.00 |   |
|   | 804 | - | - | - | - | 0.00 |   |
| 2 | 818 | A | 1.00 | 0.05 | 0.06 | 0.06 | 0.13 |
|   | 808 | A | 1.00 | 0.05 | 0.06 | 0.06 |   |
|   | 810 | - | - | - | - | 0.00 |   |
|   | 804 | - | - | - | - | 0.00 |   |
| 3 | 818 | - | - | - | - | 0.00 | 0.00 |
|   | 808 | - | - | - | - | 0.00 |   |
|   | 810 | - | - | - | - | 0.00 |   |
|   | 804 | - | - | - | - | 0.00 |   |
| 4 | 818 | - | - | - | - | 0.00 | 0.06 |
|   | 808 | B | 0.50 | 0.05 | 0.06 | 0.03 |   |
|   | 810 | - | - | - | - | 0.00 |   |
|   | 804 | B | 0.50 | 0.05 | 0.06 | 0.03 |   |
| 5 | 818 | B | 0.50 | 0.05 | 0.06 | 0.03 | 0.09 |
|   | 808 | - | - | - | - | 0.00 |   |
|   | 810 | B | 0.50 | 0.05 | 0.06 | 0.03 |   |
|   | 804 | B | 0.50 | 0.05 | 0.06 | 0.03 |   |
| 6 | 818 | - | - | - | - | 0.00 | 0.13 |
|   | 808 | A | 1.00 | 0.05 | 0.06 | 0.06 |   |
|   | 810 | A | 1.00 | 0.05 | 0.06 | 0.06 |   |
|   | 804 | - | - | - | - | 0.00 |   |
| 7 | 818 | - | - | - | - | 0.00 | 0.06 |
|   | 808 | A | 1.00 | 0.05 | 0.06 | 0.06 |   |
|   | 810 | - | - | - | - | 0.00 |   |
|   | 804 | - | - | - | - | 0.00 |   |
| 8 | 818 | - | - | - | - | 0.00 | 0.03 |
|   | 808 | - | - | - | - | 0.00 |   |
|   | 810 | B | 0.50 | 0.05 | 0.06 | 0.03 |   |
|   | 804 | - | - | - | - | 0.00 |   |

FIG. 29D: SUBJECT PROMINENCE INTERMEDIATE CALCULATIONS

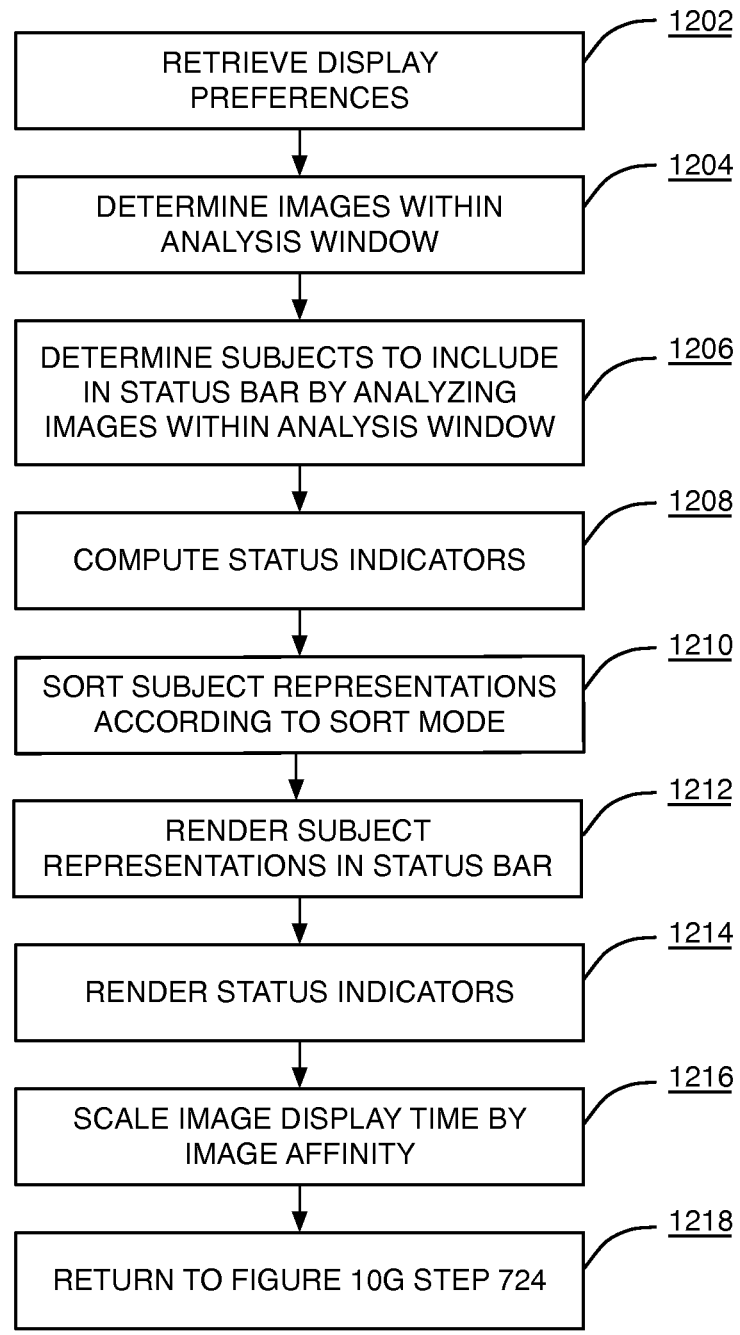

PROVIDING SUBJECT INFORMATION REGARDING UPCOMING IMAGES ON A DISPLAY

CROSS REFERENCE TO RELATED APPLICATIONS

This application is related to U.S. patent application Ser. No. 12/703,846, entitled IMPROVING DISPLAY DEVICE CONTENT SELECTION THROUGH VIEWER IDENTIFICATION AND AFFINITY PREDICTION which was filed Feb. 11, 2010 and is commonly owned and assigned and are hereby incorporated herein by reference in its entirety.

This application is also related to U.S. patent application Ser. No. 12/703,871, entitled MATCHING SUBJECTS IN A COLLECTION OF IMAGES TO USERS OF A CENTRAL SYSTEM which was filed Feb. 11, 2010 and is commonly owned and assigned and are hereby incorporated herein by reference in its entirety.

FIELD OF THE DISCLOSURE

The present disclosure relates to customizing a content selection to present on a display device based on identifying a viewer of the device. In one embodiment, the present disclosure relates to selecting from among a group of digital images, those images that are most likely to be of interest to the viewer. In general, many of the images available to the display device will be comprised of images containing subject faces. The subject faces present in each of the images are resolved, and used to produce a face index containing a unique entry for each subject face contained in the collection, plus the face of the viewer. In one embodiment, this face index is electronically transmitted to a central system and each face in the index is matched with the corresponding user account of the central system. Using the relationship information present in the account records, the social distance between each identified face in the index is obtained. Using this information to predict affinity, the system operates to compute a composite score for each image in the collection by accumulating the individual affinity predictions between the viewer and each subject identified in each image. Composite scores are then used to sort the images, with the higher scoring images being selected for presentation on the display device.

BACKGROUND OF THE DISCLOSURE

With the proliferation of digital imaging content, the popularity of image display devices, and advances in face recognition and matching, there is a desire for new ways in which present images on the display device.

SUMMARY OF THE DISCLOSURE

The present disclosure relates to presenting in a user interface information regarding subject faces that will appear in upcoming images. In general, many of the images available to display will be comprised of images containing subject faces. Based on a subject affinity score between the viewer and the subjects, and image affinity is computed. Based on the image affinity scores, images are selected for presentation on the display. In one embodiment, the present disclosure relates to indexing a collection of images wherein for each image, there exists a list of the subject faces found within the image. As images are displayed, the system analyzes some portion of the upcoming images using the image index to determine the subject information to display. As each image is displayed, for each subject appearing in the current image, subject information comprised of the subjects face is shown in an area of the display adjacent to the current image. The subject information may further comprise subject status information. In some embodiments, the subject information further comprises subject prominence information. The subject prominence information may be determined as a function of a face size ratio value and a zone value.

In another embodiment of the present disclosure, a method is disclosed for maintaining a structure representing an image collection in computer memory, the method comprising the steps of: maintaining a subject index, the subject index representing a plurality of subjects that appear in a collection of images, the subject index comprising: a reference for each subject to a corresponding image of the face of the subject; a reference for each subject to each image in the collection of images in which the subjects face is found; subject affinity information, the subject affinity defining the attraction between each of the subjects in the collection of images; and image affinity information, the image affinity information defining the preference of each subject in the collection of images, to each image in the collection of images. The method further comprising maintaining an image index, the image index representing the collection of images, and containing references from each image to the plurality of subjects appearing in the image.

In another embodiment of the present disclosure, a method is disclosed comprising the steps of: obtaining an image index, the image index representing a plurality of images present in a collection of images, the image index comprising an image reference for one of more of the plurality of images, the image references comprising one or more subject references to one or more subjects found in the corresponding image; displaying in a first area of a display an image from the collection of images; and displaying in a second area of the display subject information. The image index further comprises a subject index, the subject index representing a plurality of subjects that appear in the plurality of images present in the collection of images, the subject index comprising one or more references to the one or more images in which the subject appears.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
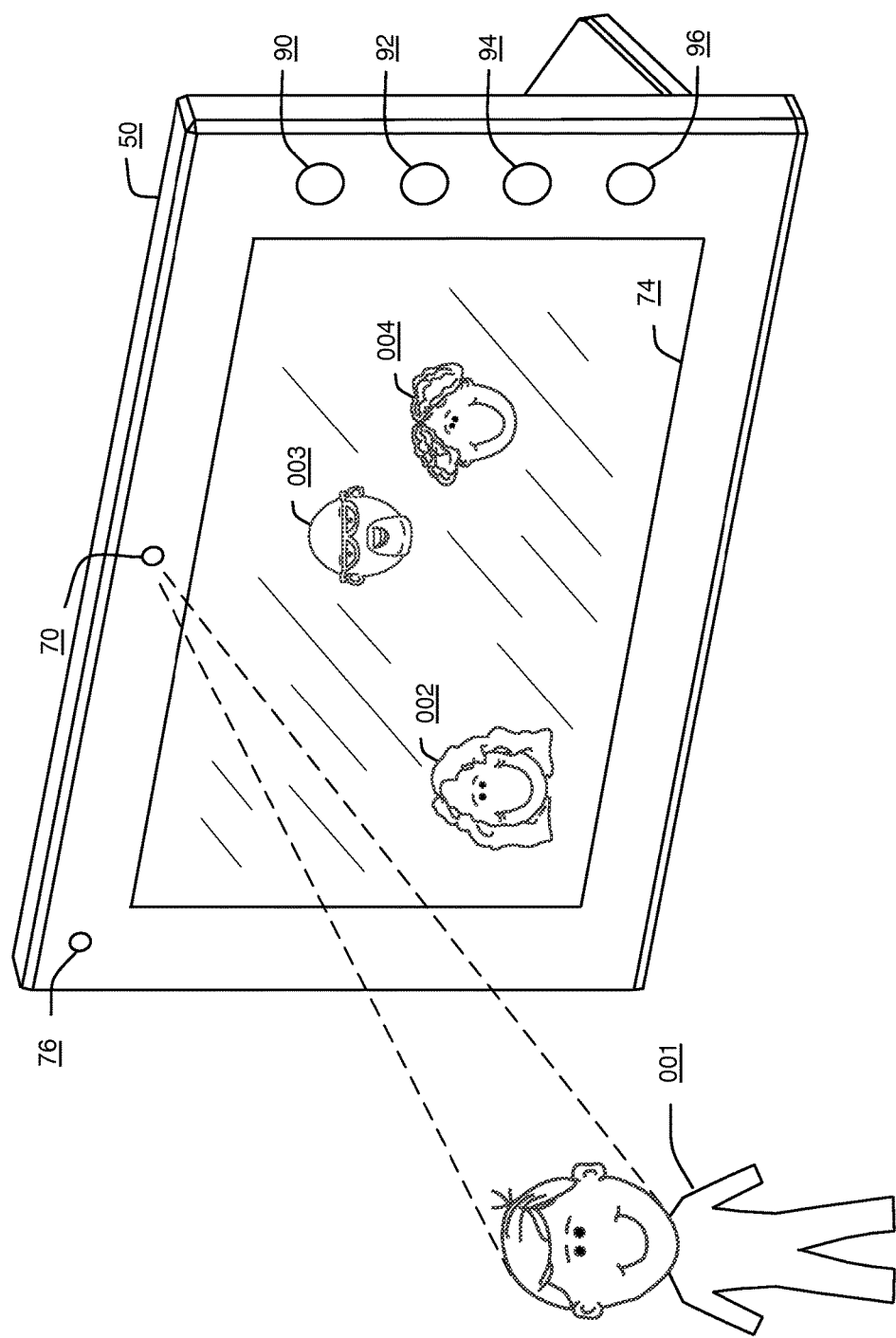
FIG. 1 illustrates a display device capable of identifying a viewer, and customizing the content shown on the display device to that viewer.
Figure 2:
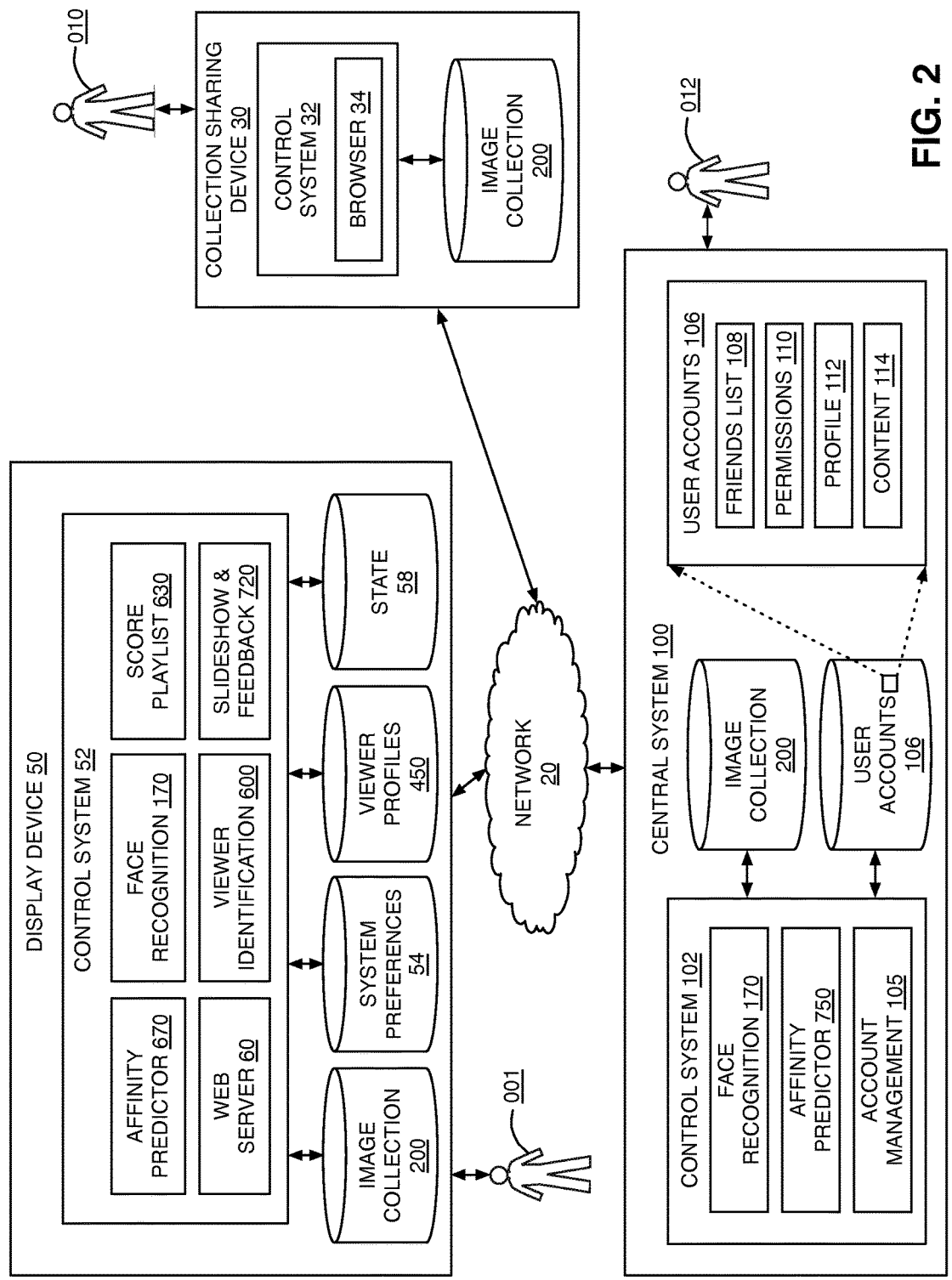
FIG. 2 illustrates a collection sharing device for providing additional content to a display device over a network, and a central system for providing affinity information between subjects found in the image content.
Figure 4B:
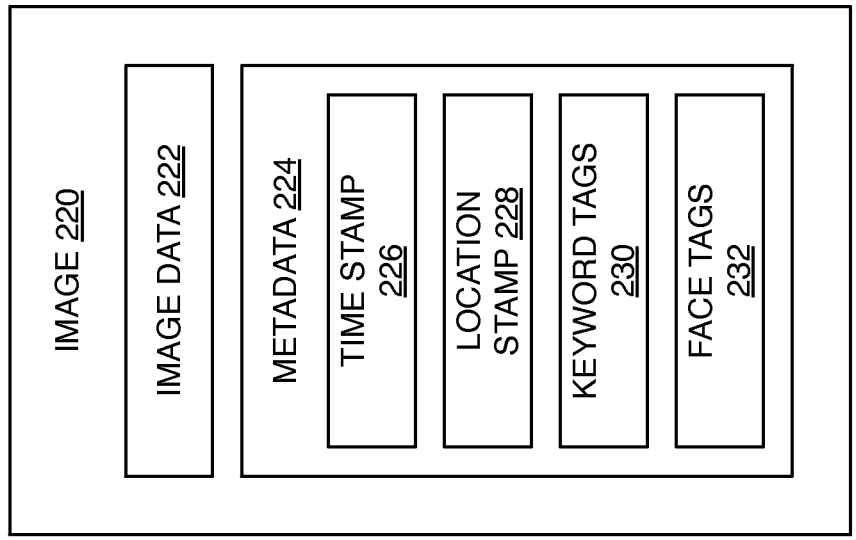
FIG. 4B is a block diagram of an exemplary embodiment of the data structure used to represent an image.
Figure 4A:
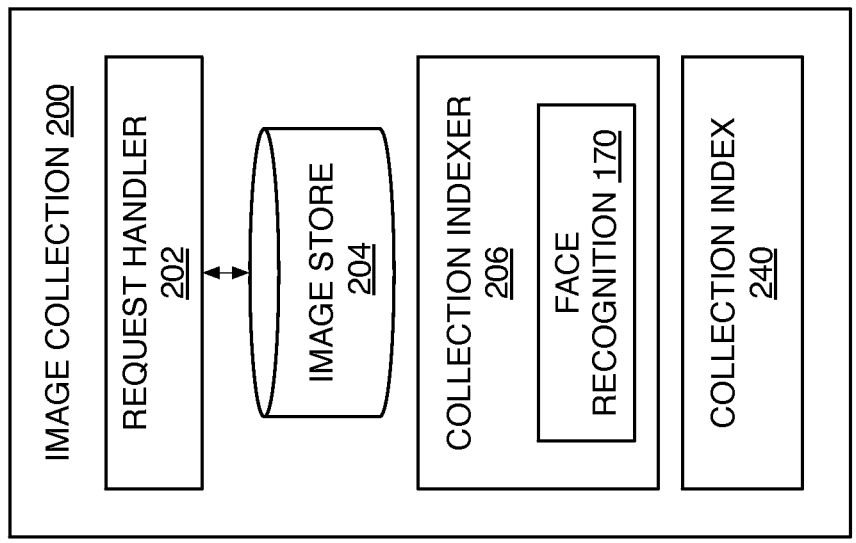
FIG. 4A is a block diagram of an exemplary embodiment of the image collection subsystem used in FIG. 2 responsible for indexing imaging content and providing the indexed data over a network to a display device.
Figure 4C:
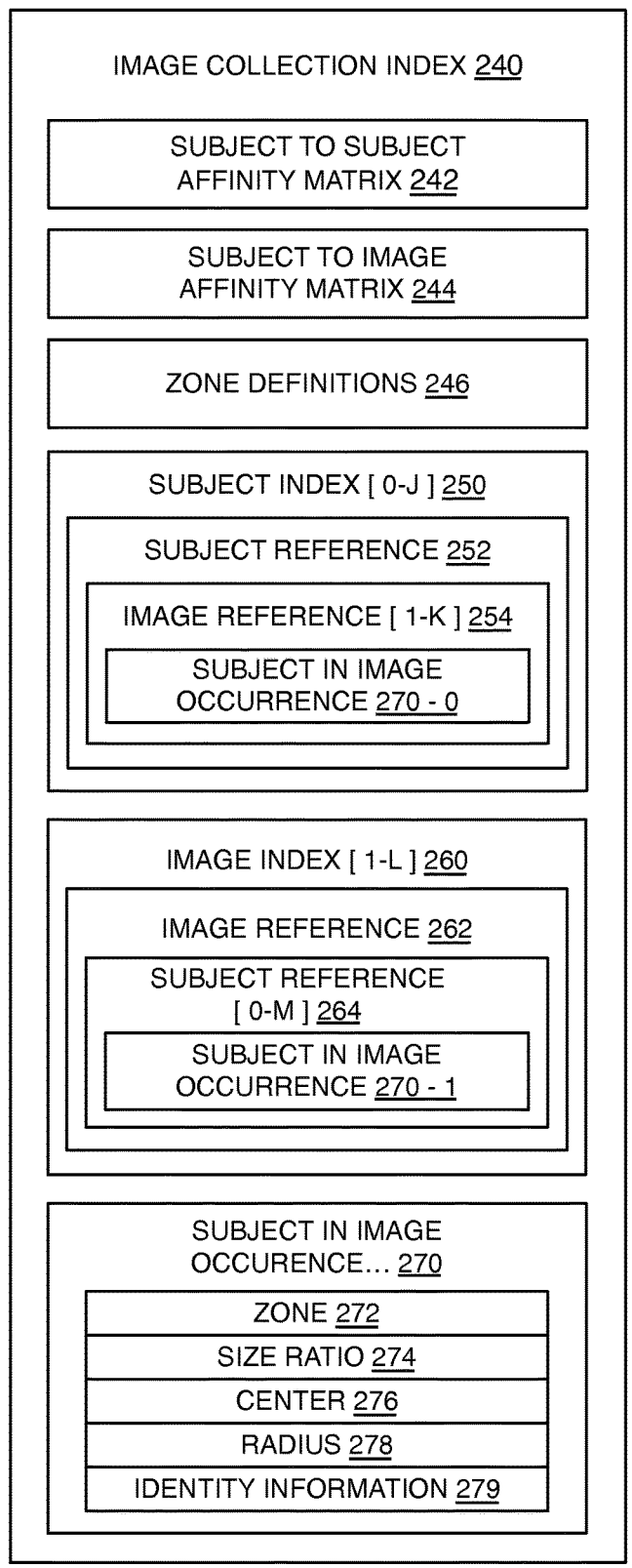
FIG. 4C is a block diagram of an exemplary embodiment of the data structure used to represent a digital image collection index as used in FIG. 4A.
Figure 4D:
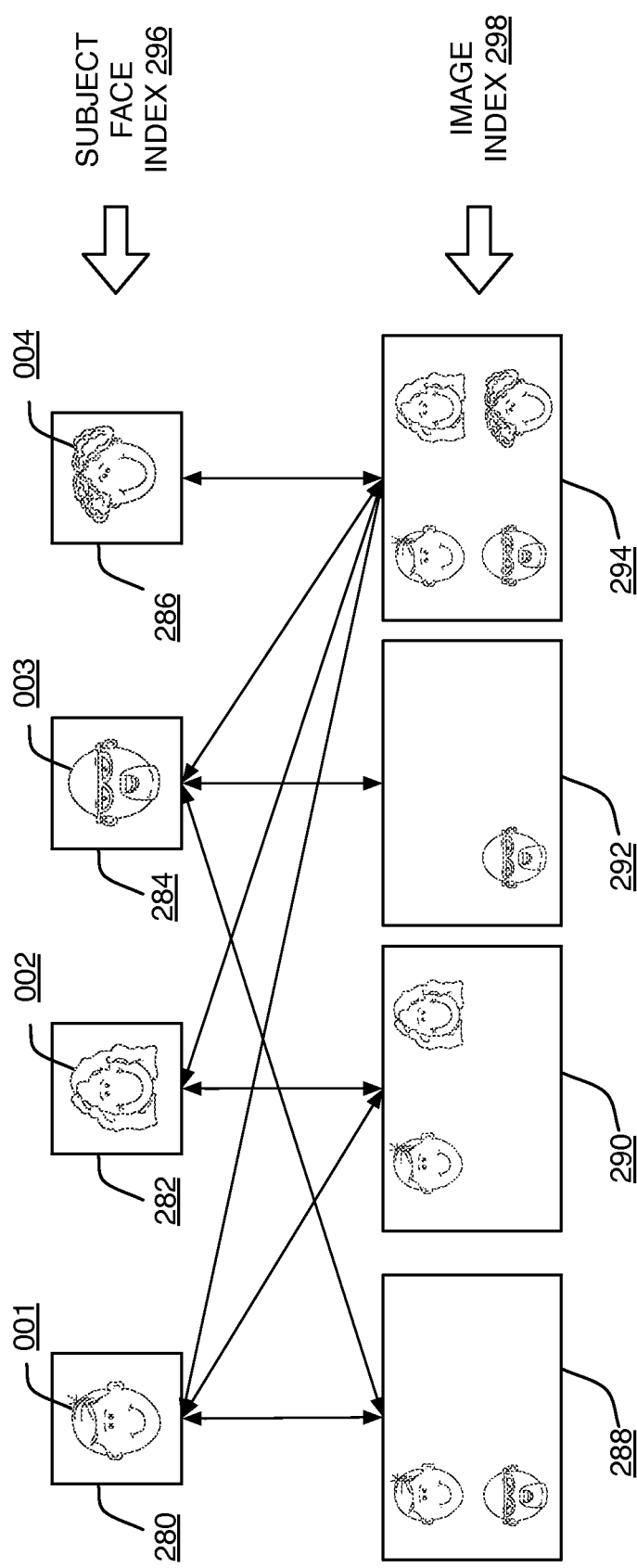
Figure 5A:
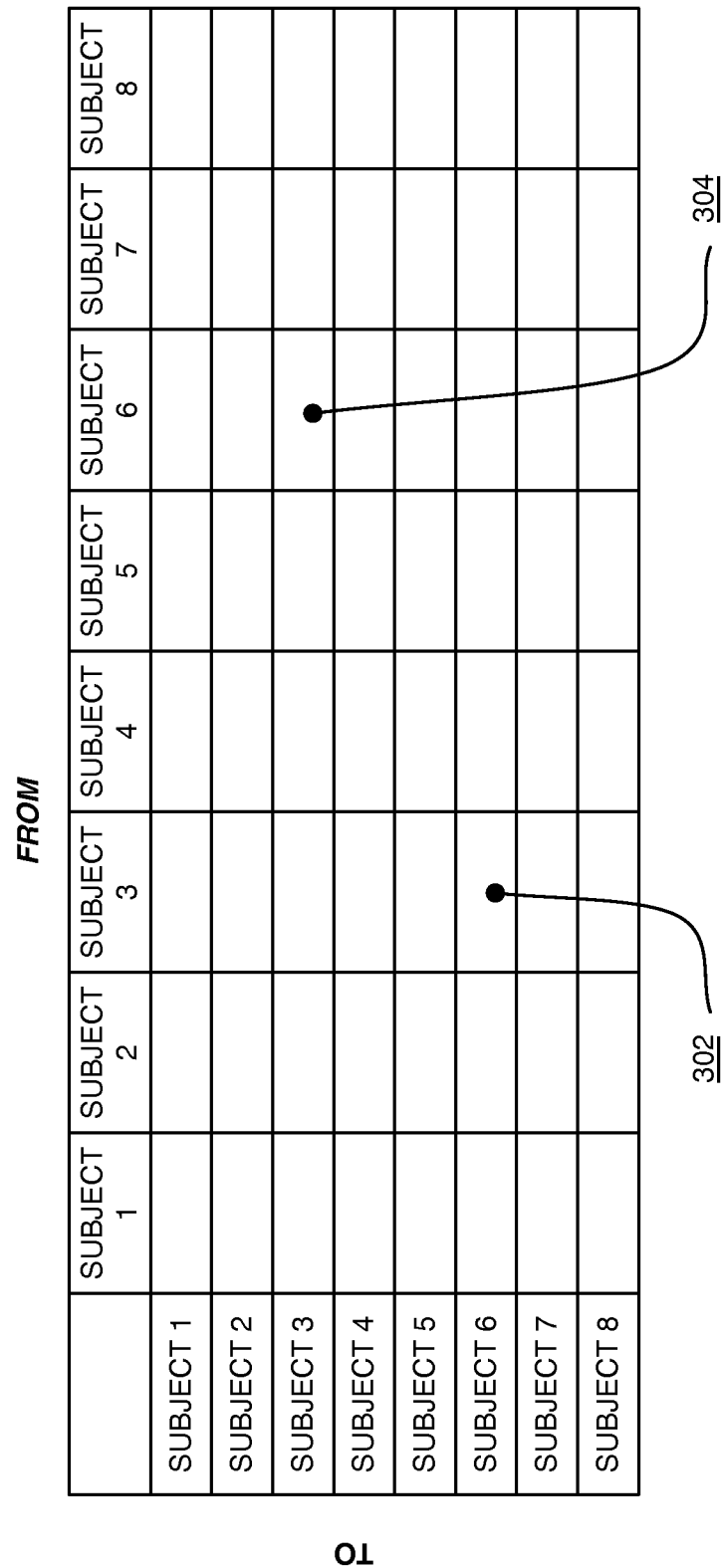
Figure 6:
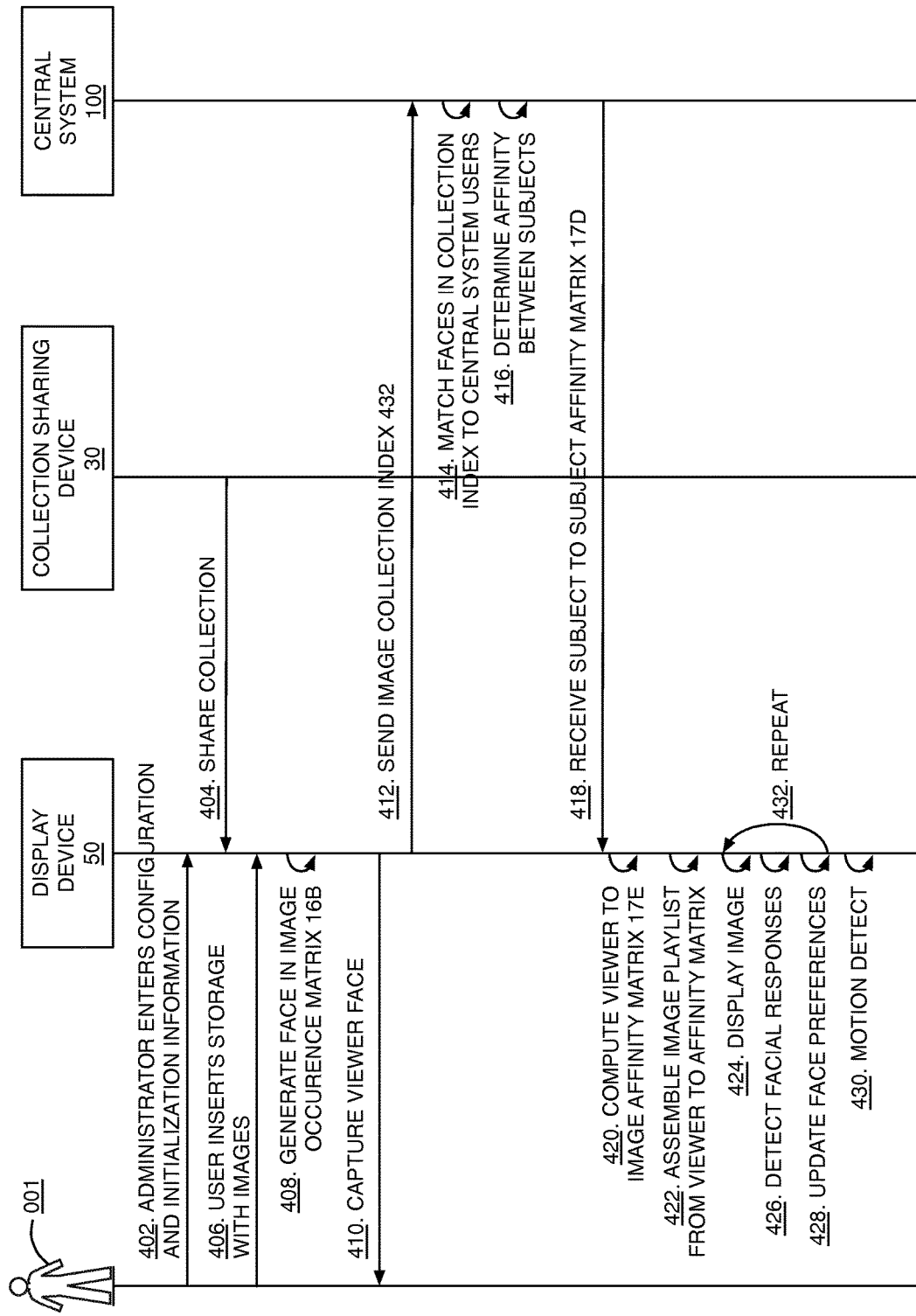
Figure 7:
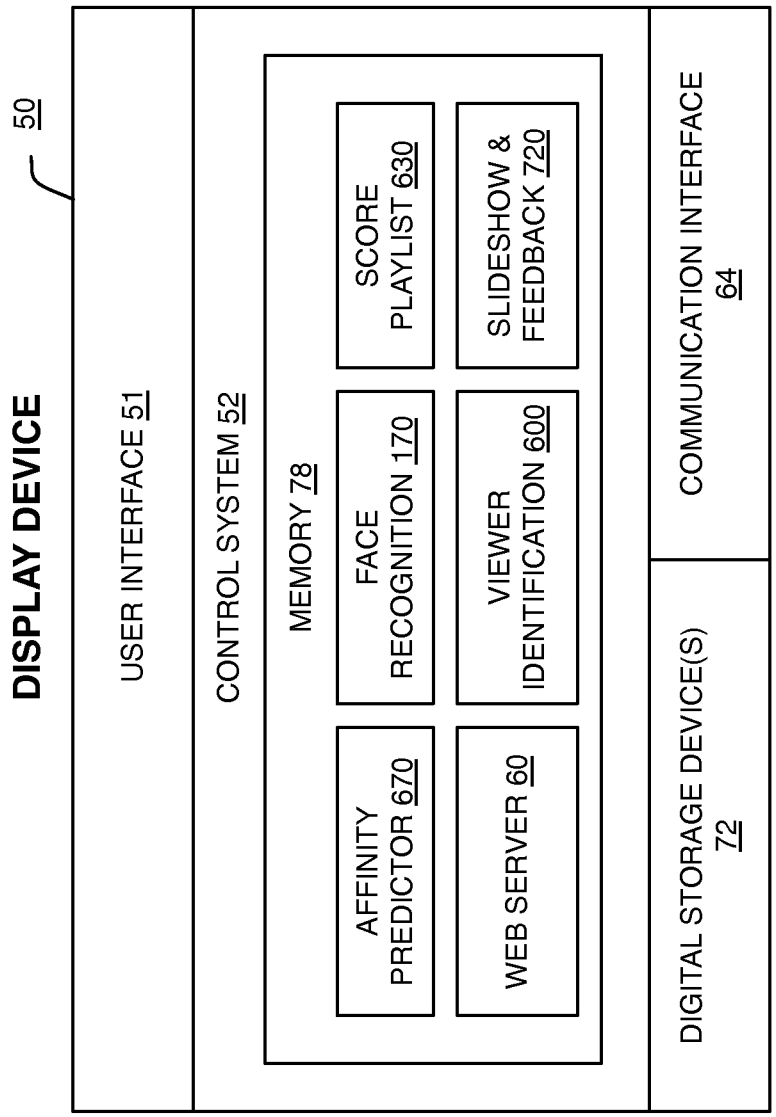
Figure 8:
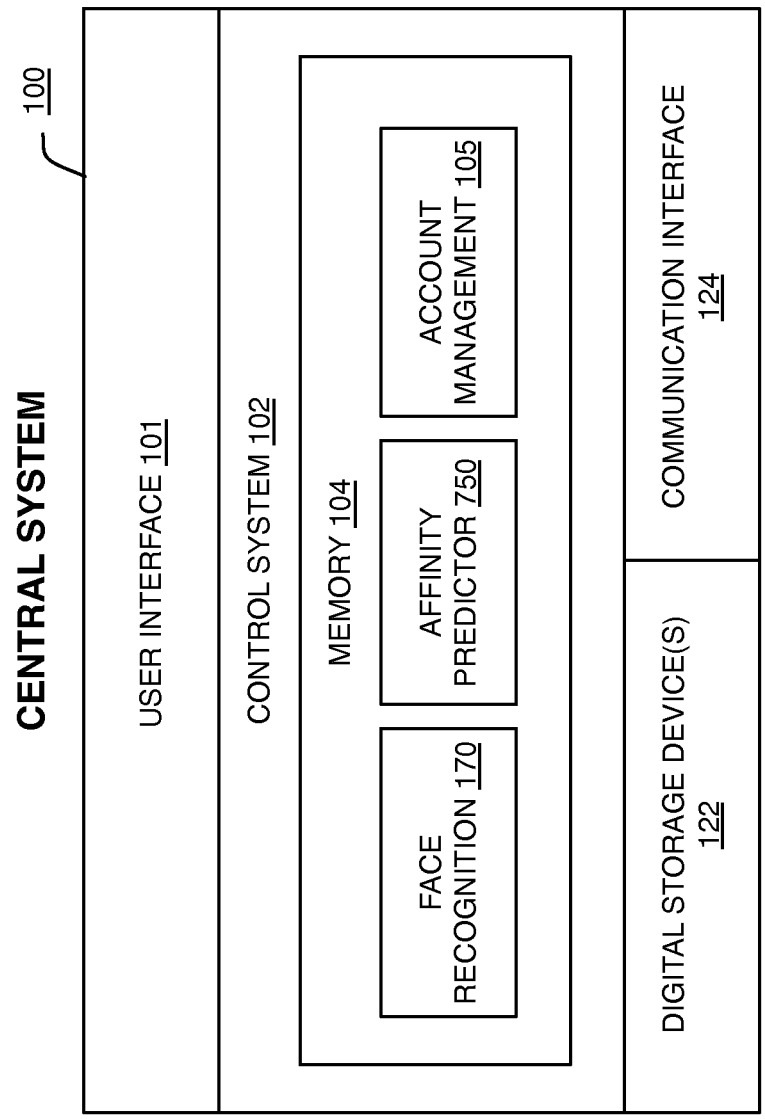
Figure 9:
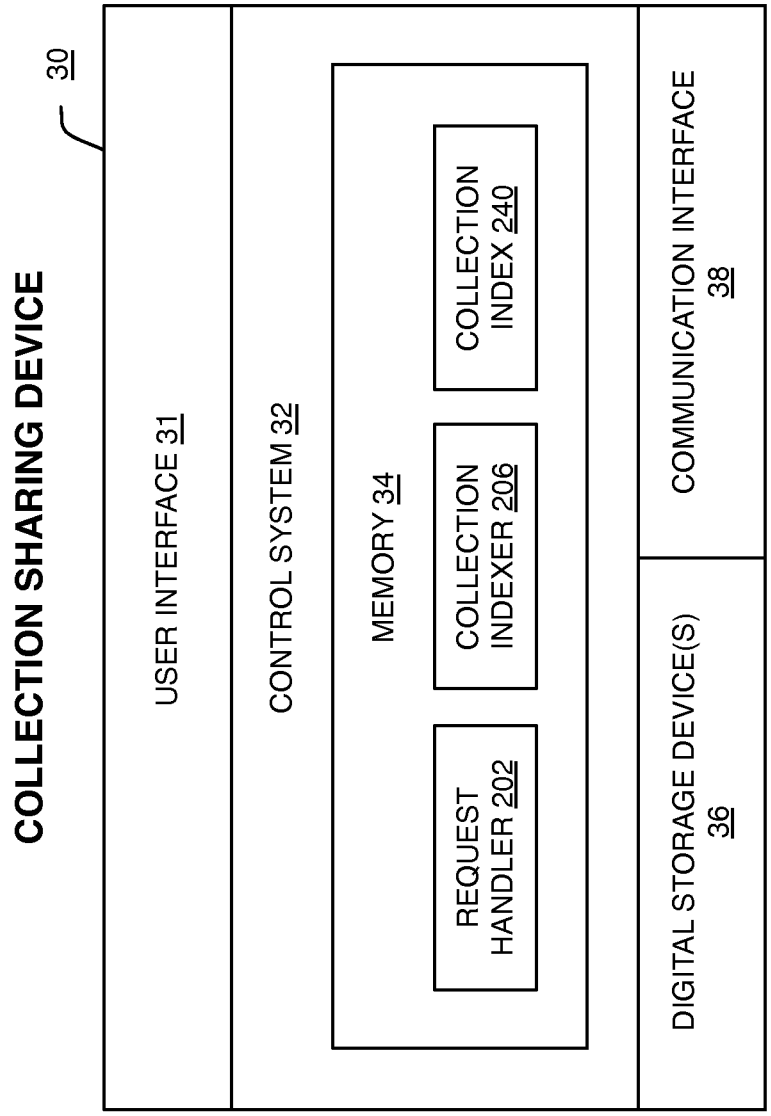
Figure 10A:
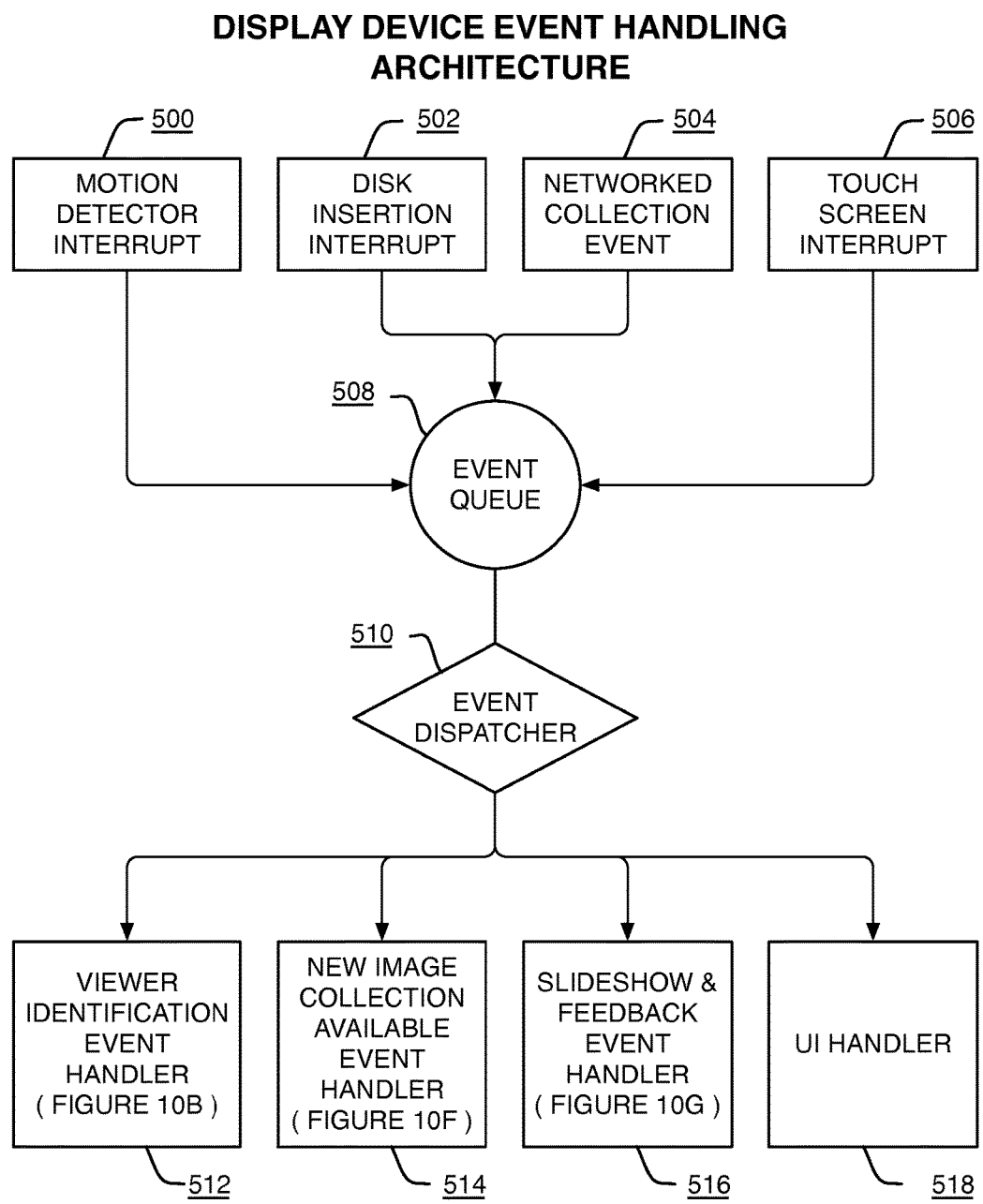
Figure 10B:
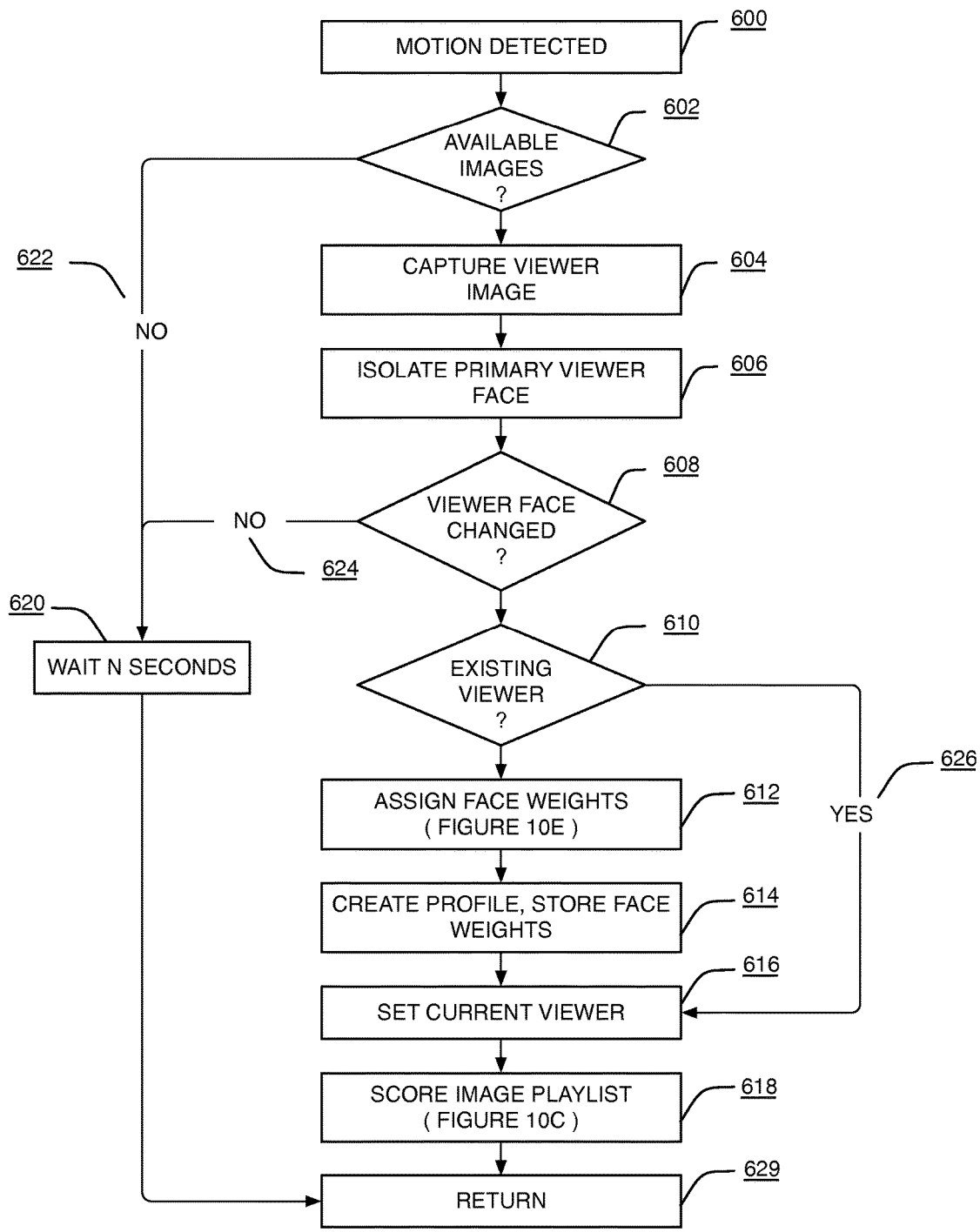
Figure 10C:
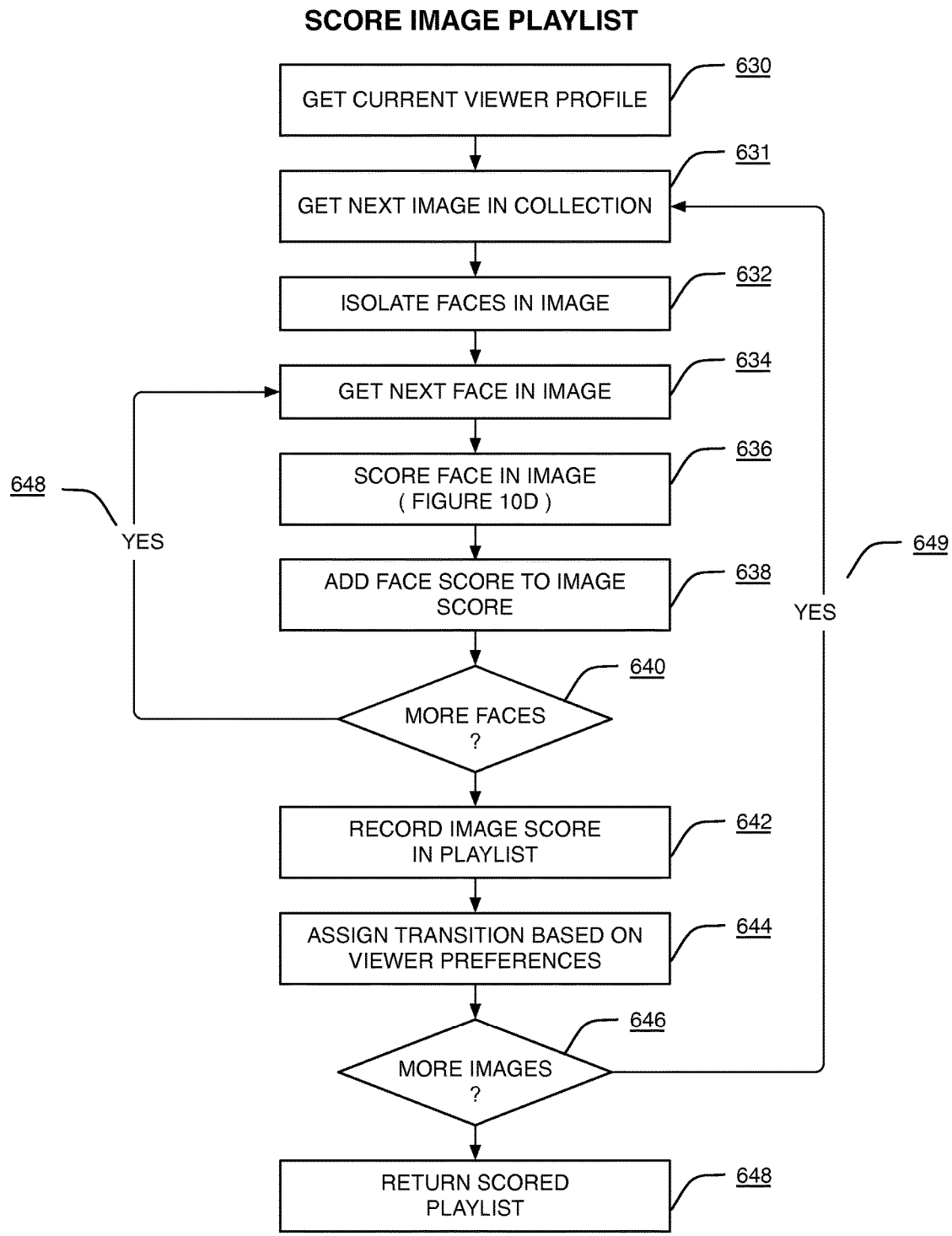
Figure 10D:
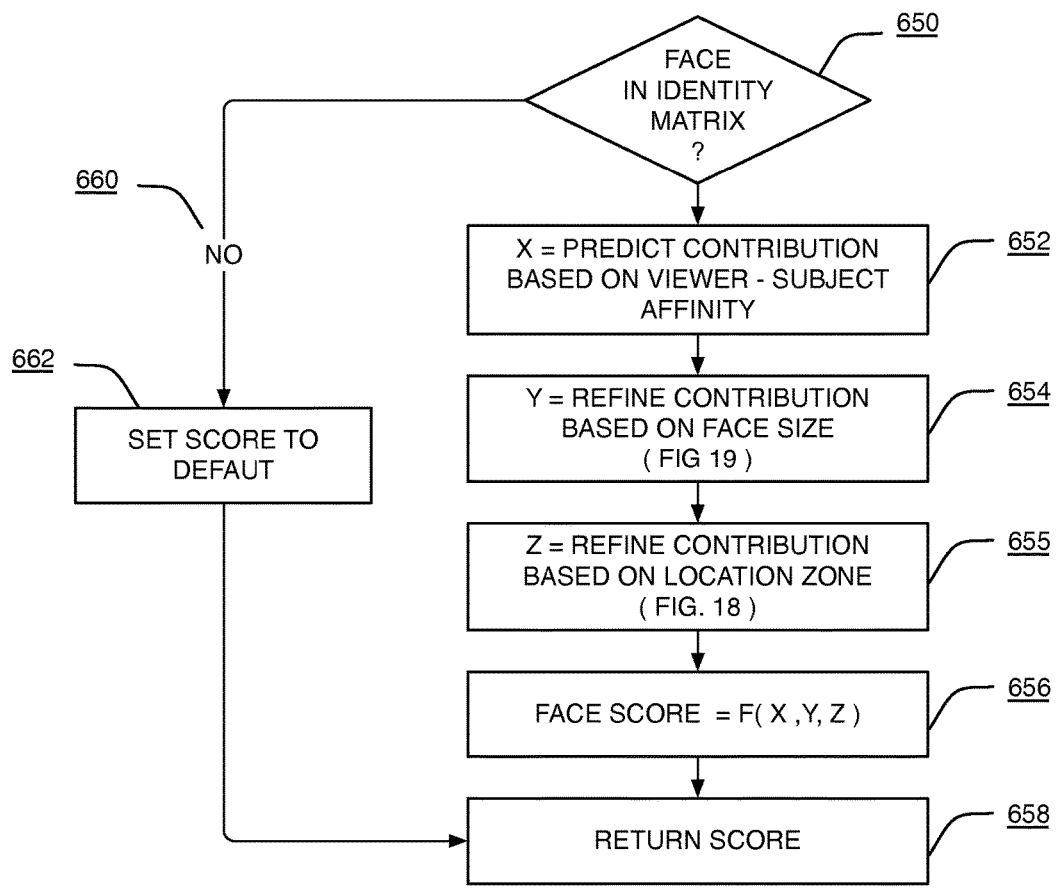
Figure 10E:
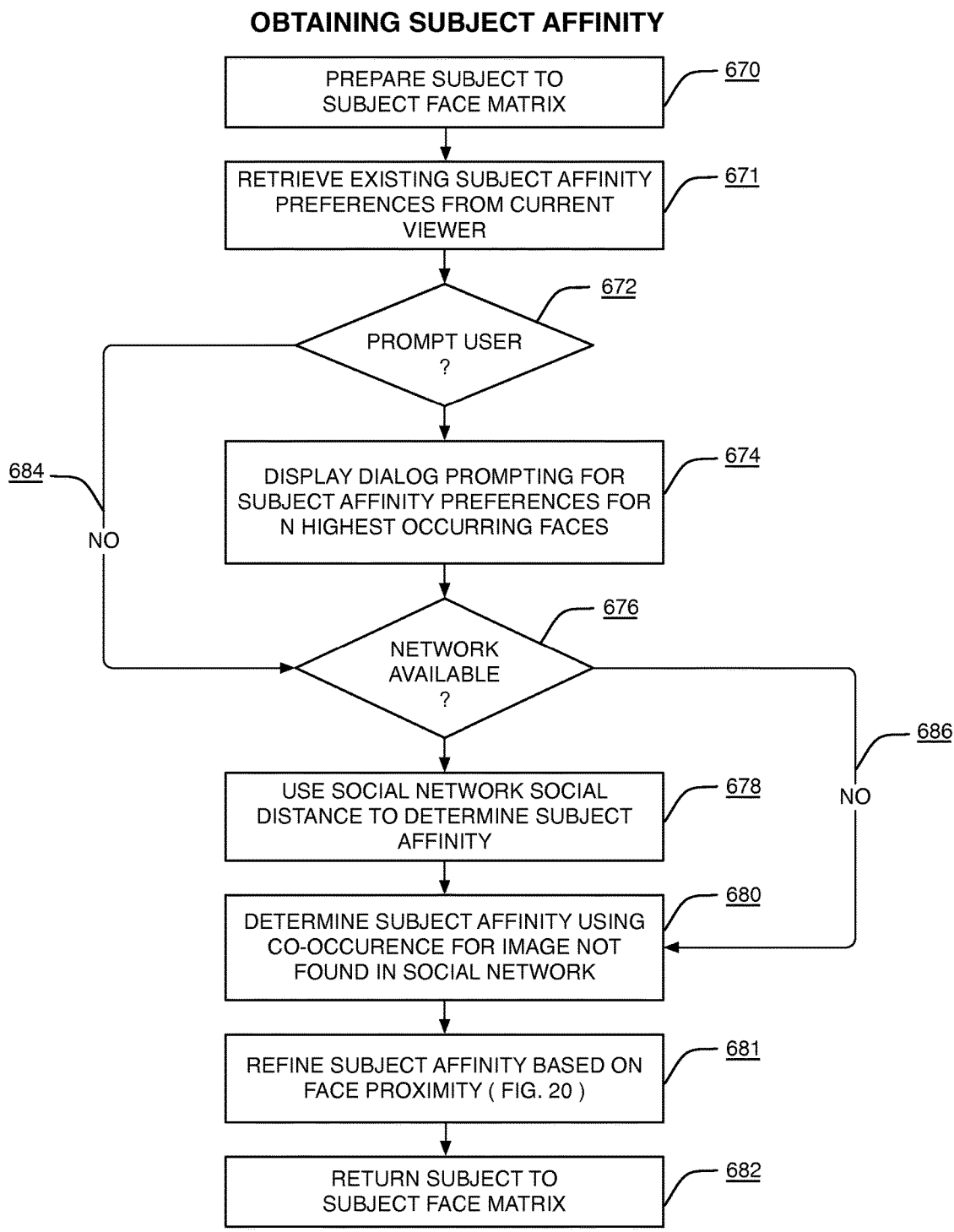
Figure 10F:
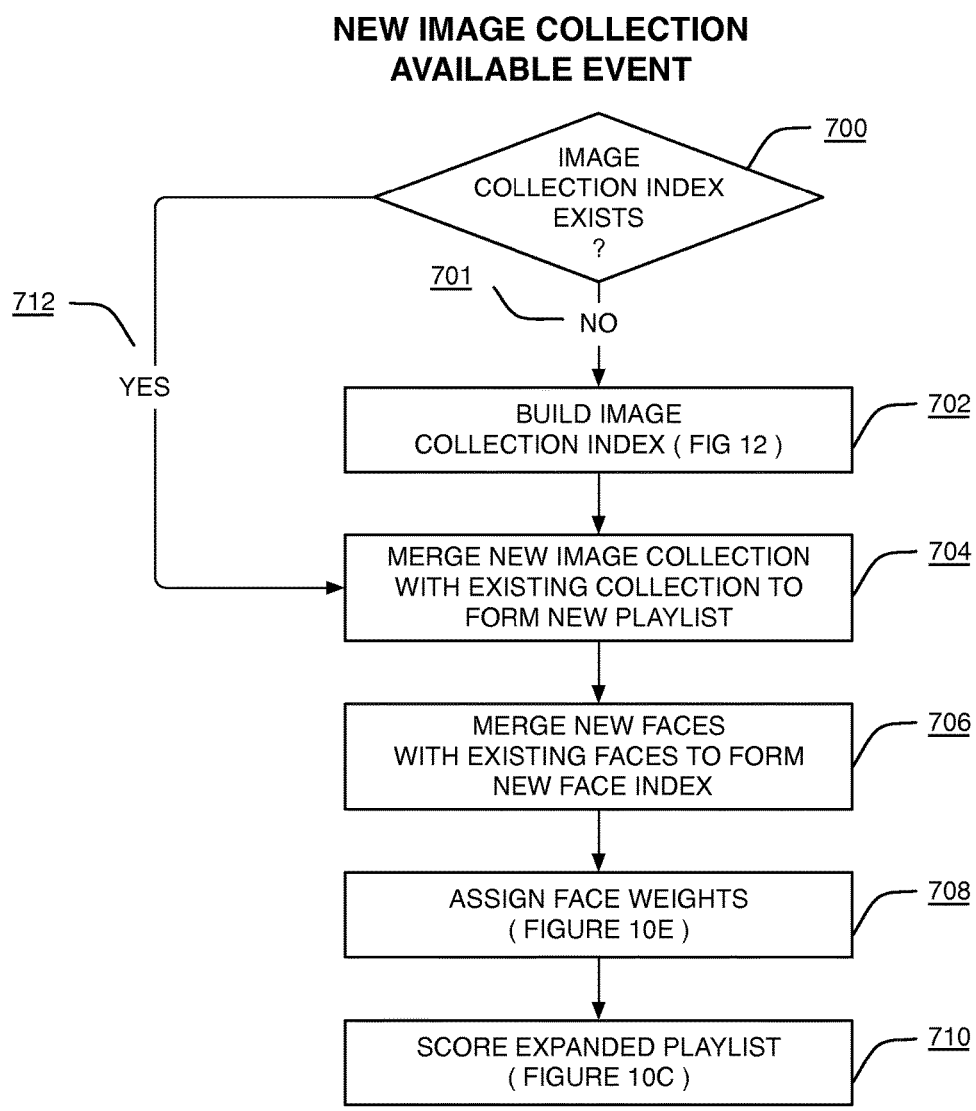
Figure 10G:
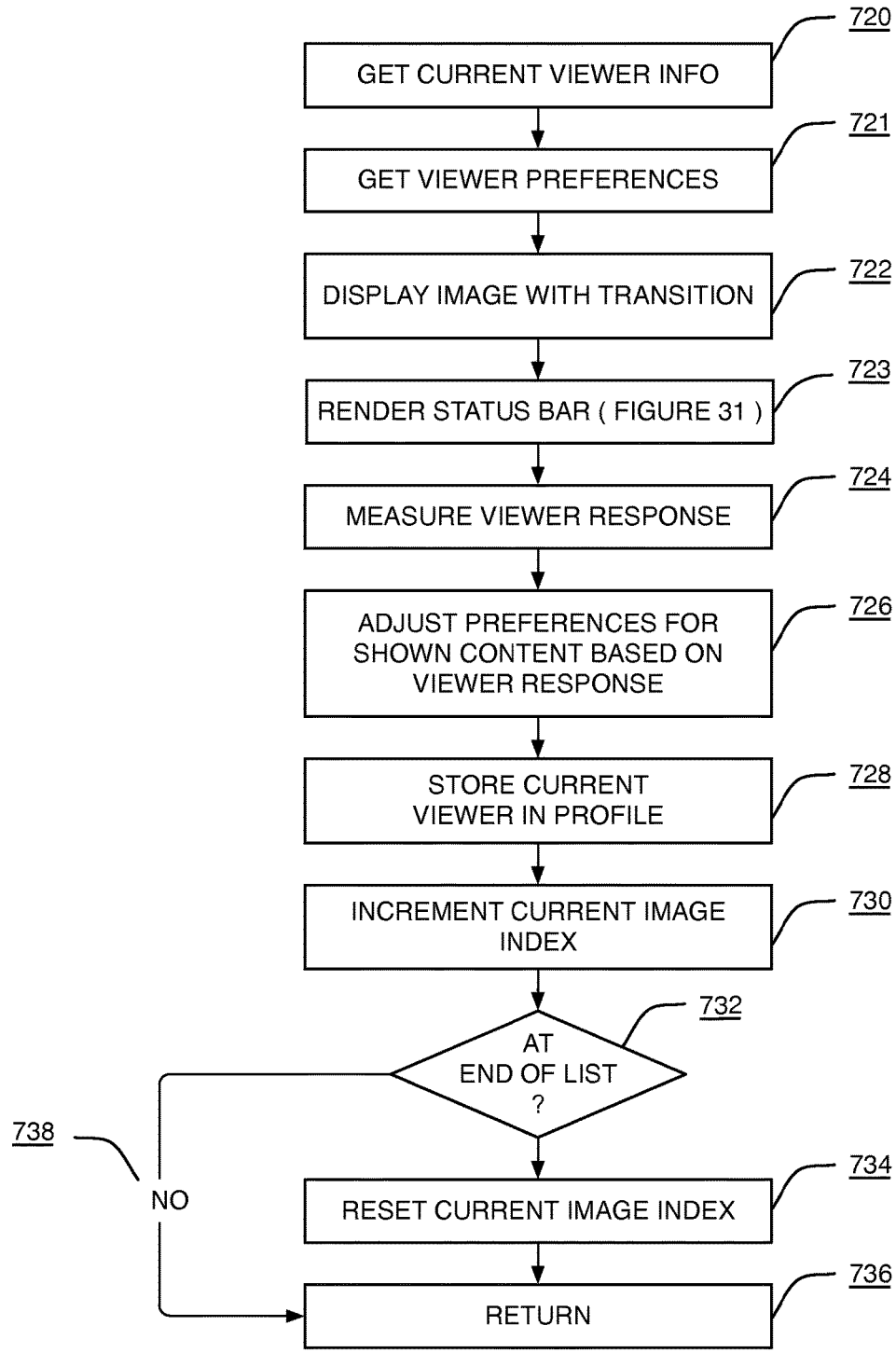
Figure 11A:
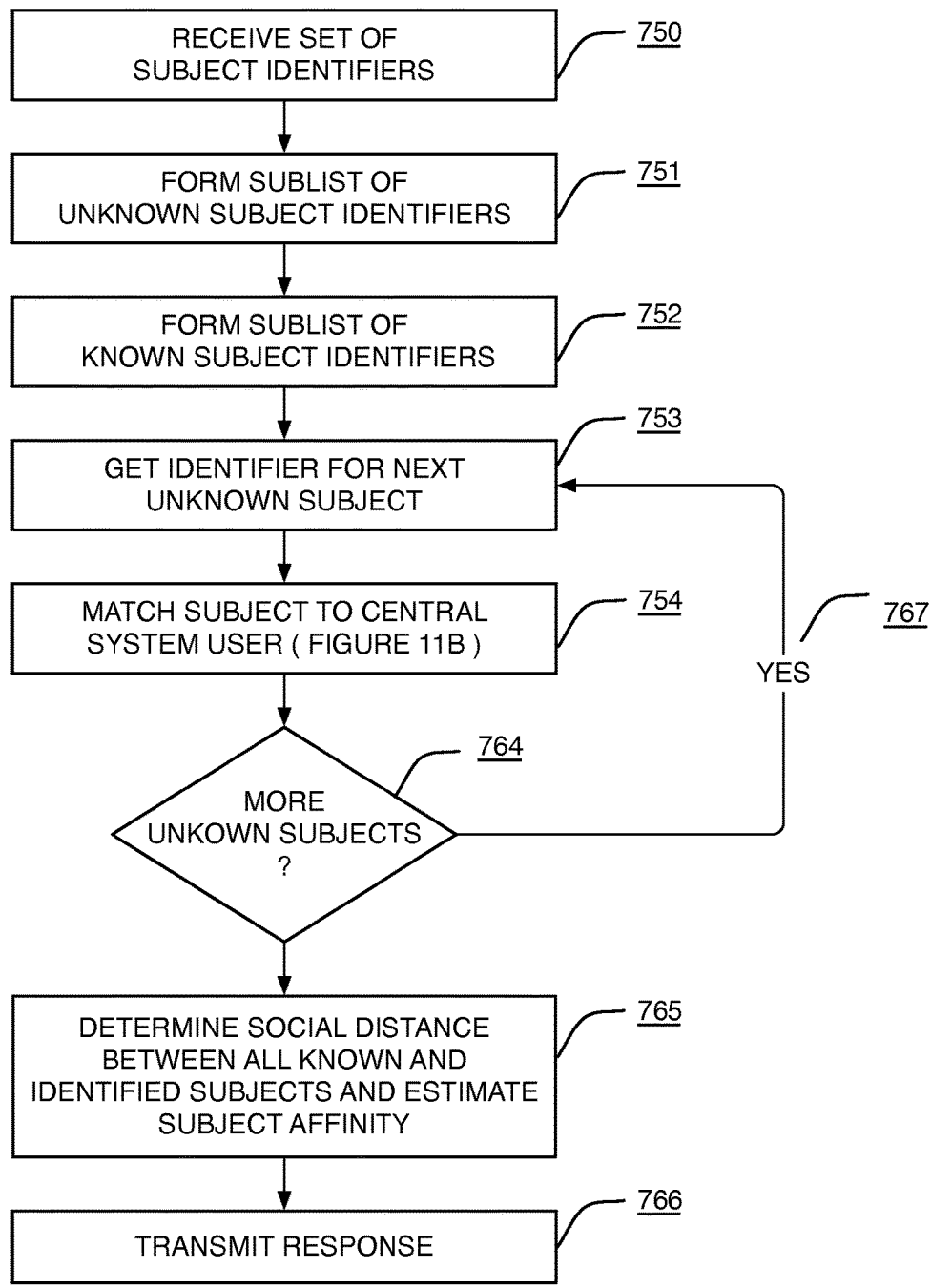
Figure 11B:
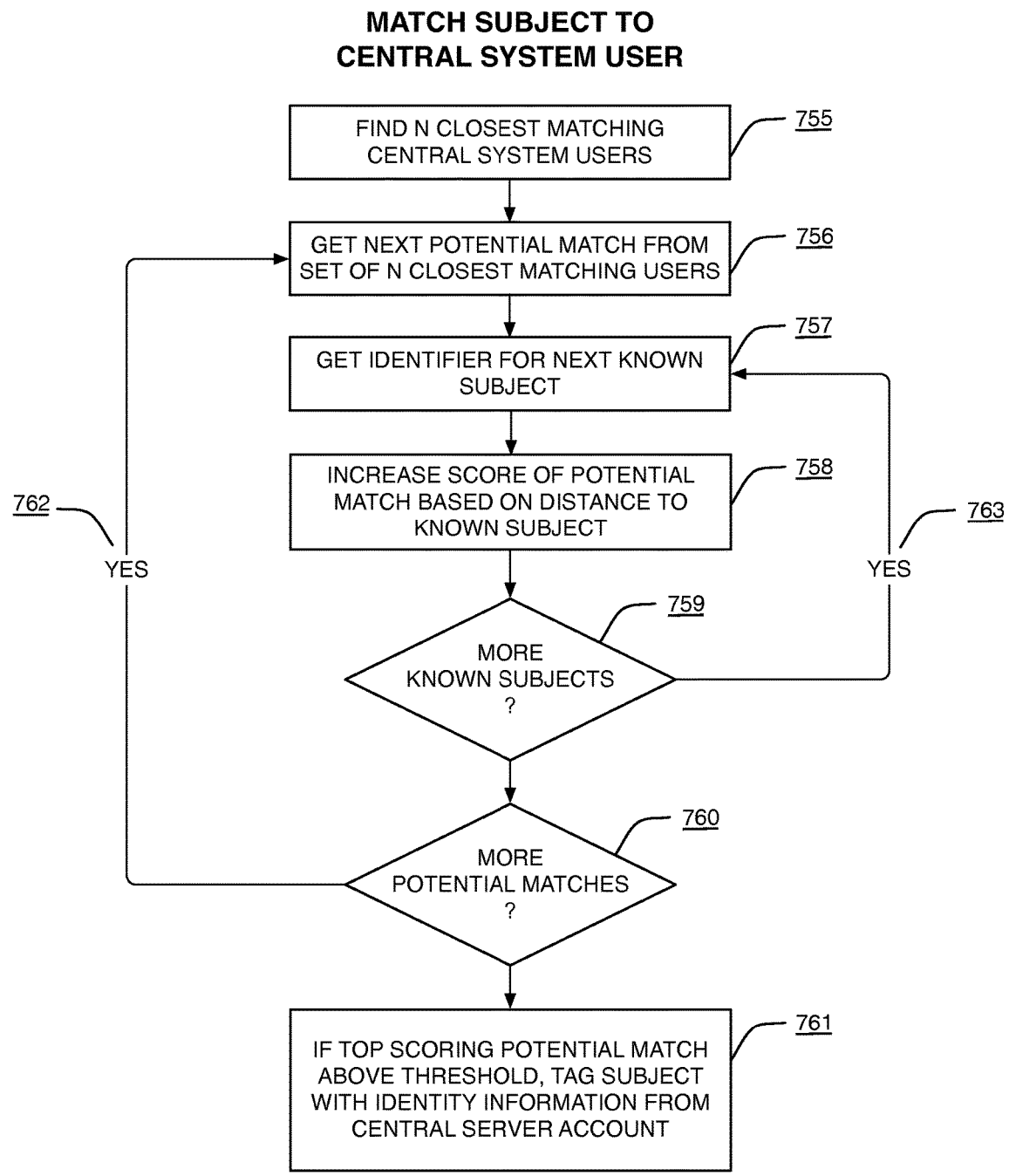
Figure 11C:
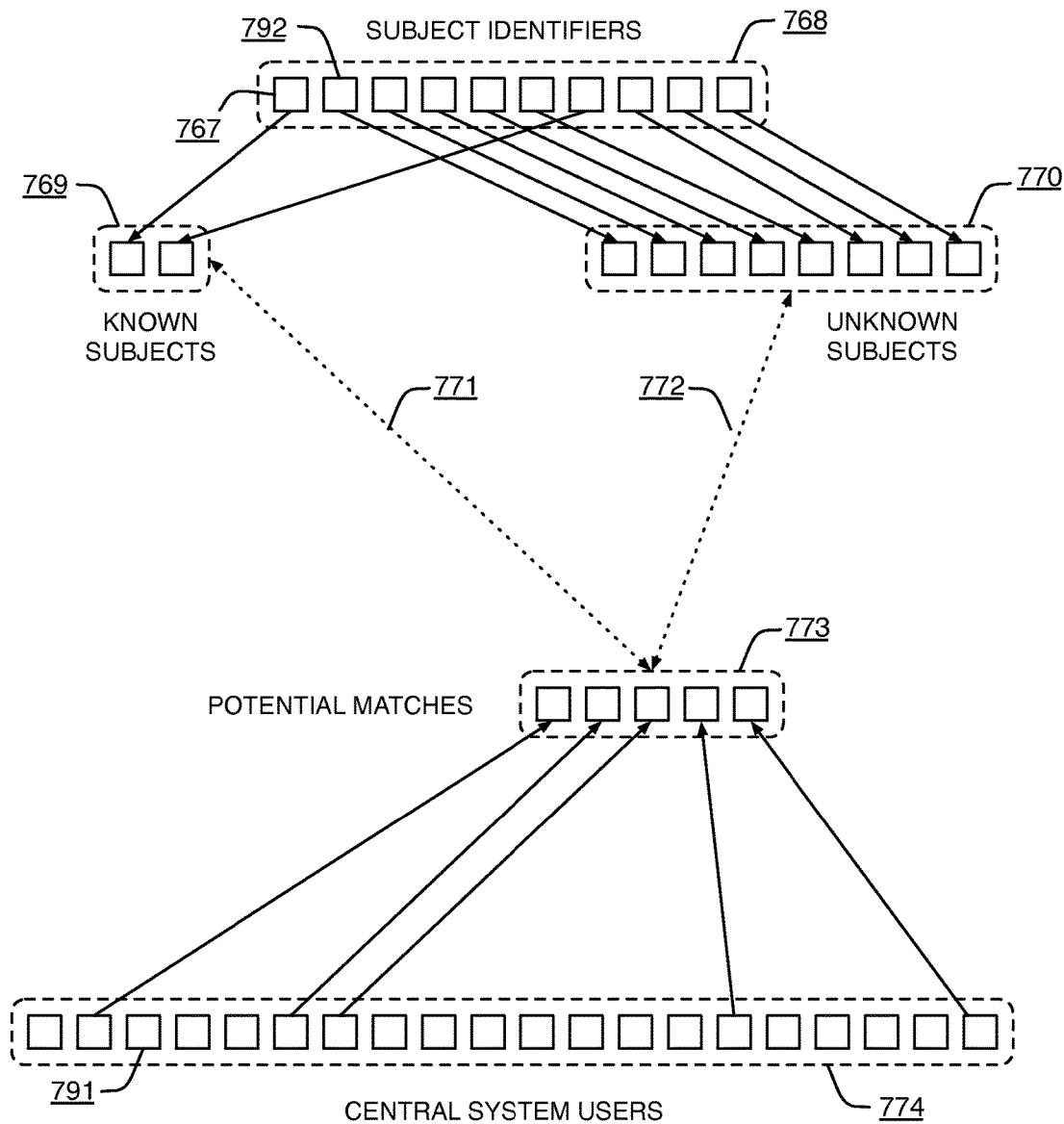
Figure 12A:
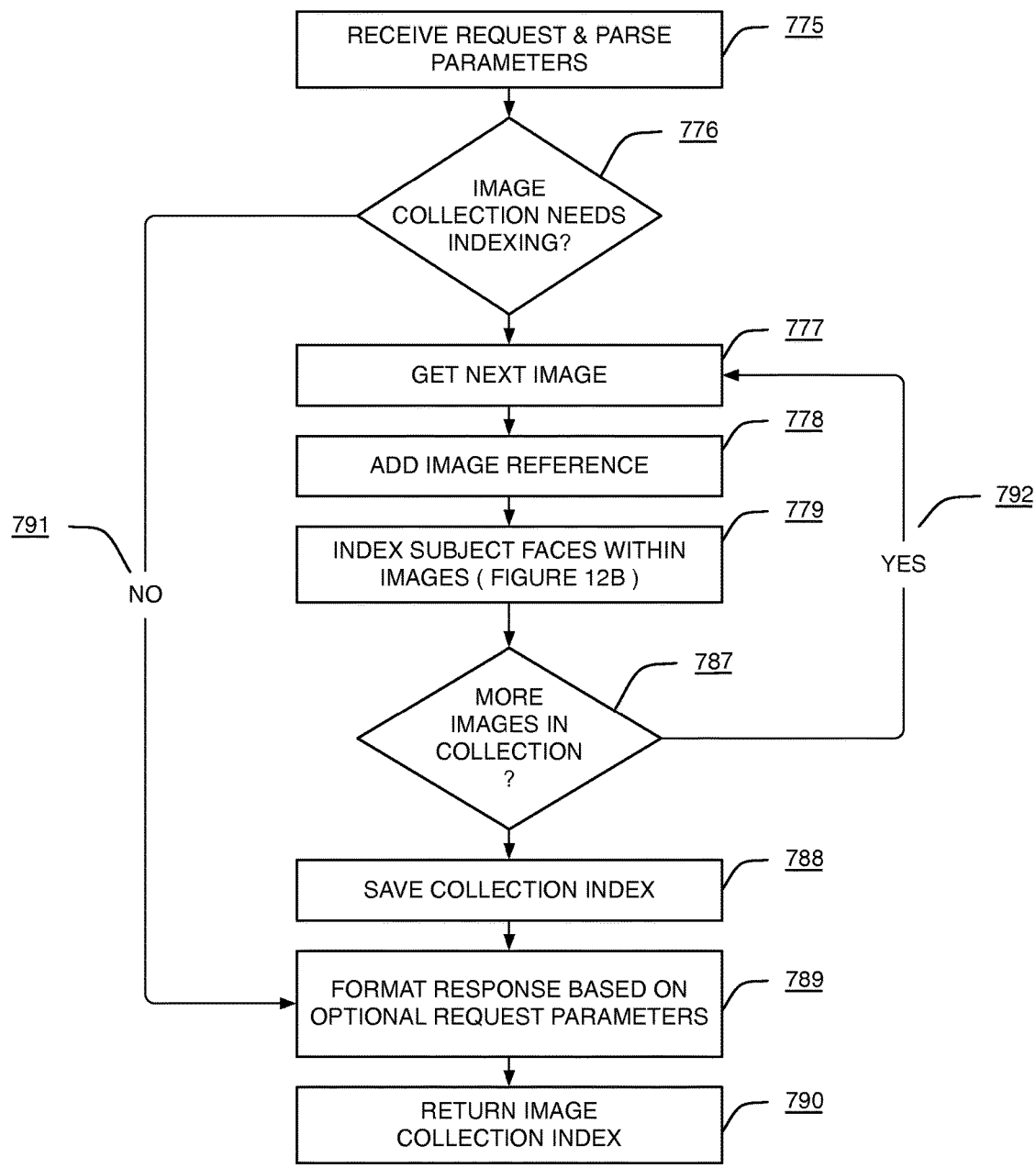
Figure 12B:
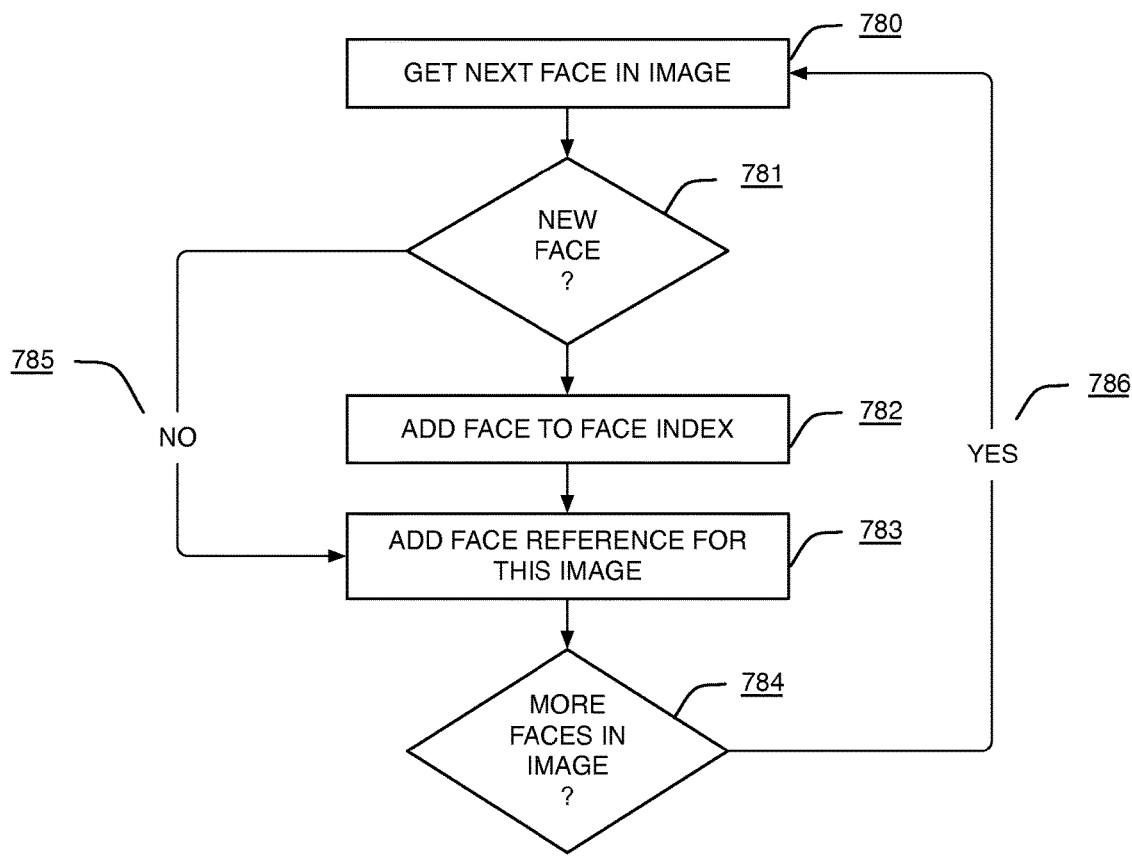
Figure 14A:
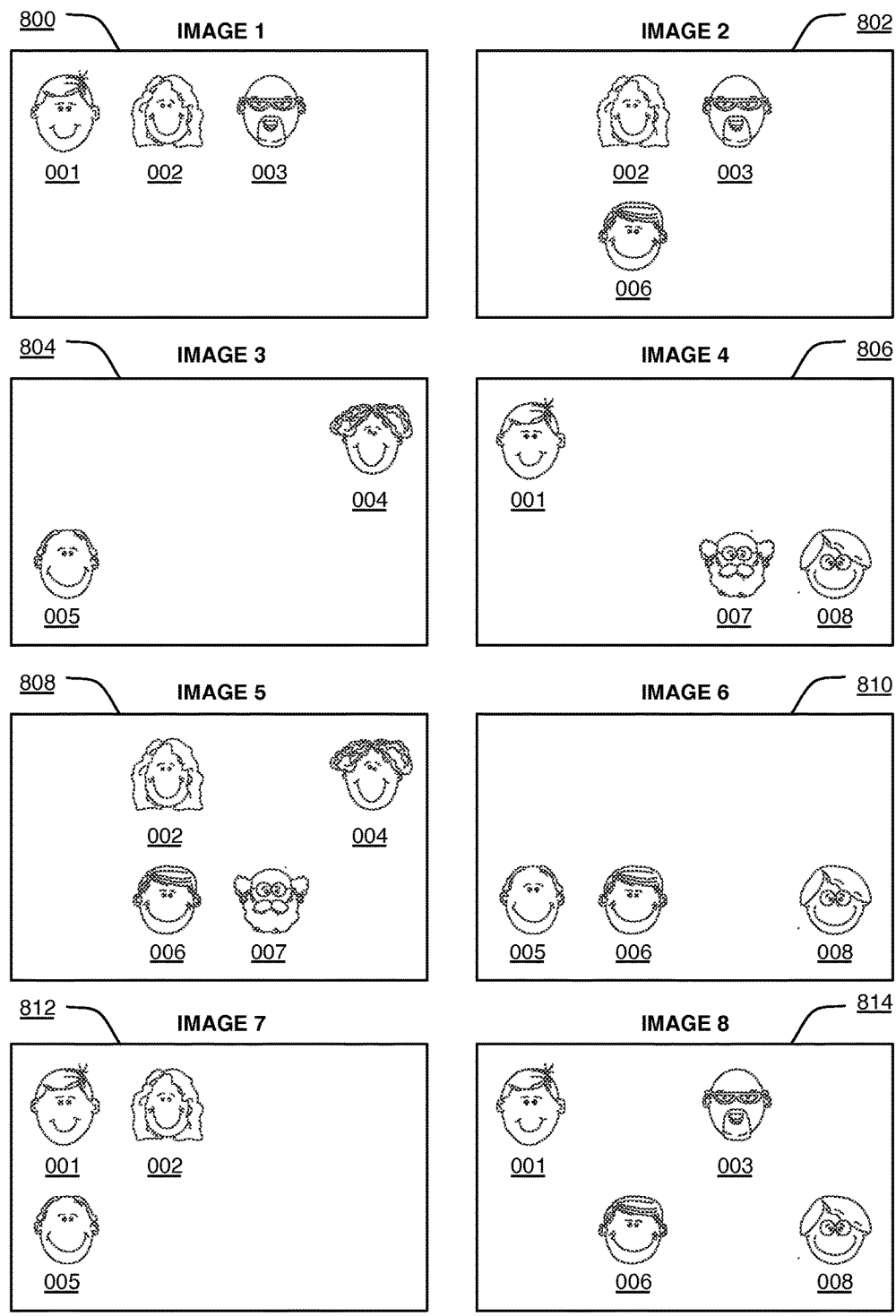
Figure 15A:
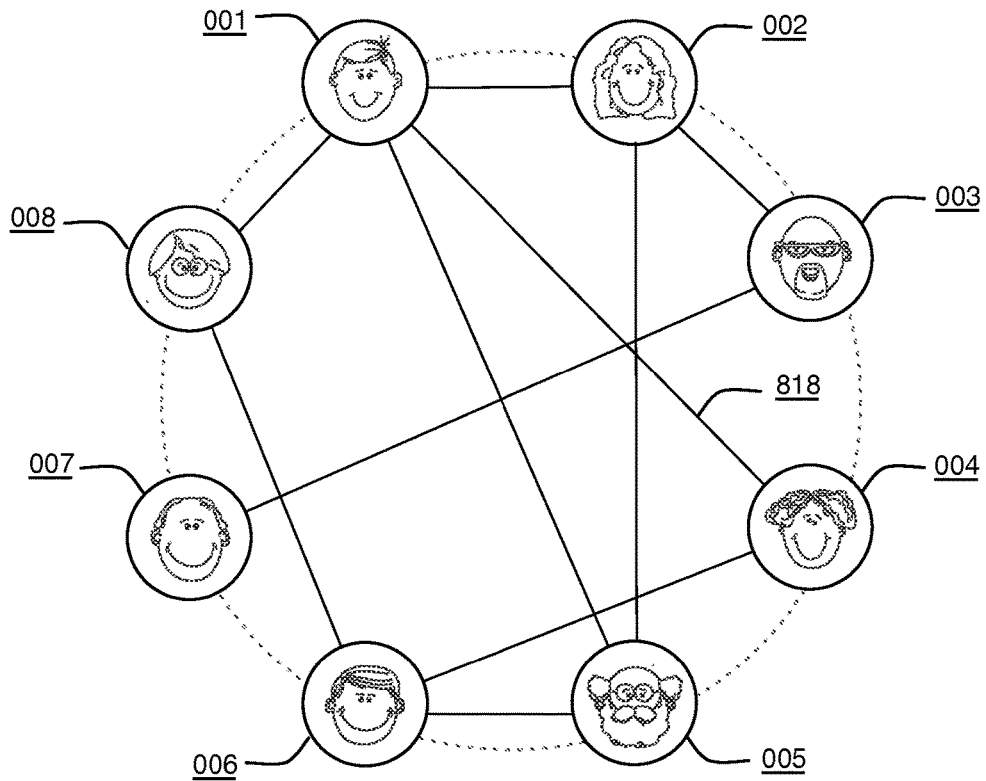
Figure 17:
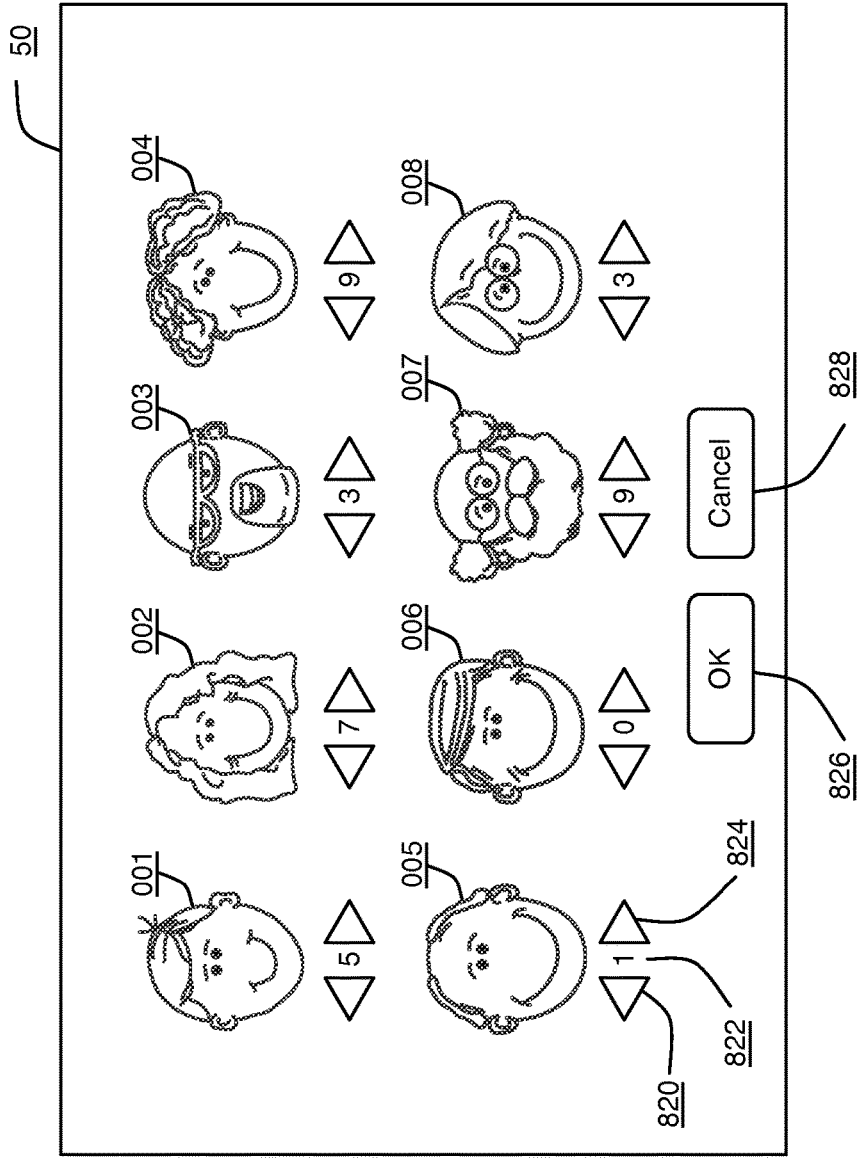
Figures 18A, 18B:
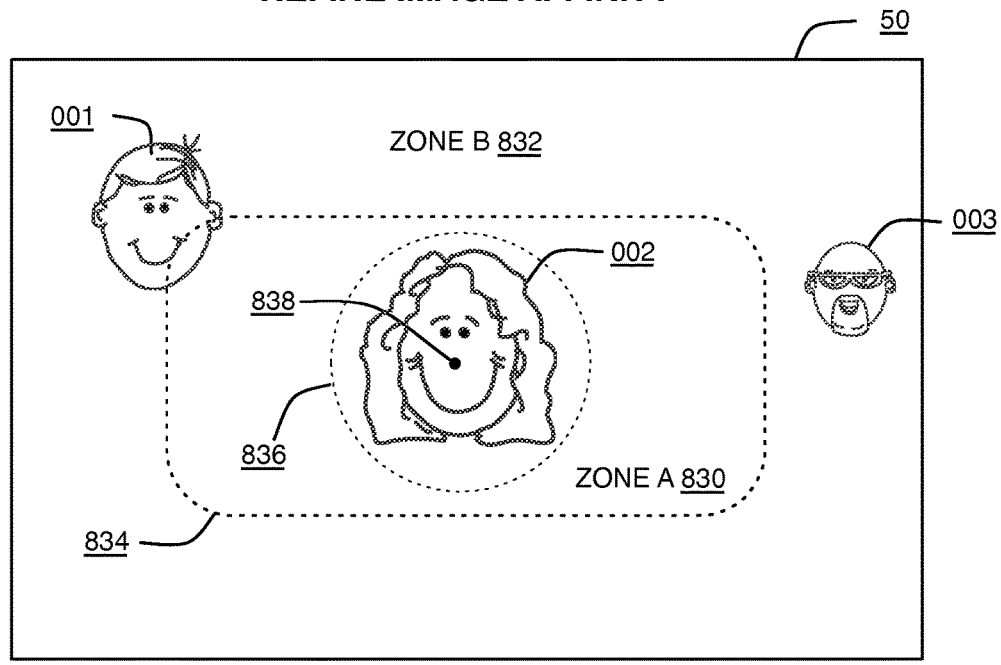
Figures 19A, 19B:
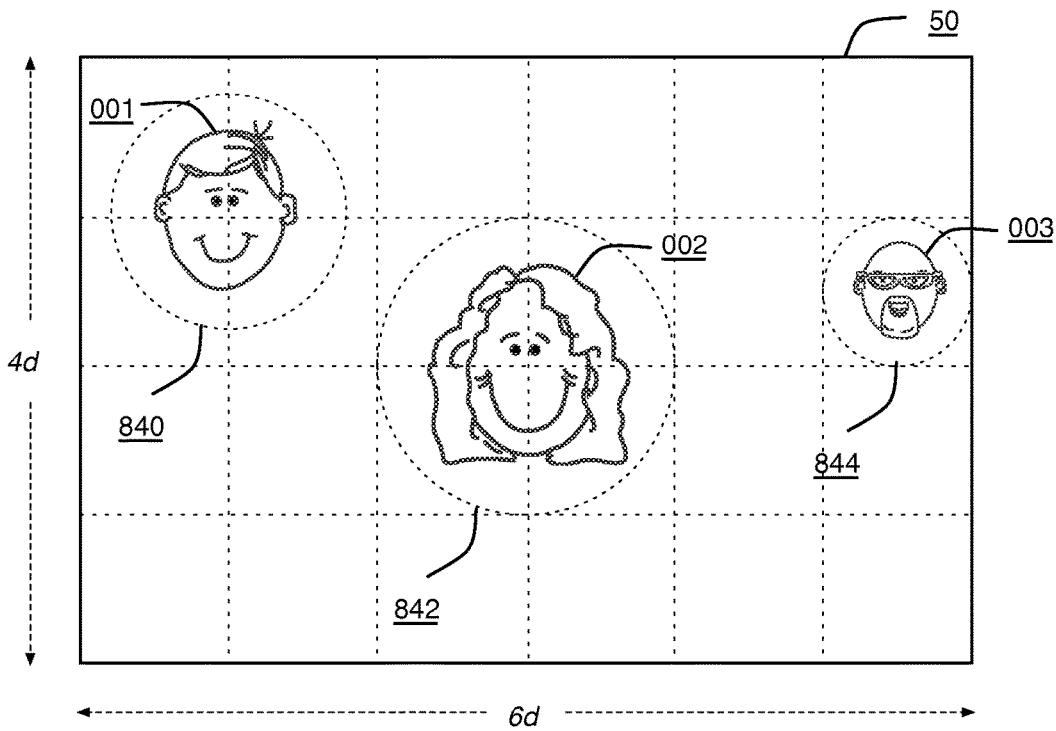
Figures 20A, 20B:
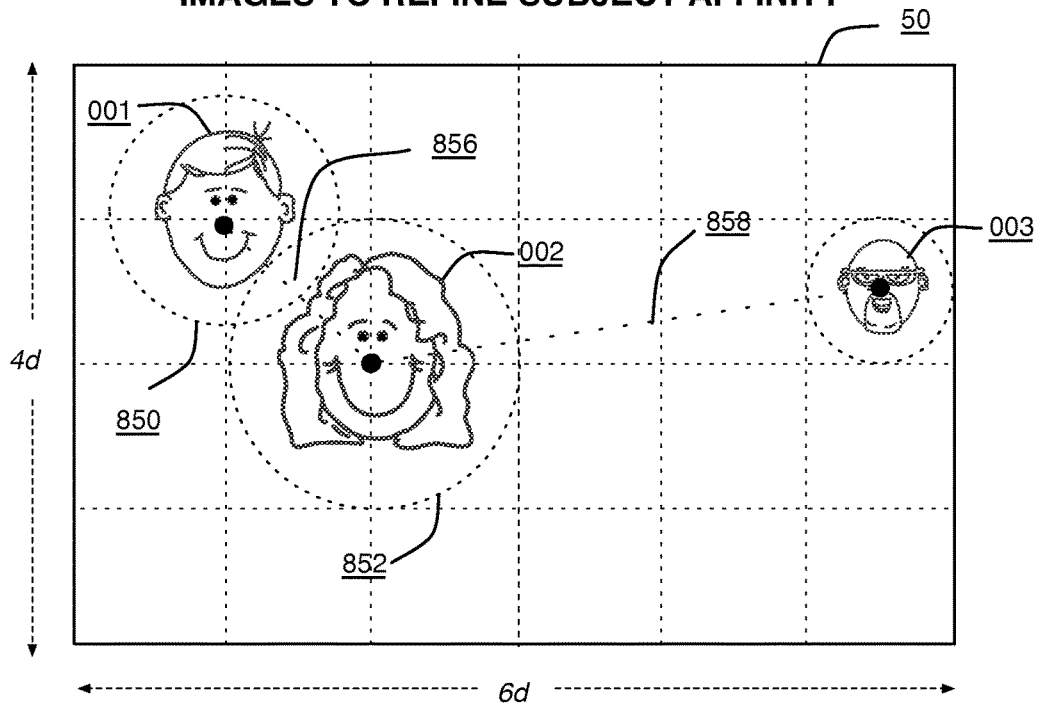
Figure 21:
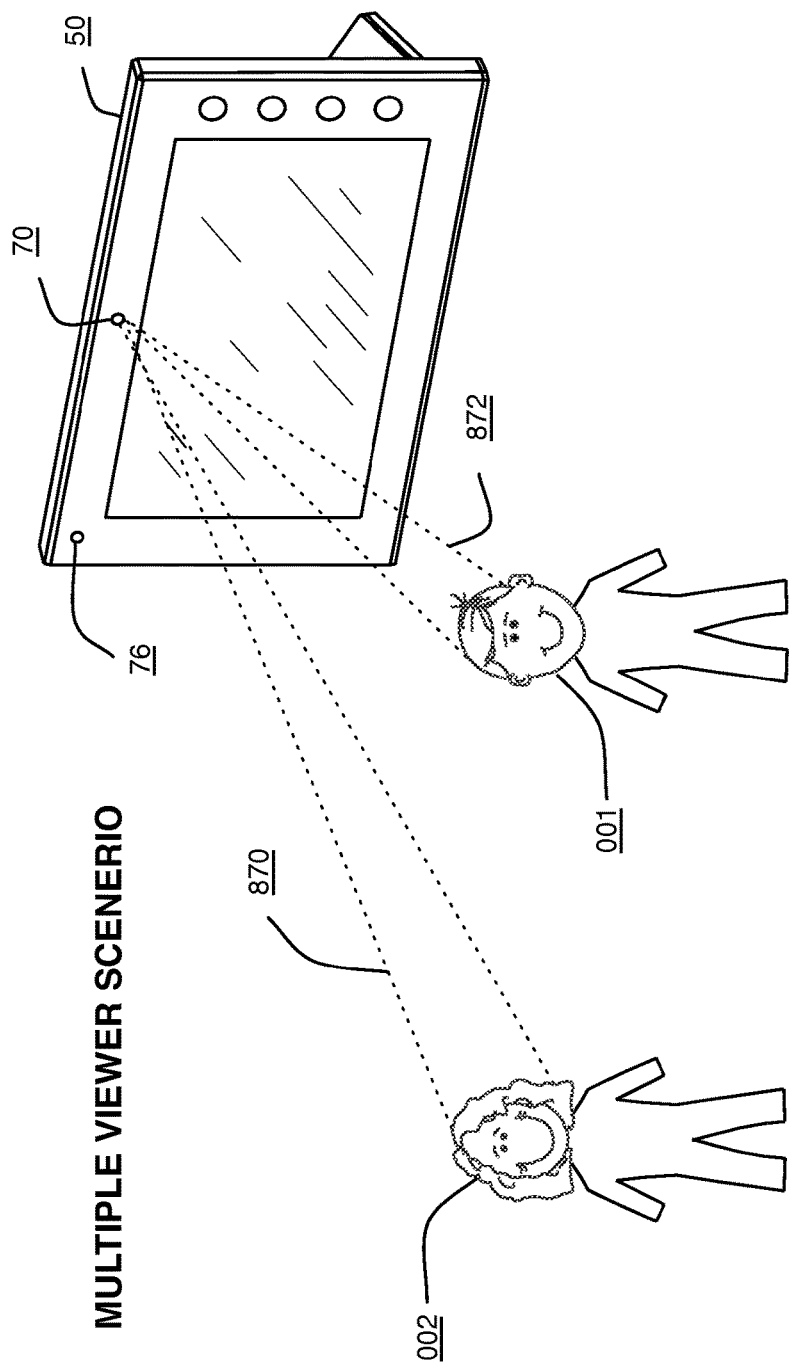
Figure 22:
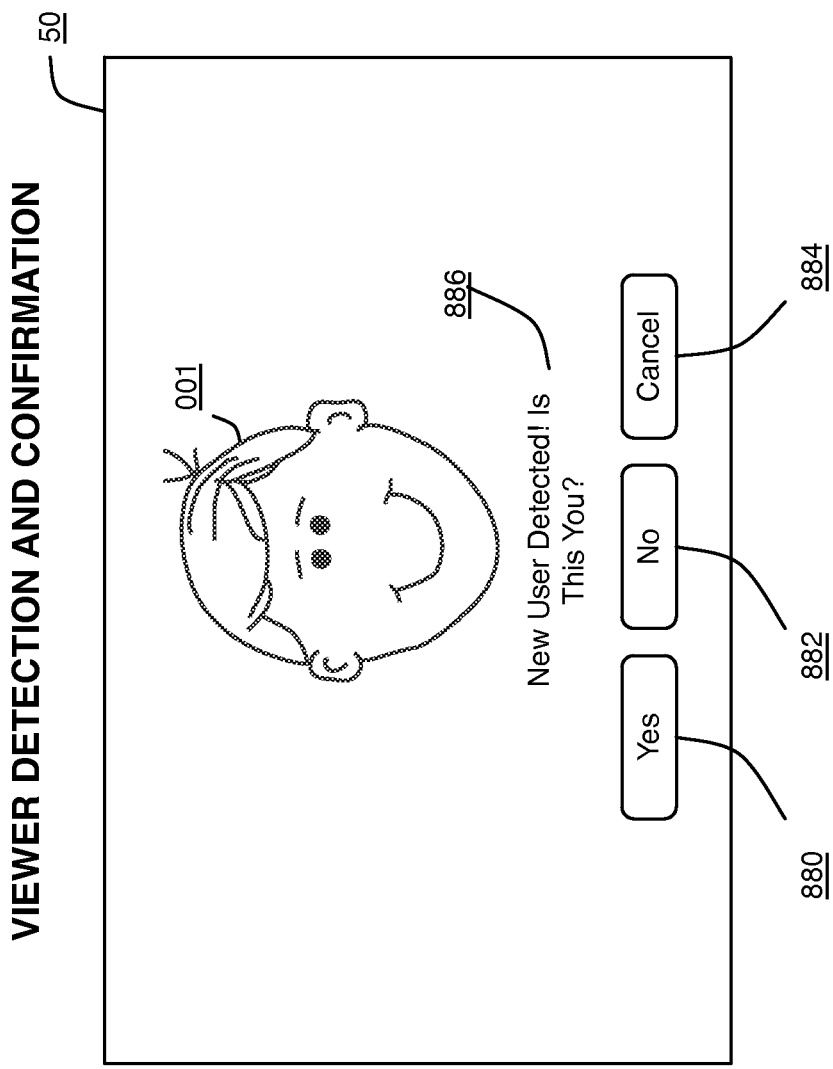
Figure 23:
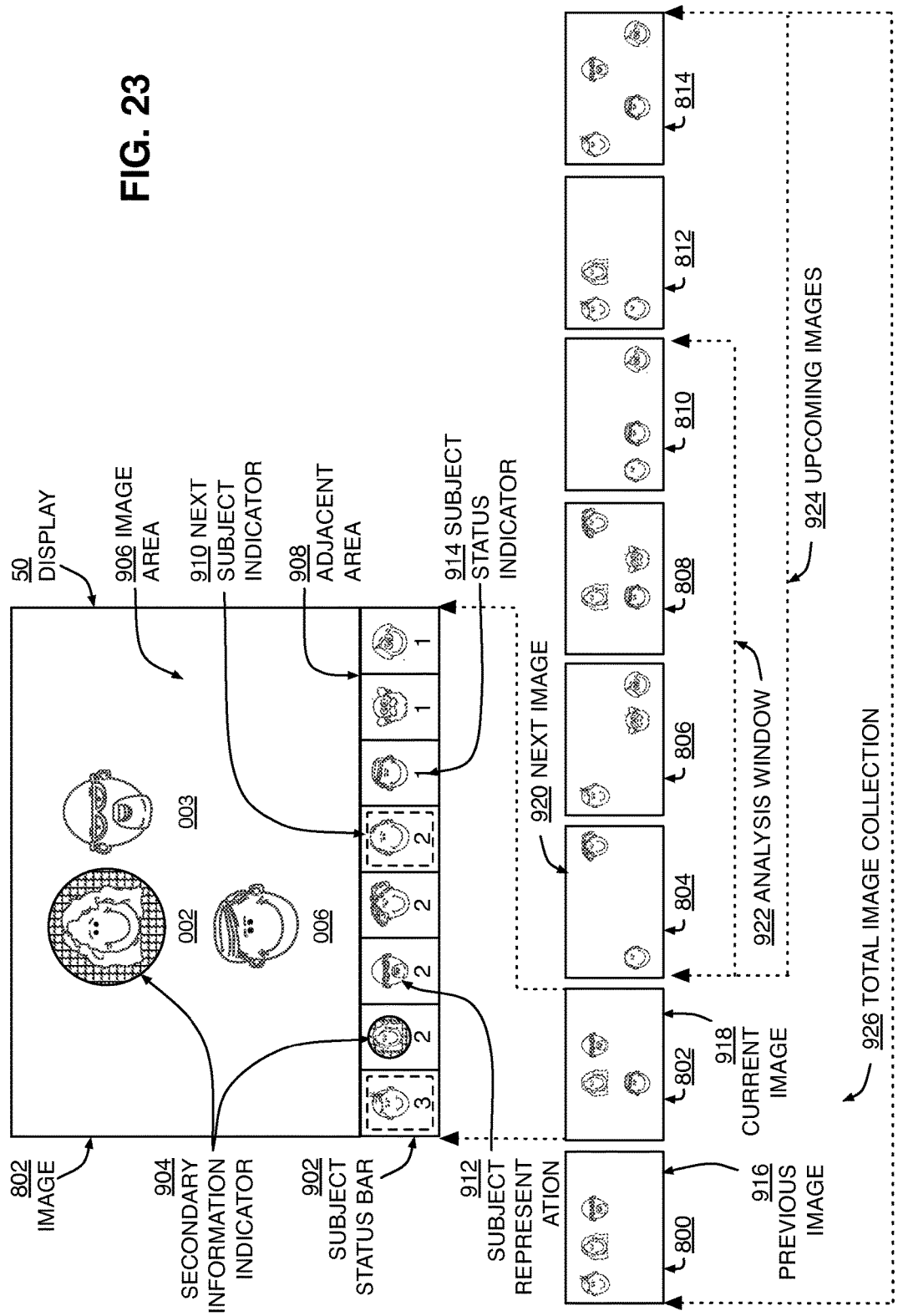
Figure 27A:
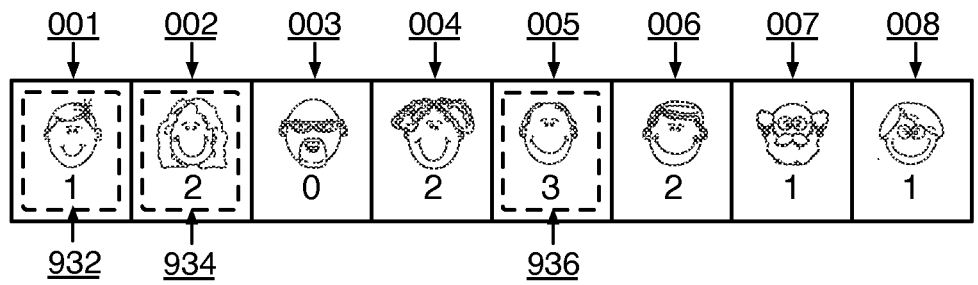
Figure 27B:
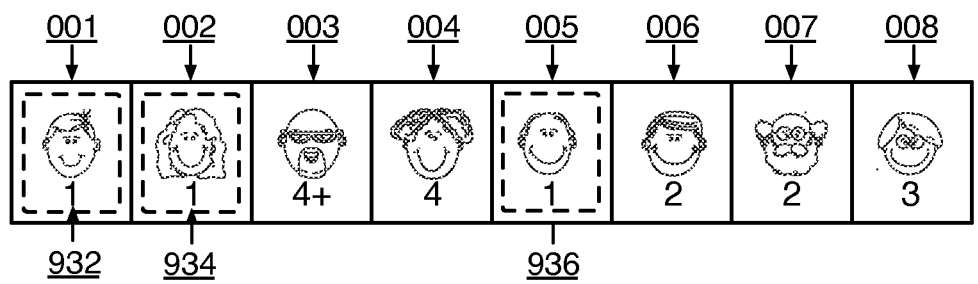
Figure 27C:
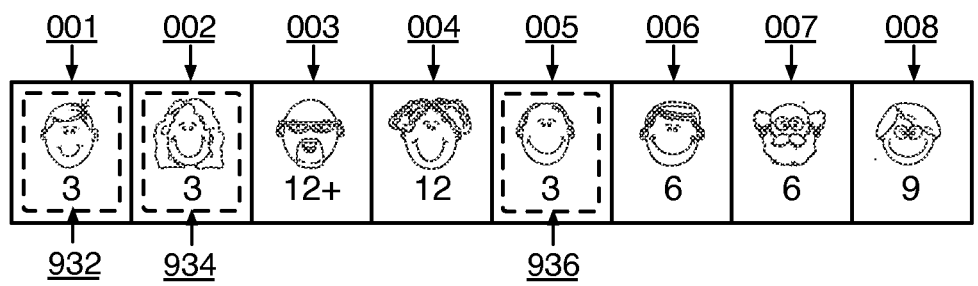
Figure 28A:
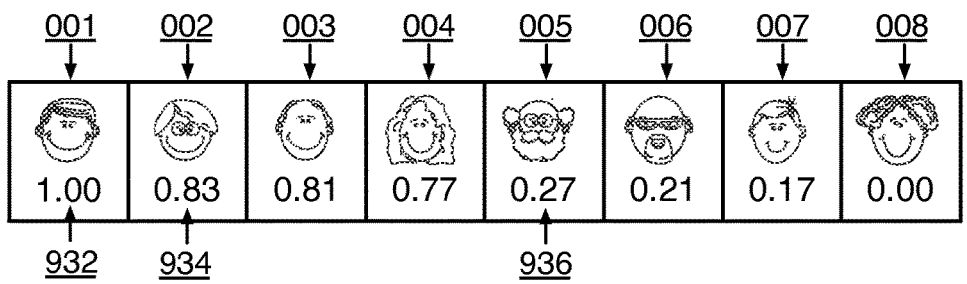
Figure 28B:
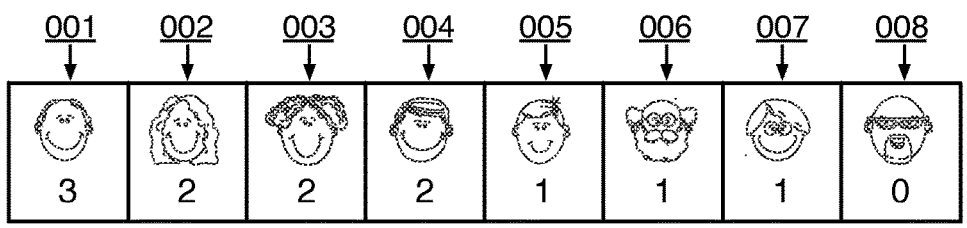
Figure 28C:
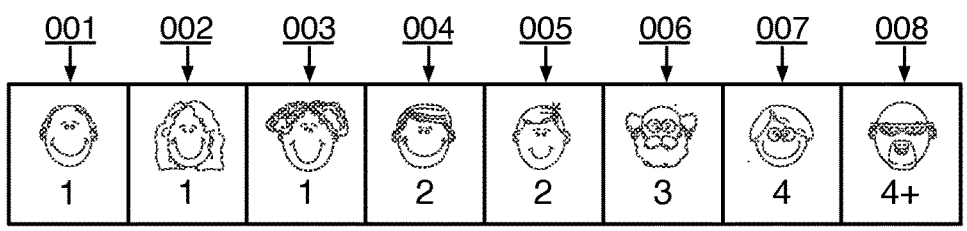
Figure 28D:
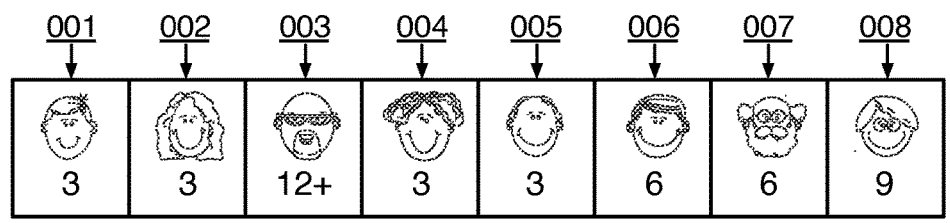
Figure 28E:
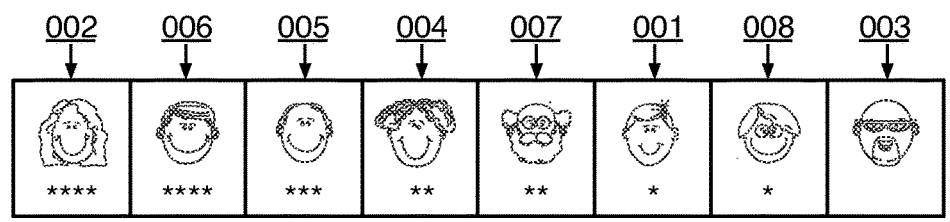
Figure 30:
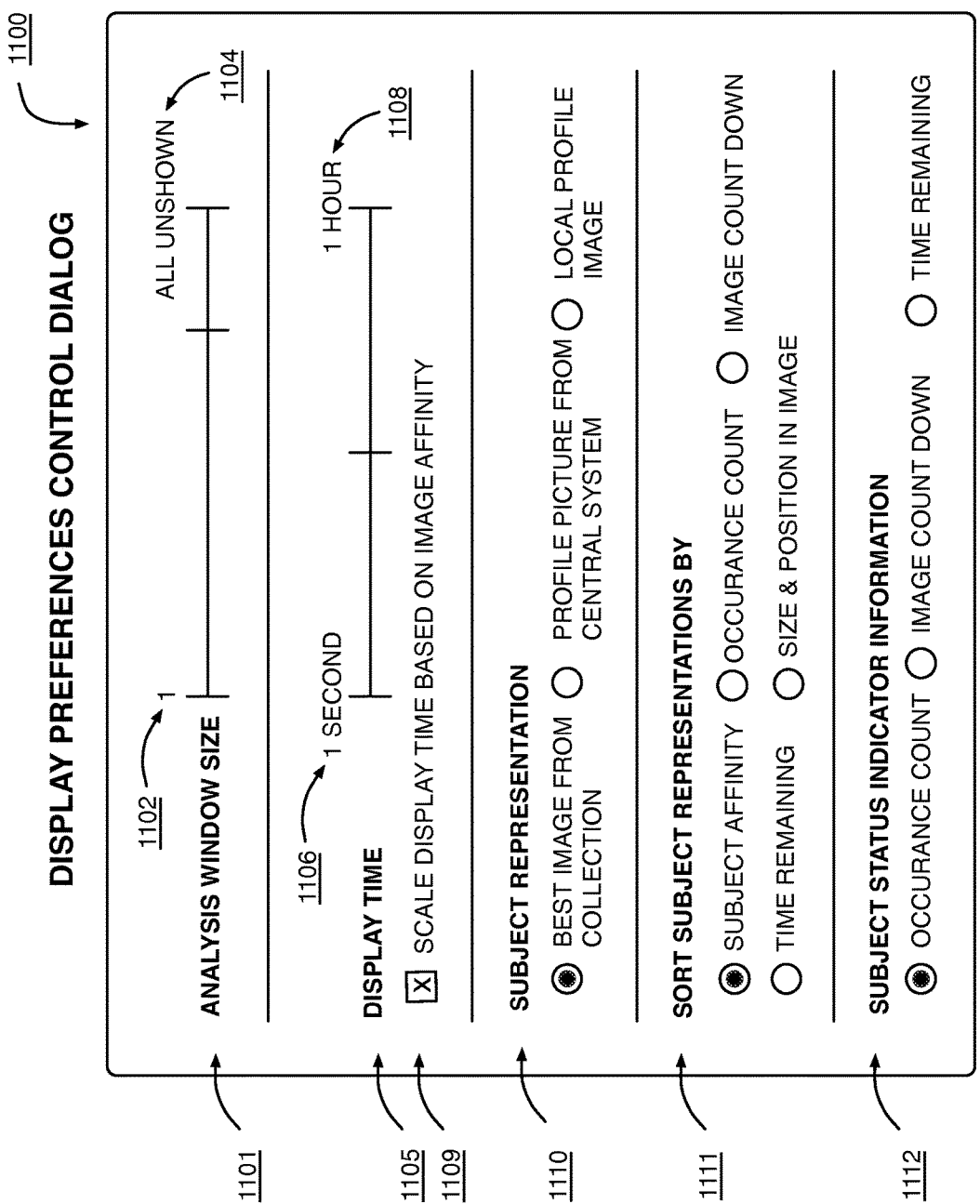

FIG. 4D graphically illustrates an exemplary image collection indexed by both subject and image;

FIG. 5A is a block diagram of an exemplary embodiment of the data structure used to represent affinity information between subjects (subject affinity);

FIG. 5B is a block diagram of an exemplary embodiment of the data structure used to represent affinity information between subjects and images (image affinity);

FIG. 6 illustrates the operation of the system of FIGS. 1, 2, and 3 according to one embodiment of the present disclosure;

FIG. 7 is a block diagram of the display device of FIG. 2 according to one embodiment of the present disclosure;

FIG. 8 is a block diagram of the central system of FIG. 2 according to one embodiment of the present disclosure;

FIG. 9 is a block diagram of the collection sharing device of FIG. 2 according to one embodiment of the present disclosure;

FIG. 10A is a flow chart illustrating a process for processing events originating from both the user and display device in one embodiment of the present disclosure;

FIG. 10B is a flow chart illustrating a process identifying a viewer of the display device according to one embodiment of the present disclosure;

FIG. 10C is a flow chart illustrating a process for using affinity information to score an image playlist for a viewer according to one embodiment of the present disclosure;

FIG. 10D is a flow chart illustrating a process for scoring a single face when encountered during the process of scoring an image as found in FIG. 10C;

FIG. 10E is a flow chart illustrating a process for building the affinity matrix that is used to represent the strength of relationship between any two users of the system according to one embodiment of the present disclosure;

FIG. 10F is a flow chart illustrating a process for incorporating a newly available image collection with a possibly existing image collection according to one embodiment of the present disclosure;

FIG. 10G is a flow chart illustrating a process for displaying a slideshow on the display device according to one embodiment of the present disclosure;

FIGS. 11A-B are flowcharts illustrating a process performed by the central system to match subjects to users of a central system;

FIG. 11C depicts an exemplary subject to central system user matching process of FIGS. 11A-B;

FIGS. 12A-B are flowcharts illustrating a process performed by an exemplary embodiment of the image collection index generator;

FIG. 13 illustrates an alternate embodiment of the system found in FIG. 2, wherein the display device has been simplified with the face recognition, affinity prediction, and image hosting taking place at the central system;

FIG. 14A graphically illustrates an exemplary collection of digital images comprised of subject faces;

FIG. 14B is a table illustrating which subject faces are contained in which of the exemplary images;

FIG. 15A is a graphical illustration of an exemplary central system where users form connections to other users to facilitate the control of the sharing of information;

FIGS. 15B-F are exemplary calculations showing how each image is assigned a composite score for each viewer using social distance data obtained from the exemplary central system of FIG. 15A;

FIGS. 16A-D are exemplary calculations showing how each image is assigned a composite score for each viewer using face co-occurrence within the image data obtained from the exemplary image collection of FIG. 14A;

FIG. 17 is an exemplary graphical user interface for collecting subject affinity information from a viewer of a display device;

FIG. 18A graphically illustrates an exemplary digital image divided into zones, such that different weights may be assigned to different zones, for the purpose of modifying the image affinity scores based on faces being found in different zones;

FIG. 18B is a table illustrating exemplary zone weighting values for the exemplary digital image shown in FIG. 18A;

FIG. 19A graphically illustrates an exemplary digital image where the subject faces have been resolved and their respective areas determined, for the purpose of modifying the image affinity scores for faces based on their respective sizes;

FIG. 19B is a table illustrating exemplary weighting values for the exemplary digital image shown in FIG. 19A;

FIG. 20A graphically illustrates an exemplary digital image whereby the faces have been identified, and the distance between each face determined for the purpose of modifying the exemplary face co-occurrence scores of FIG. 16 based on the distance between each subject face pair;

FIG. 20B is a table illustrating exemplary weighting values for the exemplary digital image shown in FIG. 20A;

FIG. 21 graphically illustrates an exemplary display device wherein more than one viewer has been detected;

FIG. 22 graphically illustrates an exemplary graphical user interface for prompting a newly detected viewer to confirm identity, for the purpose of matching that viewer to an existing profile;

FIG. 23 is a graphical illustration of an exemplary embodiment of the display device showing the constituent parts of the user interface and their respective names;

FIG. 24 is a graphical illustration of an exemplary embodiment of a display device where at the same time a primary image is displayed, subject information is being displayed in an area adjacent to the image, for the purpose of providing advance notice of subjects contained in upcoming images;

FIG. 25 is a graphical illustration of an exemplary embodiment of a user interface for the display device of FIG. 23 where a viewer has been detected, and the images have been reordered based on image affinity for the current viewer;

FIG. 26 is a graphical illustration of an exemplary embodiment of the display device shown in FIG. 24 where the viewer has invoked a control to select an alternate reference person, and changed the order in which upcoming images will be displayed;

FIG. 27A is a graphical illustration of an exemplary embodiment of a user interface for the subject status bar of the display device wherein the subject status indicators are displaying an occurrence count for each subject appearing in an image within the analysis window;

FIG. 27B is a graphical illustration of an exemplary embodiment of the subject status bar of the display device wherein the subject status indicators are displaying an image countdown count, wherein the image countdown count indicates the number of images remaining before the subject face occurs;

FIG. 27C is a graphical illustration of an exemplary embodiment of the subject status bar of the display device wherein the subject status indicators are displaying the time countdown count, wherein the time countdown count indicates the number of images to be shown before the subject face occurs;

FIG. 28A is a graphical illustration of an exemplary embodiment of the subject status bar of the display device wherein the subject representations are sorted according to subject affinity between the viewer or reference person and the corresponding subjects;

FIG. 28B is a graphical illustration of an exemplary embodiment of the subject status bar of the display device wherein the subject representations are sorted according to subject occurrence count values of the corresponding subjects;

FIG. 28C is a graphical illustration of an exemplary embodiment of the subject status bar of the display device wherein the subject representations are sorted according to the image countdown count of the corresponding subjects;

FIG. 28D is a graphical illustration of an exemplary embodiment of the subject status bar of the display device wherein the subject representations are sorted according to the time countdown count of the corresponding subjects;

FIG. 28E is a graphical illustration of an exemplary embodiment of the subject status bar of the display device wherein the subject representations are sorted according to subject prominence score of the corresponding subjects;

FIG. 29 illustrates an exemplary computation of social prominence as a function of face size ratio value and zone value;

FIG. 30 is a graphical depiction of an exemplary user interface for the purpose of allowing a viewer of the display device to set the operational preferences of the device;

FIG. 31 is a flowchart outlining the process by which a display device receives an image collection and displays the images and the corresponding status information.

DETAILED DESCRIPTION OF THE EMBODIMENTS

The embodiments set forth below represent the necessary information to enable those skilled in the art to practice the disclosure and to illustrate the best mode of practicing the disclosure. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

FIG. 1 illustrates a display device 50 capable of identifying a viewer 001, and customizing the content shown on the display device 50 to that viewer 001. The viewer 001 is identified through a detection process that is initiated when the viewer 001 triggers the motion detection subsystem 76 on the display device 50. An image of the viewer 001 is then captured using the image capture subsystem 70 on the display device 50. The face of the viewer 001 is resolved and a viewer profile 130 is generated where a reference to the corresponding face is stored 134. In one embodiment, the images selected for display on the device are determined by selecting those images in which the viewers face 001 is detected. Further to the present disclosure, the viewer 001 interacts with the display device 50 through the use of a touchscreen 66 on the front of the display device 50. In another embodiment, the viewer would interact with the display device 50 through the use of the button controls 90 92 94 96 on the chassis of the display device 50

It should be noted that while the shown embodiment of the display device 50 is a digital picture frame, there are other hardware configurations that would prove suitable for practicing the disclosure. Other embodiments would include a personal computer with camera, a laptop with integrated camera, a cellular telephone with integrated camera, a surveillance monitor with networked surveillance cameras, a digital camera with LCD, a PDA with digital camera, a media player with digital camera, and the like.

FIG. 2 illustrates a collection sharing device 30 for providing additional content to a display device 50 over a network 20, and a central system 100 for providing affinity information between subjects found in the image collection 200. The display device 50 is communicatively coupled via a network 20 to additional image sources 30. The additional image sources may include other display devices, computers, cellular phones, or any device possessing the necessary electronic hardware and software. Additional image content may also be retrieved from image sources residing 200 within the central system 100 and available over the internet. Examples of such central systems 100 may include photosharing sites and social networking sites with photo storage capabilities. Examples of photosharing sites include Shutterfly, Flickr, and Snapfish. Examples of social networking sites with photosharing capabilities include Facebook, Myspace, and Classmates.com. In this embodiment of the disclosure, the display device 50 also retrieves relationship information from one or more central systems 100. The relationship information is used to compute subject affinity scores, which in turn are used to select which images will be presented to the viewer 001.

As stated above, the network 20 is preferably a distributed, public access network, such as the Internet, wherein the user system 50 and the central system 100 are capable of interacting with and through the network 20 using various protocols such as Transmission Control Protocol/Internet Protocol (TCP/IP), Hypertext Transport Protocol (HTTP), and File Transfer Protocol (FTP). However, those of ordinary skill in the art will appreciate that the network 20 is not limited thereto. More specifically, the network 20 may be any type of network suitable to allow interaction between the display device 50 and the central system 100. For example, the network 20 may be a wired network, a wireless network, or any combination thereof. Further, the network 20 may include a distributed computing network, an intranet, a local-area network (LAN) and/or a wide-area network (WAN), or any combination thereof.

In one embodiment, the central system is comprised of a control system 102 that controls the functions of the system. The control system 102 contains a affinity predictor 750 that uses facial recognition 170 to establish matches between subjects found in the images 220 in the image collection 200 and users 012 of the central system 100. The relationships of the users 012 of the central system 100 are managed through the account management 105 function.

This exemplary central system 100 is comprised of multiple user accounts 106. Each user account corresponds to a single user 12 of the central system 100. Each user account 106 contains a list of friend's 108, permission settings 110, profile information 112, and content associated with the user 114. The Friends List 108 is built through an invitation process where other users 012 are invited to form a reciprocal relationship or connection. The entries in the friend's list 108 may be tagged with optional information qualifying the nature of the relationship, and information indicating the duration of the relationship. The permission settings 110 are used to control access to profile 112 and content information 114 by other accessing entities. Accessing entities of the central system 100 may include both member and nonmember users 012.

The profile information 112 may include information such as demographic information, preference information, calendar information, location history, communications history, and the like. The location history for a user 012 may be built up by extracting the information directly from the user 012, or by extracting location information and timestamps from images 220 in which the central system 100 user 012 appears. An example of the user 012 directly submitting location history would include automated submissions by the users 012 cellular phone with GPS capabilities to the central system 100. The location history would be comprised of entries capturing both the location and time of the user 012. Based on the location history for each user 012, an average position for each user 012 may be calculated. Additionally, the average position of a user 012 may be time varying, and the average position for the user 012 is calculated over one or more windows of time.

A communications history log would capture communications events comprised of the time and type of communication, as well as extracted features from the communication. An example of extracted features would include using natural language processing to extract the most descriptive keywords from a message sent between central system 100 users 012. Based on the communication event log, other statistics may be computed, such as a frequency of communication.

Content 114 may include text, audio, image, and video information uploaded by a user 012 to the central system 100. The central system 100 may also function as an additional source of image content 200.

The collection sharing device 30 is comprised of an image collection 200 that is responsible for the storage and transfer of the images 220, a control system 32 for making the image collection 200 available over the network 20, and a browser 34 for providing configuration information to the display device 50.

It should be noted that while we have explicitly described a collection sharing device 30 as a remote content source, any electronic device capable of performing the functions required by the image management 200 and control system 32 are capable of functioning as remote content sources. This also includes the central system 100 and display device 50. Additional detail for the collection sharing device 30 can be found in FIG. 9.

Figure 3A:
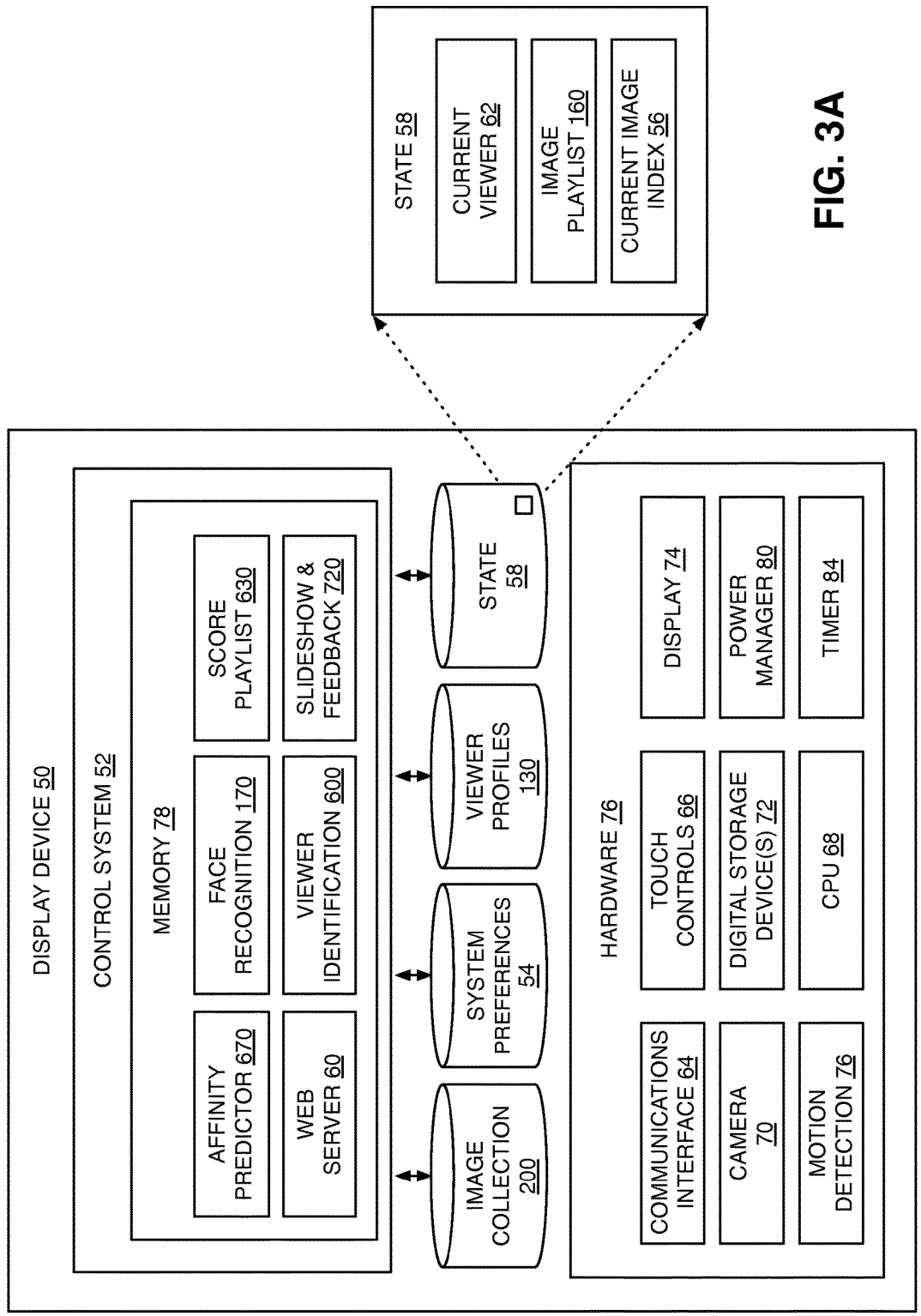
FIG. 3A is a block diagram showing the hardware and software components of an exemplary display device.

FIG. 3A is a block diagram showing the hardware 76 and control system 52 components of an exemplary display device 50. At the hardware level 76, the display device 50 is equipped with a microprocessor 68 and instruction memory 78 that are used to execute programmatic instructions on the device 50. Images 220 are stored in the internal storage 72 and presented on the display 74. The communications interface 64 can be used to provide additional data, status, and control to the device 50. A user can control the device 50 via touch controls 66 available on the device 50. Power consumption is minimized on the device via the power management subsystem 80. The power management subsystem 80 is responsible for putting certain functions of the display device 50 into sleep mode, while no motion is being detected 76. When motion is detected 76, the device 50 is woken, and the camera subsystem 70 takes an image 220 of the one or more viewers 001 in front of the display device 50. This information is then stored in memory 78.

At the control system level 52, system-wide preferences 54 and individual profiles 130 are stored on the display device 50 in the non-volatile storage 72. Faces within images 220 are detected via face detection software 172. Face matching software 176 is then used to compare the faces of one or more viewers 001 against subject faces contained in the images 001 . . . 008 that are accessible to the display device 50 as illustrated in FIG. 2. The image index generator FIG. 12A is responsible for producing the image collection info data structure 240 as illustrated in FIG. 4C. The program instructions for the image indexer 206 may be executed on each device that wishes to make its image collection 240 available to other display devices 50. Slideshow software 720 is used to display selected content from the image playlist 160.

In another embodiment of the disclosure, a web server 60 is used to facilitate remote management and control of the display device 50 over the network 20.

In another embodiment of the disclosure, the display device 50 is able to recognize the presence of multiple viewers 001 in front of the device. In this embodiment, identification information is stored for multiple current viewers 62, and the profile 130 information that is used to customize the selected content for display 160 is derived from the aggregated profile information 130 for all of the viewers 001 present.

Figure 3C:
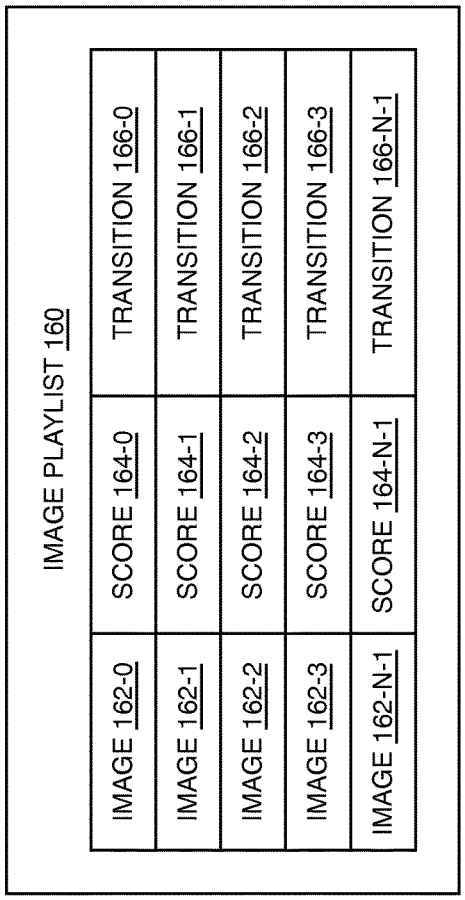
FIG. 3C is a block diagram of an exemplary embodiment of the data structure used to represent the image playlist as found in FIG. 3A.
Figure 3D:
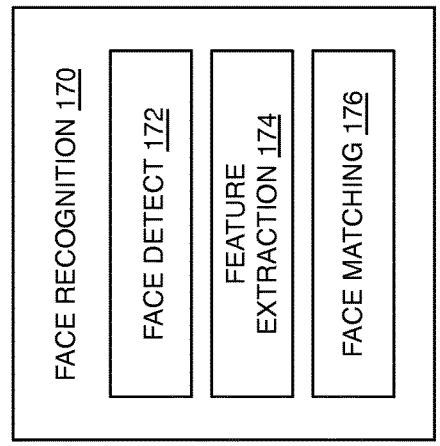
FIG. 3D is a block diagram of an exemplary embodiment of the software used to perform facial recognition as found in FIGS. 2, 3A, 4A, 7, and 8.
Figure 3B:
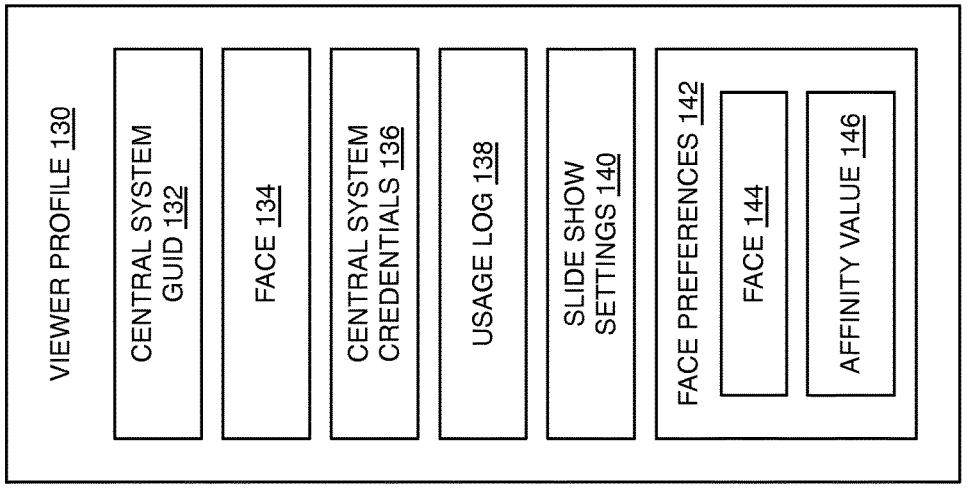
FIG. 3B is a block diagram of an exemplary embodiment of the data structure used to represent an individual viewer profile as found in FIG. 3A.

FIG. 3B is a block diagram of an exemplary embodiment of the data structure used to represent an individual viewer profile 130 as found in FIG. 3A. The user may be a viewer 001, or a person that is standing in front of the display device 50 and viewing images. The user may also be a subject, or a person who is in one or more of the images 220 accessible from the display device 50. Note that a user may be both a viewer 001 and a subject, that is, they are viewing the display device 50, but there are also images 220 accessible from the display device 50 in which that same viewer's face is present. The GUID 132 is a global identifier that is unique to this specific user within the system. The face image 134 is a reference to an image 220 of the face of the viewer 001 represented by this individual profile 130. The central system credentials 136 contain information uniquely identifying the subject as a user 012 of the central system 100. This information is normally comprised of a username and in some cases a password. The usage log 138 records activity by the subject, such as when a subject has acted as a viewer. The slide show preferences 140 store the users viewing preferences, such as the amount of time each image is shown, and the transition effect that is applied when transitioning from the current image to the next image. The face preferences 142 are used to record and maintain the viewers affinity 146 for other subjects 144. The face field 144 holds the GUID of a subject. In one embodiment, the affinity value 146 is a numerical value between zero and one representing the viewer's affinity for the referenced subject.

FIG. 3C is a block diagram of an exemplary embodiment of the data structure used to represent the image playlist 160 as found in FIG. 3A. The image playlist 160 is used to hold a reference 162 and score 164 for each image scheduled for presentation on the display device 50. The scores 164 are calculated according to the flowchart presented in FIG. 100. The transition type 166 indicates the transition algorithm to be used when switching from the current image to the next image.

FIG. 3D is a block diagram of an exemplary embodiment of the software used to perform facial recognition 170 as found in FIGS. 2, 3A, 4A, 7, and 8. Face detection 172 is used to resolve the location of a potential face within a given image. Feature extraction 174 is then used to identify the geometric features of the face, such as the eyes, nose, mouth, and the like. Face matching 176 is used to compare the extracted features 174 from two faces to determine the probability that the faces match, or more explicitly, refer to the same person or subject. If the match probability falls above a user selectable threshold, then the two faces are assumed to be a match.

FIG. 4A is a block diagram of an exemplary embodiment of the image collection subsystem 200 used in items 50, 30, and 100 of FIG. 2 responsible for indexing imaging content and providing the indexed data 240 over a network 20 to a display device 50. The image collection 200 encapsulates the code and data representing a collection of images 220. The image store 204 represents the file system containing the local images 220. The image indexer 206, explained in additional detail in FIG. 12, contains the program codes for detecting the faces in each image 220, and building the image collection index 240. The image collection index 240, explained in additional detail in FIG. 4C, is used to provide convenient programmatic access to the image collection 200. The image collection 200 is indexed both by face 250 and by image 260. The purpose of this data structure 240 is to provide efficient programmatic access to representative images of all faces found within a collection 200, all images in which a particular face is found 250, and all faces within a particular image 260. This efficient access is important when image collections 200 are accessed over the network 20 and network throughput and latency can degrade performance.

FIG. 4B is a block diagram of an exemplary embodiment of the data structure used to represent an image 220. The image 220 contains image data 222 representing the pixels of the image. The image data may be in either compressed or uncompressed form. The metadata 224 contains additional information about the image 220. The timestamp 226 fields contain the data, time, and time zone in which the image 220 was captured. The location stamp 228 holds the GPS location coordinates at which the image was captured. The keyword tags 230 field contains a plurality of textual tags descriptive of the image 220. Face tags 232 contain information identifying subject faces contained in the image 220, and their corresponding locations. The face tags 232 also include identity information corresponding to the subjects represented by the faces. The identity information may be in the form of the subjects name, a GUID 132, or username 136 corresponding to an account on the central system 100.

FIG. 4C is a block diagram of an exemplary embodiment of the data structure used to represent a digital image collection index 240 as used in FIG. 4A. Subject to subject affinity information 242 is used to store affinity predictions between any two subjects contained within a given image collection 200. In one embodiment of the present disclosure, the information is stored according to the structure shown in FIG. 5A. Subject to image affinity information 244 is used to store affinity predictions between any subjects contained within at least one image 220 of the image collection 200. In one embodiment of the present disclosure, the information is stored according to the structure shown in FIG. 5B. Note that subjects may also include a viewer 001 who is not contained in any image 220 of the collection 200. Also note that not all images 220 are required to contain faces.

The zone definitions 246 field contains information regarding the set of non-overlapping areas into which images are divided as further exemplified in FIG. 20A.

The subject face index 250 contains one entry per unique face found in an image collection 200. For each face 252, the list of images 254 in which the face is contained is recorded 270 along with the weighting zone 272, the size ratio 274 of the face in relation to the entire image, the center point of the face 276, and the radius of the circle containing the face 278. This structure is advantageous because given a face reference; it is easy to quickly determine the list of all images 220 in which the face is contained.

The image index 260 contains one entry for each image stored in a collection FIG. 7. For each image 262, a list of the faces 264 occurring in the image is recorded. Information regarding the zone 272, size ratio 274, center point 276, and radius 278 are also recorded. The ID 279 is a unique identifier of the subject. In one embodiment of the present disclosure, the GUIDs are assigned at the central system 100 when a subject face is matched to a user 012 of the central system 100. This structure is advantageous because given an image reference; it is expedient to quickly determine the list of all faces contained in the image.

FIG. 4D graphically illustrates an exemplary image collection 200 indexed by both subject 296 and image 298. The subject index 250 corresponds to 296. The image index 260 corresponds to 298. As shown by the links in this illustration, each subject representation 280 282 284 286 contains a link to each image in which that face is found, and each image representation 288 290 292 294 contains a link to all subjects found within that image. For example, face 001 contains links to images 288 and 290. Likewise, image 290 contains links to the reference face image 280 for subject 001 and face image 282 for subject 002.

FIG. 5A is a block diagram of an exemplary embodiment of the data structure used to represent affinity information between subjects (subject affinity). Subject affinity is an indication of the strength of the relationship and desirability of one subject for another. In one embodiment of the present disclosure, the numerical ranges of the values fall between zero and one, where zero indicates no affinity, and one represents maximum affinity. Note that affinity between two users need not be symmetric. In other words, the affinity for subject six by subject three 302 need not be the same as the affinity for subject three by subject six 304. This is referred to as non-symmetric affinity, and can occur between a fan and celebrity for example.

There are a number of approaches to determining subject-to-subject affinity. In one embodiment, subject faces are matched to users 012 of a central system 100, such as a social networking site, and the social distance between the users 012 is employed to estimate affinity. This assumes that user pairs with shorter social distances have higher subject affinity than subject pairs with a higher social distance.

In another embodiment of the present disclosure, subject affinity is estimated by using subject faces co-occurrence within images 220. This assumes that subjects with a high co-occurrence rate within images 220 will have more affinity for one another than subject pairs with a low co-occurrence within an image collection 200.

In another embodiment of the present disclosure, subject affinity is determined by prompting the viewer 001 of the display device 50 with a dialog showing the highest occurring subject faces within the image collection 200. An example of such a dialog is shown in FIG. 19. When a new viewer 001 is detected in front of the display device 50, the viewer 001 is prompted to specify subject affinity preferences using touch screen controls. The viewer 001 assigns a high score to the subject faces they would like to see, and a lower score to faces they do not care to see.

In yet another embodiment of the present disclosure, the display device 50 simply attempts to match the face of the viewer 001 to faces found in the images 220. Images in which the viewer's face 001 is found score higher. Note that this approach is not detailed further in this document due to it's simplicity, but is in fact a special case of the general case where the subject affinity matrix has only one row and one column.

Note that none of the approaches are likely to be right in all cases, particularly when social distance data and co-occurrence data are sparse. These approaches are intended to yield an intelligent starting point, from which the system can adapt and improve its accuracy predicting viewer to subject affinity through viewer 001 response.

FIG. 5B is a block diagram of an exemplary embodiment of the data structure used to represent affinity information between subjects and images (image affinity). In this case, image affinity is an indication of the desirability of a subject for an image 220. In one embodiment of the present disclosure, the numerical ranges of the values fall between zero and one, where zero indicates no affinity, and one represents maximum affinity.

FIG. 6 illustrates the operation of the system of FIGS. 1, 2, and 3 according to one embodiment of the present disclosure. The display device 50 owner (administrator) enters configuration and initialization information 402. In one embodiment, the administrator enters this information via a browser 34 communicating with a web server 60 running on the display device 50. A collection sharing device 30 makes it's image collection available over the network 20.

Next, a viewer 001 of the display device 50 inserts removable media storage 72 into the display device 406. The display device 50 then indexes the images 220 on the removable media 408, and stores the results in an image collection index 240. Next, the display device 50 detects motion in front of the display device 50 and captures the face 410 of the viewer 001. These steps are also shown in FIG. 10B.

An image collection index 240 is then sent to the central system 412. From this image collection index 240, the central system 100 attempts to match faces found in the image collection index 240 to users of the central system 414, and to determine the social distance between those users 012 that are identified 416. The social distance information is then converted to subject-to-subject affinity information, and returned to the display device 418.

Since central systems 100 are potentially quite large, viewer identity 136 information and display device 50 owner information is sent to the central system 100 when attempting to match faces from the image collection index 240 to central system 100 users 012. This identity information 136 gives the central system 100 additional hints that can be used when attempting to match faces. For example, central system 100 users 012 that are closer in social distance to the current display device 50 viewer 001 or the display device 50 owner are more likely to appear in images on that owners display device 50 than someone simply picked out of the general population of central system 100 users 012.

Subsequently, the display device 50 using the social connection matrix FIG. 15B converts the information into a social distance matrix 15C that contains the social distance between any two subjects found in the matrix. Next, the subject-to-subject affinity matrix is used to produce the viewer to image affinity matrix of 15E 420. An image playlist 160 is then assembled from the viewer to image affinity matrix 15E by matching the current viewer to the matching viewer in the matrix, and applying whatever sorting preference and transition that viewer has specified 422.

Based on a periodic timing interval, images 220 are then shown 424 one at a time according to FIG. 10G. The facial responses of the viewer are subsequently monitored 426, and the viewers profile is adjusted 428. This process is then repeated 432 until such time that a new viewer 001 is identified 430.

FIG. 7 is a block diagram of the display device 50 of FIG. 2 according to one embodiment of the present disclosure. In general, the display device 50 includes a control system 52 having associated memory 78.

In this embodiment, the affinity predictor 670, face recognition 170, playlist scoring 630, web server 60, viewer identification 600, and slideshow and feedback modules 720 are implemented in software and stored in memory 78. However, the present disclosure is not limited thereto. The affinity predictor 670, face recognition 170, playlist scoring 630, web server 60, viewer identification 600, and slideshow and feedback modules 720 may be implemented in software, hardware, or any combination thereof.

The display device 50 may also include one or more digital storage devices 72 such as, for example, one or more hard disk drives. The one or more digital storage devices 72 may be used to store images 220. The display device 50 also includes a communication interface 64 communicatively coupling the display device 50 to the network 20. Lastly, the display device 50 may include a user interface 51, which may include components such as a display, one or more user input devices, or the like.

FIG. 8 is a block diagram of the central system 100 of FIG. 2 according to one embodiment of the present disclosure. In general, the central system 100 includes a control system 102 having associated memory 104.

In this embodiment, the face matching 170, affinity predictor 750, and account management 105 are implemented in software and stored in the memory 104. However, the present disclosure is not limited thereto. The face matching 263, affinity predictor 750, and account management 105 may be implemented in software, hardware, or a combination thereof.

The central system 100 may also include one or more digital storage devices 122 such as, for example, one or more hard disk drives. The one or more digital storage devices 122 may be used to store images. The central system 100 also includes a communication interface 124 communicatively coupling the central system 100 to the network 20 (FIG. 2). Lastly, the central system 100 may include a user interface 101, which may include components such as a display, one or more user input devices, or the like.

FIG. 9 is a block diagram of the collection sharing device 30 of FIG. 2 according to one embodiment of the present disclosure. In general, the collection sharing device 30 includes a control system 32 having associated memory 34.

In this embodiment, the request handler 202, collection indexer 206, and collection index 240 are implemented in software and stored in the memory 34. However, the present disclosure is not limited thereto. The request handler 202, collection indexer 206, and collection index 240 may be implemented in software, hardware, or a combination thereof.

The collection sharing device 30 may also include one or more digital storage devices 36 such as, for example, one or more hard disk drives. The one or more digital storage devices 36 may be used to store images 220. The collection sharing device 30 also includes a communication interface 38 communicatively coupling the collection sharing device 30 to the network 20 (FIG. 2). Lastly, the collection sharing device 30 may include a user interface 31, which may include components such as a display, one or more user input devices, or the like.

FIG. 10A is a flow chart illustrating a process for processing events originating from both the user and display device in one embodiment of the present disclosure. The display device 50 employs an event driven architecture, where events can come from both hardware sources and viewer 001 interactions with the device 50. Hardware sources may include interrupts originating from timers 84, communications interface 64 504, image sensors 70, motion detectors 76 500, display refresh requests 74, file system requests 72, power management functions 80, and the like. User interaction sources include activities such as inserting a removable memory drive 502, a viewer 001 touching the display of the touchscreen 506, and pressing buttons found on the physical enclosure of the display device 50.

Events are placed in an event queue 508, and pulled from the event queue by an event dispatcher 510 that in turn invokes the appropriate event handler 512, 514, 516, 518.

Motion events are 500 are triggered by a viewer 001 walking in front of the display device 50. The motion detector 76 causes the display device 50 to "wake up", going from a low power consumption state, to a higher power consumption state. The viewer identification event handler 600 handles the motion event 500, by taking an image with the camera 70 on the front of the display device 50, and resolving the face of the viewer 001.

Inserting removable media will trigger a disk event interrupt 502, which will deposit an event into the event queue 508. The event is in turn handled by the image indexing event handler 630, which resolves and indexes all of the faces in each of the images 220 on the removable media. Likewise, a collection of images 200 becoming available over the network 20 will trigger a similar event 504, which is also handled by the image index generator 775.

The slideshow event handler 516 is triggered by a user configurable timer 84, and causes viewer feedback to be collected, and the next available image to be displayed. The touch screen interrupt 506 is triggered whenever a viewer 001 touches the display device 50 display 74. The UI handler 518 is invoked to process the event posted in response to the touch screen interrupt 506.

FIG. 10B is a flow chart illustrating a process identifying a viewer 001 of the display device 50 according to one embodiment of the present disclosure. The program steps of FIG. 10B are executed in an event handler 600 that is triggered in response to a viewer 001 being detected in front of the display device 50. The event handler first checks to verify that an image collection 200 is available for display 602. If no image collection is available 622, the event handler waits 620 before responding to another viewer 001 detection 600. The camera 70 on the display device 50 is triggered via the motion detection circuit 76. An image 220 of sufficient quality is then captured 604, and the faces contained in the image 220 are resolved 606. If a no new viewer 001 is detected in the image 608, then the event handler waits 620 before responding to another viewer detection 600. Otherwise the event handler proceeds to determine if this viewer 001 is already a known user in the system 610. A known user is either a subject whose face appears in at least one image in the available image collection 200, or a viewer 001 who has used the display device 50 before, or both.

Once a new viewer has been detected, the display device 50 then attempts to determine other faces that may be of interest to the viewer 612. In one embodiment of the present disclosure, this step 612 can be as simple as identifying the images in which viewer's 001 face is contained. Once the affinity information has been obtained 612, a new user profile record 130 is created and the affinity information is stored 614. The newly detected viewer is then made the current viewer 616.

In step 618 the available images from the one or more image collections 200 are scored based on the subject affinity between the current user, and the subject faces found in the respective images. The results of this scoring are stored in the image playlist 160. The data structure contains a list of images 162, and their associated scores 164.

FIG. 10C is a flow chart illustrating a process for using affinity information to score an image playlist 160 for a viewer 001 according to one embodiment of the present disclosure. The module starts by retrieving the current viewer profile 630 and operates by cycling through each image contained in the current image playlist 160 one image at a time 631. The module processes each image by first resolving all of the faces contained in the image 632, and then scoring each face 638 according to FIG. 10D. Once all faces have been accounted for 640, a final score for the image 220 is stored in the current image playlist 642. This process is repeated until all images in the current image playlist 58 160 have been processed 646.

FIG. 10D is a flow chart illustrating a process for scoring a single subject face when encountered during the process of scoring an image 220 as found in FIG. 100. This module takes as its inputs a subject affinity matrix, and the current viewer information 58 160. If the subject face being scored is not in the subject affinity matrix 650, then a default value is assigned 662. Otherwise the viewer to subject affinity is retrieved from the subject affinity matrix 652. The size of the subject face being scored is then calculated 654, and used to modify the subject affinity according to FIG. 19. Next, the zone in which the subject face occurs is determined 655, and used to modify the subject affinity according to FIG. 18. Finally, the scored is calculated as a function of these three factors 656 and returned 658. Note that this is an exemplary scoring calculation. One of ordinary skill in the art would recognize that many other variations are possible.

FIG. 10E is a flow chart illustrating a process for building the subject affinity matrix that is used to represent the strength of relationship between any two users of the system according to one embodiment of the present disclosure. The module takes as its input a subject face index 296 that contains one unique entry for each subject face occurring in the entire image collection 670. If specified by preference, the viewer is prompted 672 with a dialog showing the N highest occurring faces in the collection, and given the opportunity to explicitly specify their affinity for those subjects. N is a function of how many faces may be reasonably represented on the display of the display device 50 at a one time. An example of this dialog is shown in FIG. 17. When the image collection 200 is small or the display size is large, it may be possible to show all faces in the collection on the display at once.

If a WAN network connection is available 676, the display device 50 may then further refine the subject affinity matrix by transmitting a image collection index 240 to a central system 678 and using the returned subject affinity matrix to replace the missing subject affinity values. Finally, subject face co-occurrence within single images may be used to predict subject affinity 680. Affinity may then be modified based on the proximity of other faces occurring within the images 681 according to FIG. 20. Note that this is an exemplary scoring calculation. One of ordinary skill in the art would recognize that many other variations are possible.

FIG. 10F is a flow chart illustrating a process for incorporating a newly available image collection 200 with a possibly existing image collection 200 according to one embodiment of the present disclosure. The new image collection available event 514 is invoked when a new image collection 200 becomes available. The image collection 200 may be newly available because the display device 50 has recently booted, and the device is initializing and loading the locally stored images 204. The image collection 200 may also be newly available because a viewer 001 has inserted a removable media 72 into the display device 50, or because another compatible electronic device 30 has joined the network 20 to which the display device 50 is attached, and is sharing an image collection 200 over the network 20. The event handler 514 starts 700 by determining if the image collection 200 is accompanied by an existing image collection index 240. If not 701, then a new image collection index 240 is created representing the collection 702. Once the image collection index 240 is available, any new faces from the new collection index 240 are merged with the existing faces to form an updated face index 706 FIG. 10F. The updated subject face index is then used to produce an updated subject affinity matrix 708. Finally, the image playlist 160 is updated 710 from a subject affinity matrix.

FIG. 10G is a flow chart illustrating a process for displaying a slideshow on the display device 50 according to one embodiment of the present disclosure. The slideshow and feedback event handler 516 FIG. 10G takes as its input the current viewer profile 62, the current image playlist 160, and the current image index 56. This information is retrieved in the first step 720. It then retrieves preference information for the current viewer such as transition type, transition speed, and display time 721. The image is then displayed with a transition 722, transition types including wipe, dissolve, twirl, and the like.

In one embodiment of the present disclosure, a subject status bar 902 is displayed in an area adjacent to the current image 918. These steps are outlined in FIG. 31.

Next, the response of the viewer 001 is measured 724, and the response information is used to adjust and refine 726 the current viewer 62 stored profile 728. For subject faces that the viewer 001 responds positively to, their preference 142 for that subject face will be increased 146. Likewise, for subject faces that the viewer 001 responds negatively to, their preference 142 for those subject faces are decreased 146. Viewer 001 evidence of a positive response may come in the form of a smile, prolonged attention, or focus. Evidence of a negative reaction may take the form of a frown, reduced attention span, or reduced focus. Other indicators are also possible.

Finally, the current image index 730 is incremented. If the end of the image playlist 160 is encountered 732, then the current image index is reset 734, and display continues from the top of the image playlist 160 736.

FIGS. 11A-B are flowcharts illustrating a process performed by the central system 100 to match subjects 768 to users 774 of a central system 100. The central system 100 receives a request 750 over the network 20 comprised of a list of subject identifiers 768. The request is then divided into two sets. The first list is the set of unknown subjects 751 770. Unknown subjects 770 are represented by subject identifiers 767 that include an image 220 of the face of the subject, but do not contain information uniquely identifying the subject to the central system 100, such as username, GUID (Globally Unique Identifier), or the like. The second list is the set of known subjects 752. Known subjects 769 are represented by subject identifiers 767 that contain identity information that allows the central system 100 to match the subjects to a user 012 of the central system 100 based on identity information, and without using face matching 176. In both the case of known subjects 769, and unknown subjects 770, the subject identifiers 767 may contain auxiliary information about the subject such as demographic information, preference information, calendar information location history, communications history, and the like.

Next, the process proceeds by retrieving the face corresponding to the next unknown subject identifier 753. The face from the unknown subject identifier is then matched to a user 012 of the central system 100 using facial matching techniques to match the unknown face with faces stored in user accounts 106 754. A list of the N closest potential matches 773 is formed 755 and refined using any available auxiliary information available in the subject identifier. The face matching 176 occurs between the face image found in the subject identifier, and one or more face images representing a central system user 012. The face images for the central system user 012 may come from the users profile picture, images hosted on the central system 100 where the user 012 has been tagged, or any combination thereof.

The potentially matching central system users 756 760 are then compared 757 758 759 771 to each known subject 769 based on the social distance between the potential match 773 and the known subject 769. Based on this comparison, the match score may be refined 758.

In one embodiment of the present disclosure, the image collection index 240 is used as the input to the process of FIGS. 11A-B, and the subject identifiers are extracted from the subject references 250 of the index 240.

The rationale behind these operations is that if a potential match 773 is close in social distance to a known subject 769, the match is more likely to be correct. This refinement process repeats until all known subjects 759 769 are compared to the set of potentially matching central system users 760 773. The potential matches 773 are then re-ranked, and the highest potential match score is compared against a match threshold 761. If the match score of the potential match 773 exceeds or matches a match threshold, then the unknown subject 770 is considered matched to the corresponding user 012 of the central system 100. This process is continued until there are no more unknown subjects 764. The social distance is then used to estimate the subject affinity for all known and identified subjects 765. The response information is provided to the requesting display device 766. The response information may be in the form of a subject-to-subject affinity matrix, augmented subject identifiers, augmented collection index, any combination of the above, and the like.

FIG. 11C depicts an exemplary subject to central system user 012 matching process of FIGS. 11A-B. The group of subject identifiers 768 passed to the central system for identification is composed of multiple individual subject identifiers 767. The group of subject identifiers 768 is then split into a group of known 769, and a group of unknown subjects 770. In one embodiment of the disclosure, the group 774 of central system users 012 is composed of all of the individual users 791 of the central system 100. When attempting to identify a single unknown subject 792 from the group of unknown subjects 770, facial recognition and auxiliary information is used to identify a group of possible matches 773. Comparing social distance 771 between each potential match 773 and each known subject 769 then refines the match score for each potential match 773, the match score being refined upwards based on a relatively shorter social distance when compared to other potential matches 773.

As a final step, once each unknown subject 770 has been matched to a central system user 012, the match score of the potential match 773 may be further refined by determining 772 the average social distance of the potential match 773 to each of the unknown subjects 770, and refining the match score higher based on a relatively shorter social distance when compared to the other potential matches 773.

FIGS. 12A-B are flowcharts illustrating a process performed by an exemplary embodiment of the image collection index generator. The process begins when the image index generator receives a request 775. The request may contain parameters indicating the desired format and the content of the response. Next, the generator checks to see if an index 240 of the collection 200 already exists 776. If so, a response is formatted 789, and returned 790. Otherwise a collection index 240 needs to be computed. For each successive image 777, a reference is added to an image index 778. Next, facial recognition is employed in determining a set of zero or more faces found in the image 779. Each face is successively examined 780. If the face has not been encountered before 781, a reference for the face is added to the face index 782. Next, 783, a reference for the faces is added to the image. The image index generator operates as part of the display device 50, the collection sharing device 30, and the central system 100. It is available both programmatically from a local device, and over the network 20 from other devices.

The process is completed when all faces 787 have been examined in all images in the collection 200. The collection index 240 is saved 788 for future use, the response is formatted according to the optional request parameters 789, and an image collection index 240 is returned 790.

FIG. 13 illustrates an alternate embodiment of the system found in FIG. 2, wherein the display device 50 has been simplified with the face recognition 170, affinity prediction 670, and image hosting 200 taking place at the central system 100. In this embodiment, the display device 50, has been simplified to perform obtaining reference person information, presenting the slideshow, and collecting feedback from the reference person, or viewer 001. An embedded HTTP browser 53 is employed to present the slideshow FIG. 10G.

In accordance with this simplified display device 50 embodiment, the central system 100 takes on additional complexity. Based on reference person information provided by the display device 50, viewer identification is performed 600. Face recognition 170 is used to aid in affinity prediction 600. Based on affinity prediction 104, an image playlist is built 630, taking into account viewer preferences and profiles 130. Account management software 105 operates to store and retrieve relationship information stored in the user accounts 106.

The embodiment of FIG. 13 has the advantage that the display device 50 is simplified, and can be made more cheaply due to reduced computing complexity and storage requirements. Computing requirements are reduced because software for facial recognition 170 and affinity prediction 104 is executed on the central system 100. Storage requirements are reduced since images 220 are stored on the central system 100 and not on the display device 50.

In another embodiment of the present disclosure, the presentation of images occurs in a browser on a computing device, and there is no separate display device 50. In this embodiment, the images are stored at the central system 100, and the viewer is assumed to be the user 012 who is logged into the central system 100 through the browser.

It should be noted that this embodiment, while producing a cheaper display device 50, suffers from the requirement that the display device 50 needs either a communications interface 64 or removable memory to be able to display images, since images may not be available locally 72.

FIG. 14A graphically illustrates an exemplary collection 200 of digital images 220 comprised of subject faces. The collection contains eight images (800, 802, 804, 806, 808. 810, 812, 814) that are comprised of varying combinations of the eight subject faces 001-008. The number of subject faces happens to match the number of images, but that need not be the case. Also, the subject faces, when present, always appear in the same position in the images. Again, this is for illustration purposes only, and need not be the case.

FIG. 14B is a table illustrating which subject faces is contained in which of the exemplary images. When an image contains a subject face, the corresponding matrix cell is marked with a "1". Likewise, when an image does not contain a subject face, the corresponding matrix cell is marked with a "0". For example image one contains the faces of subjects one, two, and three.

Note that in FIG. 14B and all subsequent figures, the images numbered (800, 802, 804, 806, 808. 810, 812, 814) have been renumbered IMAGE 1-IMAGE 8 for simplicity.

FIG. 15A is a graphical illustration of an exemplary central system 100 where users 012 form connections to other users 012 to facilitate the control of the sharing of information. The social distance between two users is the minimum number of hops required to get from a first user to a second user. A direct friend would have a social distance of one. A friend of a friend would have a social distance of two, and so on.

FIGS. 15B-F are exemplary calculations showing how each image is assigned a composite score for each viewer 001 using social distance 818 data obtained from the exemplary central system 100 shown in FIG. 15A. FIG. 15B shows in tabular form the connections of the central system 100 shown in FIG. 15A. The theory of scoring images using social distance is based on the assertion that a viewer 001 is more likely to want to see a image 220 containing someone they know, than someone less known to them.

FIG. 15C shows the social distance between any two users in our example central system 100 of FIG. 15A. All hops are assigned a weight of 1. Note that additional qualifiers may be used to refine the described social distance weighting model. For example, the popular social networking site Facebook offers nine potential qualifier when classifying contacts: "Lived Together", "Worked Together", "Went to School Together", "Traveled Together", "From An Organization", "Team Or Group", "In My Family", "Through A Friend", "We dated", "Other". Depending on a viewers profile 130, they could have a strong preference for viewing family members, thus that relationship would be assigned a relatively shorter social distance, thus resulting in a higher affinity prediction.

FIG. 15D shows the computation of a social distance-weighting matrix. The matrix element is calculated according to the formula:

$$W_{rc} = \sum_{i=1}^{N} 1/(1+d)^2 \quad \text{Equation (1)}$$

where r denotes row, c denotes column, and d is the social distance from matrix 15C.

FIG. 15E shows the computation of the affinity matrix. This matrix is computed according to the formula:

$$[P]_{rc} = [S]_r[W]_c \quad \text{Equation (2)}$$

where r denotes row, c denotes column, S is the face occurrence matrix of FIG. 15B, and W is the social distance weighting matrix of FIG. 15D. Multiplying matrix S[8×8] by matrix W[8×8] yields matrix P [8×8] which contains the score of each image for each viewer. The following computations show the calculation of the $P_{11}$:

$$P_{11} = 1 * \frac{1}{(1+0)^2} + 1 * \frac{1}{(1+1)^2} 1 * \frac{1}{(1+2)^2} \quad \text{Equation (3)}$$

$$P_{11} = 1 + \frac{1}{4} + \frac{1}{9}$$

$$P_{11} = \frac{36}{36} + \frac{9}{36} + \frac{4}{36}$$

$$P_{11} = \frac{49}{36}$$

$$P_{11} = 1.361$$

Note that in FIG. 15E, higher values represent a higher affinity between two subjects, while a lower value represents the opposite.

FIG. 15F represents the normalized version of 15E. The maximum value in the matrix P is 1.50. To normalize the matrix, and scale all values in the matrix to fall in the range of zero to one, we divide all values in the matrix by 1.5.

It follows from 15F that for our viewer 001 (subject 1 in FIG. 15F), the top scoring images are images one and seven. The lowest scoring image is number four. Other schemes for computing subject affinity based on social distance will be apparent to one of ordinary skill in the art upon reading this disclosure and are to be considered within the scope of the present disclosure.

FIGS. 16A-D are exemplary calculations showing how each image is assigned a composite score for each possible viewer 001 using subject face 001-008 co-occurrence within the image data obtained from the exemplary image collection of FIG. 14A. The idea being that if two subjects are in multiple images together, then they might know each other at some level, and that a viewer 001 is more likely to want to see a image containing someone they know, than someone less known to them. It is also possible to use multiple levels of co-occurrence information. For example, if subject A appears frequently with subject B in an image collection, and subject B occurs frequently with subject C, on average, we may predict that subject A has an above average affinity for subject C. In plain language, we may predict that if subject A can't see images containing a friend (subject B), they would rather see a friend of a friend (subject C) than a stranger. For the sake of simplicity, only first order co-occurrence information is used in the example represented by FIG. 16. Other schemes for computing subject affinity based on image co-occurrence will be apparent to one of ordinary skill in the art upon reading this disclosure and are to be considered within the scope of the present disclosure.

FIG. 16A shows the co-occurrence count of subjects in the images shown in FIG. 14A. For example, subject one appears with subject two in two images, while they appear with subject seven zero times. In theory, this would indicate a closer relationship between subjects one and two. In reality, this is more likely to be true when a large number of images are available to analyze.

FIG. 16B shows a normalized version of FIG. 16A, where dividing by the maximum value of four has normalized the matrix. FIG. 16C is calculated by multiplying the matrix S from FIG. 15B by matrix W of FIG. 16B to produce the matrix P, which is a prediction of the affinity by the various subjects to the images of FIG. 14A. FIG. 16D is calculated by normalizing FIG. 16C by the maximum value of two. It follows from the FIG. 16D, that for our subject 001, the top scoring images is one, and the lowest scoring image is number four.

FIG. 17 is an exemplary graphical user interface for collecting subject affinity information from a viewer 001 of a display device 50. In this embodiment the viewer to subject affinity may be determined by directly querying the viewer 001. In FIG. 17, the viewer 001 is prompted to enter in values 822 indicating their preference for each subjects face contained in the image collections 200 available to the display device 50. In this embodiment, these values 822 would be entered by pressing controls 820 824 on a touch display. Once the viewer 001 has expressed all preferences, pressing the "OK" button 826 to confirm the selections completes the operation. If the viewer wishes to skip setting these preferences, they may cancel out of the operation 828.

FIG. 18A graphically illustrates an exemplary digital image divided into zones, such that different weights may be assigned to different zones, for the purpose of modifying the image affinity scores for faces found in different zones. Using this embodiment, images occurring in the center zone(s) 830 are given a higher weighting than faces occurring towards the edge of the image 832. It follows that given two images containing the same face, the assertion is that a viewer 001 would like the image where the subject is in the middle area of the image, since the image is more likely to be focused on the subject. To help determine that information, the image is split into two or more zones 830 832, and each zone is assigned it's own weight. In our two zone example in FIG. 18A, the zone in the center 830 would be assigned a higher weight than the zone around the edges 832. To determine which zone a face falls in, a circle 836 inclosing the face is determined, and the center of that circle 838 is compared to the available zones to determine the zone in which it falls.

Taking the zone definition line 834, and excluding the area of any zones occurring within the zone definition line define zones. The outer most zone is defined as the area of the image, minus any zones occurring within the image FIG. 18B is a table illustrating exemplary zone weighting values for the exemplary digital image shown in FIG. 18A. Following from FIG. 18A, zone A 830 has been assigned a weighting multiplier of one while zone B 832 has been assigned a weighting multiplier of ½. In effect, a face occurring in zone A is given twice the weight as a face occurring in zone B. Accordingly, face 002 falls in zone A, and given a weight of one. In one embodiment of the present disclosure, this calculation is performed in step 655 of FIG. 10D. Other schemes for positioning zones and assigning weighting values will be apparent to one of ordinary skill in the art upon reading this disclosure and are to be considered within the scope of the present disclosure.

FIG. 19A graphically illustrates an exemplary digital image where the subject faces have been resolved and their respective areas determined, for the purpose of modifying the image affinity scores of faces based on their respective sizes. Given two or more faces in an image, the assertion is that the larger face 002 should influence the score of the image more so than the smaller face 003. FIG. 19A illustrates this scenario. The face size ratios for each of the faces occurring within the image 220 are measured by taking the area of the circles enclosing the faces 840 842 844 and dividing by the total area of the image respectively.

FIG. 19B is a table illustrating exemplary weighting values for the exemplary digital image shown in FIG. 19A. Following from FIG. 19A, FIG. 19B assigns specific multiplier weights for given face area intervals. By way of example, the circle 842 containing face 003 has the area pi(d/2)^2, while the area of the entire image is 24d^2. Therefore the ratio $FS_{Ratio}$ of the face size to image area is pi/96=0.0327.

$$FS_{Ratio} = \frac{pi*(d/2)^2}{24*d^2} = pi/96 = .0327 \quad \text{Equation (4)}$$

Accordingly, a weighting multiplier of 0.0625 is used from FIG. 19B. In one embodiment of the present disclosure, this calculation is performed in step 654 of FIG. 10D. Other schemes for determining face size ratios and assigning weighting values will be apparent to one of ordinary skill in the art upon reading this disclosure and are to be considered within the scope of the present disclosure.

FIG. 20A graphically illustrates an exemplary digital image whereby the faces have been identified, and the distance between each face determined for the purpose of modifying the exemplary face co-occurrence scores of FIG. 16 based on the distance between each subject face pair. In this embodiment, given an image with three subjects, the assertion is that there is likely more affinity between the two subjects that appear closest in the image 856, and less affinity between the subjects that appear farthest apart in the image 858. Using this logic, it is possible to further adjust the values entered into the co-occurrence matrix shown in FIG. 16A. For example, instead of simply counting the number of co-occurrences, a higher weight would be assigned to subject pairs in close proximity, and a lower weight to subject pairs with less proximity.

FIG. 20B is a table illustrating exemplary weighting values for the exemplary digital image shown in FIG. 20A. Following from the image of FIG. 20A, FIG. 20B shows an exemplary table of weighting multipliers. Using the faces 001 and 002 from 20A as an example, it can be shown that the ratio of the distance $D_{Ratio}$ between the centers 851 853 of the circles 850 852 containing the faces 001 and 002 divided by the diagonal distance is:

$$D_{Ratio} = \frac{d*\sqrt{2}}{d*\sqrt{50}} = \sqrt{1/25} = 1/5 \quad \text{Equation (5)}$$

Since ⅕<0.3, the affinity between the two subjects 001 and 002 is assigned a weighting of one. In one embodiment of the present disclosure, this calculation is performed in step 681 of FIG. 10E. Other schemes for determining face proximity ratios and assigning weighting values will be apparent to one of ordinary skill in the art upon reading this disclosure and are to be considered within the scope of the present disclosure.

FIG. 21 graphically illustrates an exemplary display device wherein more than one viewer has been detected. There may be zero, one or multiple viewers in front of the display device 50 at any given time. To account for this scenario, the viewers preferences 130 are used in accordance with their distance from the frame 870 872. The viewer response however is tied to the viewer's face, so this feedback is recorded individually 142 for each viewer 001.

In another embodiment of the present disclosure, the presentation content is targeted to a user who is not the viewer 001. This reference person may be a subject who is found in one or more of the images available to the display device 50, and is selected by the viewer 001 selecting the face of the subject as it is shown in an image appearing on the display device 50. Note also that multiple reference persons may be selected at the same time, in which case the composite profile 130 from multiple reference persons is used.

FIG. 22 graphically illustrates an exemplary graphical user interface for prompting a newly detected viewer 001 to confirm identity, for the purpose of matching that viewer 001 to an existing profile 130. In an alternate embodiment of the disclosure, the viewer 001 may be prompted to confirm their identify 886 for the purpose of matching their face to an existing profile 130. If the presented face 001 matches the viewer 001, the viewer 001 would confirm the match 880, otherwise they would deny the match 882. Cancelling the match confirmation would cause the presentation selection process for the display device 50 to continue without viewer 001 confirmation 884.

In another aspect of the present disclosure a user interface is described to improve the usability of the display device 50. When a viewer 001 encounters a display device 50, there is often a desire for that viewer 001 to see images comprising subjects that they know. The first part of this disclosure describes a means for accomplishing this task. In a further refinement, methods are described for presenting information to the viewer 001 on subjects appearing in upcoming images. As such, the viewer 001 is able to identify those subjects appearing in upcoming images, and determine how long it will be before respective subjects appear in the displayed image.

As used herein, "subject information" refers to any information occurring within the subject status bar 902. This information comprises the subject representations 912, subject status indicators 914, next subject indicators 910, and the like.

As used herein, "status information" refers to any information accompanying a subject representation 912 indicating when that subject will appear in the current image 920. This information comprises subject status indicators 914 and the like.

FIG. 23 is a graphical illustration of an exemplary embodiment of the display device showing the constituent parts of the user interface and their respective names. In this illustration, image two 802 is shown on the display device 50, and is comprised of subject faces 002, 003, and 006. The display device 50 display area is divided into an image area 906 where the current image 918 is displayed, and an adjacent area 908 where a subject status bar 902 is displayed. In one embodiment of the present disclosure the subject status bar 902 is comprised of eight subject representations 912 and their corresponding subject status indicators 914. The subjects that occur in the next image 920 to be shown are augmented with next subject indicators 910. The image collection 926 used in this example is shown in FIG. 14A. The current image 918 being shown is 802. The previous image 916 shown was 800. The next image 920 to be shown is 804. The total set of images that have not yet been shown, the upcoming images 924, are images 804 806 808 810 812 814. The subject status indicators 914 are calculated from the set of images occurring within an analysis window 922. In the example of FIG. 23, the analysis window 922 consists of four images. Note that the analysis window 922 may be variable in length, and in another embodiment of the disclosure, consist of all upcoming images 924. A secondary subject indicator 904 signals the presence of additional information for a particular subject. This additional subject information may be selected for display by selecting the corresponding subject representation.

FIG. 24 is a graphical illustration of an exemplary embodiment of a display device 50 where at the same time a primary image 906 is displayed, subject information is being displayed in an area adjacent 908 to the image, for the purpose of providing advance notice of subjects contained in upcoming images 924. In this figure, the images are being shown in their original order with no viewer 001 preferences applied.

FIG. 25 is a graphical illustration of an exemplary embodiment of a user interface for the display device 50 of FIG. 23 where a viewer 001 has been detected, and the images have been reordered based on image affinity for the current viewer. The images of FIG. 14A have been analyzed, indexed, and ordered according to the preferences of the viewer 001. For this and all following examples we use the image affinity computation results of FIG. 15F. The current image 802 918 is shown in the image area 906 of the display device 50. In an adjacent area 908, subject representations for those subjects appearing in for upcoming images are shown 924. In an area adjacent to each subject representation 912 there is a numerical indicator showing how often that subject will occur in the next N images, where N is the size of the analysis window 922. The analysis window size 922 is a user settable preference illustrated in the display preferences control dialog 1101, and is set to four in this example. The fourth subject representation 930 is shown with the number two below it indicating that this subject face will occur twice 808 804 in the next four images of our analysis window 922. Image 800 was the previous image shown 916. The faces contained in the next image 920 812 are indicated in the status bar 902 by a dotted line drawn around each subject face 932 934 936.

FIG. 26 is a graphical illustration of an exemplary embodiment of a user interface for the display device 50 shown in FIG. 23 where the viewer 001 has invoked a control to select an alternate reference person, and changed the order in which upcoming images 924 will be displayed. In this example, the reference person is chosen to be subject 006. Accordingly, the upcoming images 924 (810, 814, 808, 812, 804, 806) are resorted according to FIG. 15F. The new order is (810, 814, 808, 812, 804, 806). Images 800 and 802 are not affected since 800 was previously shown 912, and 802 is currently being shown 918. The next image 920 to be shown will be 810 since it has the highest image affinity score, 1.00, for subject 006 as shown in FIG. 15F. The status information for the subject status bar 902 are computed for those images (810, 814, 808, 812) falling within the analysis window 922. The next subject faces to appear are highlighted in the subject status bar 902 accordingly 940, 942, 944.

FIG. 27A is a graphical illustration of an exemplary embodiment of a user interface for the subject status bar 902 of the display device 50 wherein the subject status indicators 914 are displaying an occurrence count for each subject appearing in an image within the analysis window 922. This example corresponds to the data as sorted in FIG. 25 where the reference person is subject 006. The analysis window 922 contains images 812, 808, 810, 804. Subject faces 001 (932), 002 (934), 005 (936) occur in the next image 920 to be shown. Subject face 001 occurs once within the analysis window 922, subject 002 occurs twice, subject 003 does not occur, and so on. Thus the corresponding subject representations are labeled "1", "2", and "0" accordingly.

FIG. 27B is a graphical illustration of an exemplary embodiment of the subject status bar 902 of the display device 50 wherein the subject status indicators 914 are displaying an image countdown count, wherein the image countdown count indicates the number of images remaining before the subject face occurs. One image change is required before subjects 001, 002, and 005 are shown. Four image changes are required before subject face 004 appears. Subject face 003 does not occur within the analysis window, and is marked accordingly.

FIG. 27C is a graphical illustration of an exemplary embodiment of the subject status bar 902 of the display device 50 wherein the subject status indicators 914 are displaying the time countdown count, wherein the time countdown count indicates the number of images to be shown before the subject face occurs. In this case each image is shown for three seconds.

FIG. 28A is a graphical illustration of an exemplary embodiment of the subject status bar 902 of the display device 50 wherein the subject representations 912 are sorted according to subject affinity between the viewer or reference person and the corresponding subjects. The subject affinity values used in FIGS. 28A-E are taken from FIG. 15F. In sorting by subject affinity, the viewer 001 is able to see those subject representations 912 corresponding to the subjects in which they should be most interested.

FIG. 28B is a graphical illustration of an exemplary embodiment of the subject status bar 902 of the display device 50 wherein the subject representations 912 are sorted according to subject occurrence count values of the corresponding subjects. The subject occurrence count is defined as the number of times a subjects face occurs within the images contained within the analysis window 922.

FIG. 28C is a graphical illustration of an exemplary embodiment of the subject status bar 902 of the display device 50 wherein the subject representations 912 are sorted according to the image countdown count of the corresponding subjects. The image countdown count corresponding to the number of images that must be displayed before an image is shown containing the respective subject.

FIG. 28D is a graphical illustration of an exemplary embodiment of the subject status bar 902 of the display device 50 wherein the subject representations 912 are sorted according to the time countdown count of the corresponding subjects. The time countdown count corresponding to the image countdown count multiplied by the display time 1204.

FIG. 28E is a graphical illustration of an exemplary embodiment of the subject status bar 902 of the display device 50 wherein the subject representations 912 are sorted according to subject prominence score of the corresponding subjects. As used herein, "subject prominence" refers to information describing how prominently a subject face occurs in a group of images. In one embodiment, subject prominence score is computed according to Equation 7 as the sum of the product of the zone value and the face size ratio value for each image in the group. The use of zone values and face size ratio values is explained in FIGS. 18 and 19 respectively.

FIG. 29 illustrates an exemplary computation for social prominence as a function of face size ratio value (FSRV) and zone value (ZV). The computations are based on the example of FIG. 25, and the results are shown in FIG. 28E. In one embodiment, subject prominence is computed according to Equation 7.

$$SP_{subject[n]} = \Sigma_{n=}^{AnalysisWindowSize-1} FSRV_{image[n]} * ZV_{image} \quad \text{Equation (7)}$$

As shown in Equation 7, the social prominence $SP_{subject}$ for each subject is computed by taking the product of the face size ratio value $FSRV_{image}$ and zone value $ZV_{image}$ for each image occurring within the analysis window 922. The use of face size ratio values is explained in FIG. 19, and the use of zone values is explained in FIG. 18. Other schemes for determining subject prominence will be apparent to one of ordinary skill in the art upon reading this disclosure and are to be considered within the scope of the present disclosure.

Figure 29A:
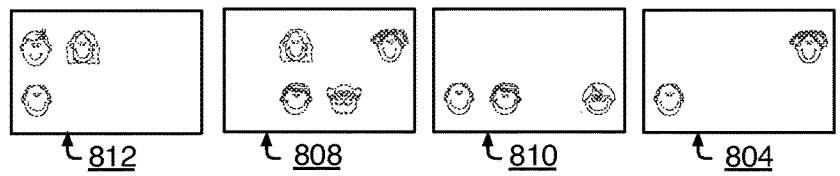

FIG. 29A shows the set of four images falling within the analysis window 922 for the example. The images used for the example are a special case in that when a subject face occurs within an image, it is always at the same position. This means that when a subject face occurs in an image, it will always have the same face size ratio value and zone value regardless of the image in which it occurs. Again this is an exception, and will not be the case for images captured in normal settings.

For our example, Equation 8 gives the face size ratio value for all subjects. As mentioned above, the face size ratio value will be the same for all the subjects in all of the images in our example, since the faces are all of the same size. Using a face radius 964 of 5d/8, yields a face size ratio value of 0.0163. Based on the value resulting from Equation 8, a value of 0.0625 is used from the table of FIG. 19B.

$$FSR_{Ratio} = \frac{pi * (5d/8)^2}{24 * d^2} = pi * 25/1536 = .0163 \quad \text{Equation (8)}$$

Figure 29B:
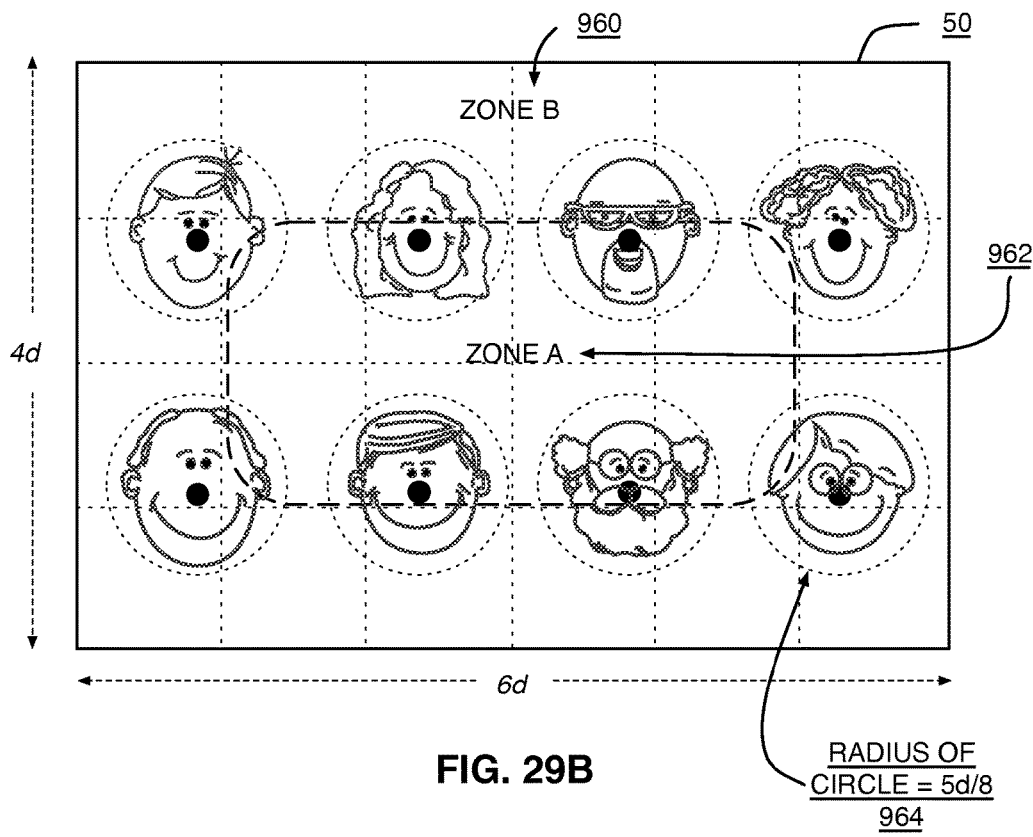

As shown in FIG. 29B, subjects 001, 004, 005, and 008 fall in zone B 960 and have a zone value of ½ from FIG. 18B. Likewise, subjects 002, 003, 006, and 007 fall in zone A 962 and have a zone value of 1 from FIG. 18B.

In the example of 28E, the subject prominence values are graphically depicted with the use of stars. The number of stars 972 is determined by taking the normalized subject prominence values 970, and setting the maximum value to four stars.

In the described embodiments, the subject status indicators 914 have been numerical, but that need not be the case. Any type of indicator capable of showing relative values is possible and fall within the scope of the present disclosure.

In another embodiment, the subject status indicators 914 are stars, wherein a small and large number of stars represent a low and high value respectively.

FIG. 30 is a graphical depiction of an exemplary user interface for the purpose of allowing a viewer 001 of the display device 50 to set the operational preferences of the device. The analysis window 922 slider control 1203 operates to set the preferred number of images that will be analyzed when calculating the metrics for the subject status bar 902. In one embodiment of the present disclosure, the minimum value of the slider 1102 is set to one image, and the maximum value of the slider 1104 is set to all upcoming images 924. In FIGS. 23, 24, and 25, the size of the analysis window 922 is set to four.

The display time slider bar 1105 operates to set the time duration the current image 918 will be shown before transitioning to the next image 920 in the set of upcoming images 924. The check box 1109 may be used to specify that the display time duration be scaled by the image affinity for that image. When this check box 1109 is selected, the value from the display time slider is multiplied by the image affinity for the current image 918 to get the display time duration. In one embodiment, the minimum display time duration 1106 is set to one second 1106, and the maximum time duration is set to one hour 1108.

The subject representation radio control buttons 1110 operate to select the type of subject representation 912 that will be shown in the subject status bar 902. The subject representations 912 shown in the subject status bar 902 are used to identify the subjects to the viewer 001. In one embodiment of the present disclosure, the subject representations 912 are thumbnail images of the subject's faces. These subject faces may be extracted from the collection of images 200 available to the display device 50, taken from a profile 130 stored on the display device 50, or a profile picture obtained from the central system 100. However, there are other sources for the subject faces, and other types of data that may be used to represent the subject. Other subject representations include the textual name of the subject, a graphical representation of the subject, and an icon chosen to represent the subject. Other schemes for representing subjects will be apparent to one of ordinary skill in the art upon reading this disclosure and are to be considered within the scope of the present disclosure.

The sort subject representations radio button control 1111 operates to set the sort mode for the subject representations 912 in the subject status bar 902. In subject affinity mode (FIG. 28A), the subject representations 912 are sorted according to subject affinity between the viewer 001 or references person and each subject indicated in the subject status bar 902. In occurrence count mode (FIG. 28B), the subject representations 912 are sorted by the number of times they occur within the analysis window 922. In the image countdown mode (FIG. 28C), the subject representations 912 are sorted by the number of images to be displayed before the subject face occurs in the current image 918. In time countdown mode (FIG. 28D), the subject representations 912 are sorted by the time before an image containing the subject face is displayed as the current image 918. In subject prominence mode (FIG. 28E), the subject representations 912 are sorted by the sum of the values obtained by determining which images within the analysis window 922 the subject face occurs in, then accumulating the sum of the zone contribution (FIG. 19), and the size contribution (FIG. 18) for each respective image. Note that this calculation is exemplary, and many variations are possible and fall within the scope of the disclosure.

The number of subject representations 912 shown in the subject status bar 902 may be truncated when the number of subjects occurring in the analysis window 922 becomes large. Conversely, the size of the subject representations 912 may be scaled either up or down from the default to match the display area afforded the subject status bar 902. Likewise, multiple rows of subject representations 912 may be displayed if needed. In another embodiment, the subject status bar 902 may be rendered as a vertical column on the left or right of the display area. Likewise, when drawn horizontally, the subject status bar 902 may be rendered at either the top or bottom of the display area. Other variations are possible, and fall within the scope of the disclosure.

The status indicator information radio button control 1112 operates to set the type of information that will be shown below the subject representations 912 in the subject status bar 902. In occurrence count mode, the subject status indicator 914 displays the number of times a subject face occurs in an image in the analysis window 922. In image countdown mode, the subject status indicators 914 display the number of images to be displayed before the subject face appears in the current image 918. In time remaining mode, the status indicators 918 display the time remaining before the subject face will be shown in the current image 918.

FIG. 31 is a flowchart outlining the process by which a display device 50 receives an image collection 200 and displays the images and the corresponding subject information.

The process illustrated by the flowchart shown in FIG. 31 is invoked from step 724 of FIG. 10G. FIG. 10G illustrates the process involved in rendering a single image in a slide show on the display device 50. FIG. 31 shows the additional substeps involved in rendering the information to the subject status bar 902.

The process begins 1202 by retrieving the user settable preferences shown in the Display Preferences Control Dialog of FIG. 30. The preferences control the specifics regarding what information is shown in the subject status bar 902, and how it is displayed, organized, and arranged on the display. The system then determines the set of images that fall within the analysis window 922 1204. The analysis window 922 specifies the number of images that will be considered in computing the status information shown in the subject status bar 902. The status information is then computed 1208.

The subject representations 912 are determined by extracting information from the image collection index 240. For each image within the analysis window 922, the corresponding image will be identified within the image collection index 240. Each image reference 262 will in turn contain subject references 264 indicating those subjects that appear within that image. By repeating this process for each image within the analysis window 922, the subject information can be determined 1206. The status information is then computed 1208.

Next the subject representations 912 are sorted 1210 and rendered 1212 according to the preference settings specified in the display preferences control dialog 1111. The various sort modes are shown in FIG. 28. The subject representations 912 used for the subjects are also controlled by the display preference control dialog 1112. In the present embodiment, the subject representations 912 are always some form of the subjects face. The face can be extracted from the actual images found in the collection 200, or a profile 130 face image 134 may be used, where the profile 130 face image 134 may be retrieved from the local profile 130 on the display device 50, or from the central system 100.

The subject status indicators 914 are rendered 1214 according to the preference settings 1112. The time duration that an image is displayed may be scaled 1216 based on the image affinity value for the viewer 001. This feature is useful in that is allows the viewer 001 a longer time to view those images that should be of most interest to the them. In one embodiment of the present disclosure, the display time duration $T_{Display}$ is determined by multiplying the value from the display time slider control 1207 $T_{SliderControl}$ by the image affinity value $I_{AffinityValue}$ for the image. If the resulting value falls below a minimum threshold $T_{MinValue}$, then the minimum value 1206 is assigned, thus assuring that each selected image will appear for some minimum amount of time on the display device 50. Finally the process concludes as control is returned to FIG. 10G 1218.

$$T_{Display} = \text{MAX } [T_{SliderControl} * I_{AffinityValue} T_{MinValue}] \quad \text{Equation (9)}$$

Those skilled in the art will recognize improvements and modifications to the embodiments of the present disclosure. All such improvements and modifications are considered within the scope of the concepts disclosed herein and the claims that follow.

What is claimed is:

1. A method of effecting a display of a sequence of images, the method comprising:
    selecting, by a device, a sequence of images;
    effecting the display of a current image from the sequence of images in a first area of a display, wherein the current image is the only image from the sequence of images to be displayed during a display period;
    selecting, by the device, a subset of the sequence of images that are to be displayed subsequent to the current image to form a plurality of analysis window images;
    determining updated subject information from the plurality of analysis window images, the updated subject information comprising subject representations of those subjects appearing in the plurality of analysis window images and subject prominence scores, each subject prominence score determined as a function of a face size ratio value and a zone value for a subject face appearing in one or more analysis window images, wherein the face size ratio value is determined as a function of an area of the subject face and a total image area, and wherein the zone value is determined as a function of a zone in which the subject face appears;
    sorting the subject representations by their corresponding subject prominence scores; and
    effecting the display of the updated subject information in a second area of the display contemporaneously with the current image.

2. The method of claim 1 wherein determining updated subject information further comprises:
    determining subject status indicator information for the subject representations; and
    effecting display of the subject status indicator information for the subject representations in the second area of the display, wherein the subject status indicator information is chosen from the group consisting of subject occurrence counts, image countdown counts, and time countdown counts.

3. The method of claim 2 wherein:
    determining the subject status indicator information further comprises:
        determining subject occurrence counts, each subject occurrence count defining a number of times a subject corresponding to a subject representation appears in the plurality of analysis window images; and sorting the subject representations by their corresponding subject occurrence counts.

4. The method of claim 2 wherein:

determining the subject status indicator information further comprises:

determining an image countdown counts, each image countdown count defining a number of images to be displayed before a subject corresponding to a subject representation appears in the current image; and sorting the subject representations by their corresponding image countdown counts.

5. The method of claim 2 wherein:

determining the subject status indicator information further comprises:

determining time countdown counts, each time countdown count defining a time duration before a subject corresponding to a subject representation appears in the current image; and sorting the subject representations by their corresponding time countdown counts.

6. The method of claim 2 wherein determining updated subject information further comprises:

determining next subject indicator information for the subject representations, the next subject indicator information indicating which subjects will appear in the next current image from the sequence of images; and effecting the display of the next subject indicator information in the second area of the display.

7. The method of claim 1 wherein selecting the sequence of images further comprises:

detecting a viewer in proximity to the device;

capturing information identifying the viewer; and selecting, by the device, the sequence of images based on the information identifying the viewer.

8. The method of claim 7 wherein the subject representations comprise likenesses of those subjects appearing in the plurality of analysis window images.

9. The method of claim 7 wherein selecting the sequence of images further comprises:

obtaining a subject affinity for each of a plurality of other subjects that appear in a collection of images, the subject affinity defining a subject affinity score between the viewer and a corresponding one of the plurality of other subjects, the other subjects corresponding to subjects other than the viewer;

determining an image affinity for each image in the collection of images based on the subject affinity for the plurality of other subjects, the image affinity defining an image affinity score between the viewer and each image in the collection of images based on the other subjects appearing in the collection of images; and selecting, by the device, the sequence of images from the collection of images based on the image affinities.

10. The method of claim 9 wherein effecting the display of the subject representations further comprises:

sorting the subject representations by their corresponding subject affinity; and effecting display of subject status indicator information in the second area of the display.

11. The method of claim 9 wherein effecting the display of the current image further comprises:

scaling a time duration the current image is displayed according to its image affinity.

12. The method of claim 7 wherein the information identifying the viewer is an image of the viewer.

13. The method of claim 1 further comprising:

determining, based on timing information, that it is time to display a next image from the sequence of images;

selecting, by the device, the next image in the sequence of images as a new current image; and effecting the display of the new current image.

14. The method of claim 1 wherein the device is one of a digital picture frame, cellular phone, pda, and a media player.

15. The method of claim 1 wherein analysis window images are not shown on the display contemporaneously with the current image.

16. The method of claim 15 wherein a size of the analysis window is a viewer defined preference.

17. The method of claim 1 wherein the subject representations are not selected from the sequence of images.

18. A device comprising:

a communication interface facilitating communication between the device and a plurality of other devices;

a processor operably in communication with the communication interface; and memory storing software executable by the processor, whereby the server is operable to:

select, by the device, the sequence of images;

effect the display of a current image from the sequence of images in a first area of the display, wherein the current image is the only image from the sequence of images to be displayed during a display period;

select, by the device, a subset of the sequence of images that are to be displayed subsequent to the current image to form a plurality of analysis window images;

determine updated subject information from the plurality of analysis window images, the updated subject information comprising subject representations of those subjects appearing in the plurality of analysis window images and subject prominence scores, each subject prominence score determined as a function of a face size ratio value and a zone value for a subject face appearing in one or more analysis window images, wherein the face size ratio value is determined as a function of an area of the subject face and a total image area, and wherein the zone value is determined as a function of a zone in which the subject face appears;

sort the subject representations by their corresponding subject prominence score; and effect the display of the updated subject information in a second area of the display contemporaneously with the current image.

19. A computer program product, the computer program product stored on a non-transitory computer-readable storage medium and including instructions configured to cause a processor to:

select, by a device, the sequence of images;

effect a display of a current image from the sequence of images in a first area of a display, wherein the current image is the only image from the sequence of images to be displayed during a display period;

select, by the device, a subset of the sequence of images that are to be displayed subsequent to the current image to form a plurality of analysis window images;

determine updated subject information from the plurality of analysis window images, the updated subject information comprising subject representations of those subjects appearing in the plurality of analysis window images and subject prominence scores, each subject prominence score determined as a function of a face size ratio value and a zone value for a subject face appearing in one or more analysis window images, wherein the face size ratio value is determined as a function of an area of the subject face and a total image area, and wherein the zone value is determined as a function of a zone in which the subject face appears;

sort the subject representations by their corresponding subject prominence score; and effect the display of the updated subject information in a second area of the display contemporaneously with the current image.

* * * * *